Figure 1:
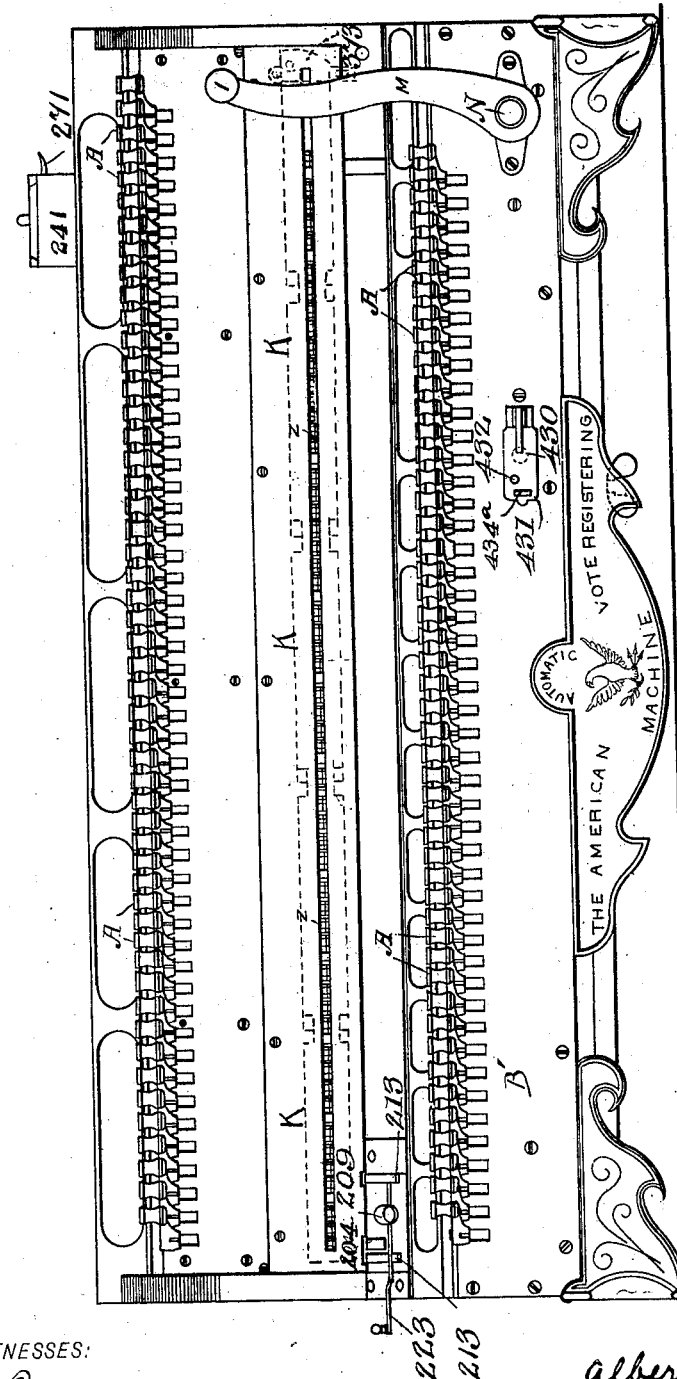

No. 758,708. PATENTED MAY 3, 1904.
A. SJOBERG.
VOTING MACHINE.
APPLICATION FILED JULY 7, 1894.
NO MODEL. 34 SHEETS—SHEET 1.

WITNESSES:
O. F. Duran
L. D. Erion

INVENTOR
Albert Sjoberg
BY
ATTORNEY.

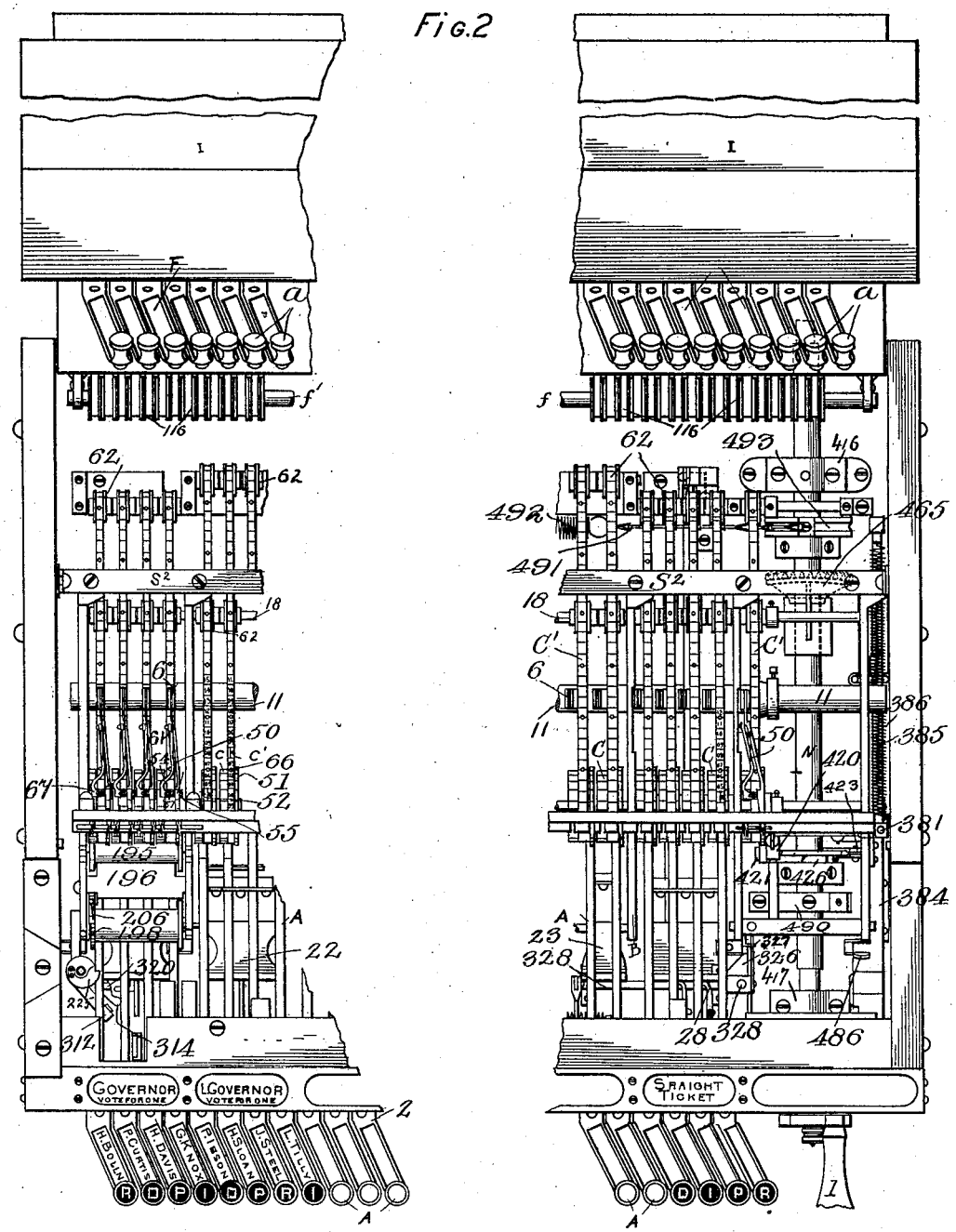

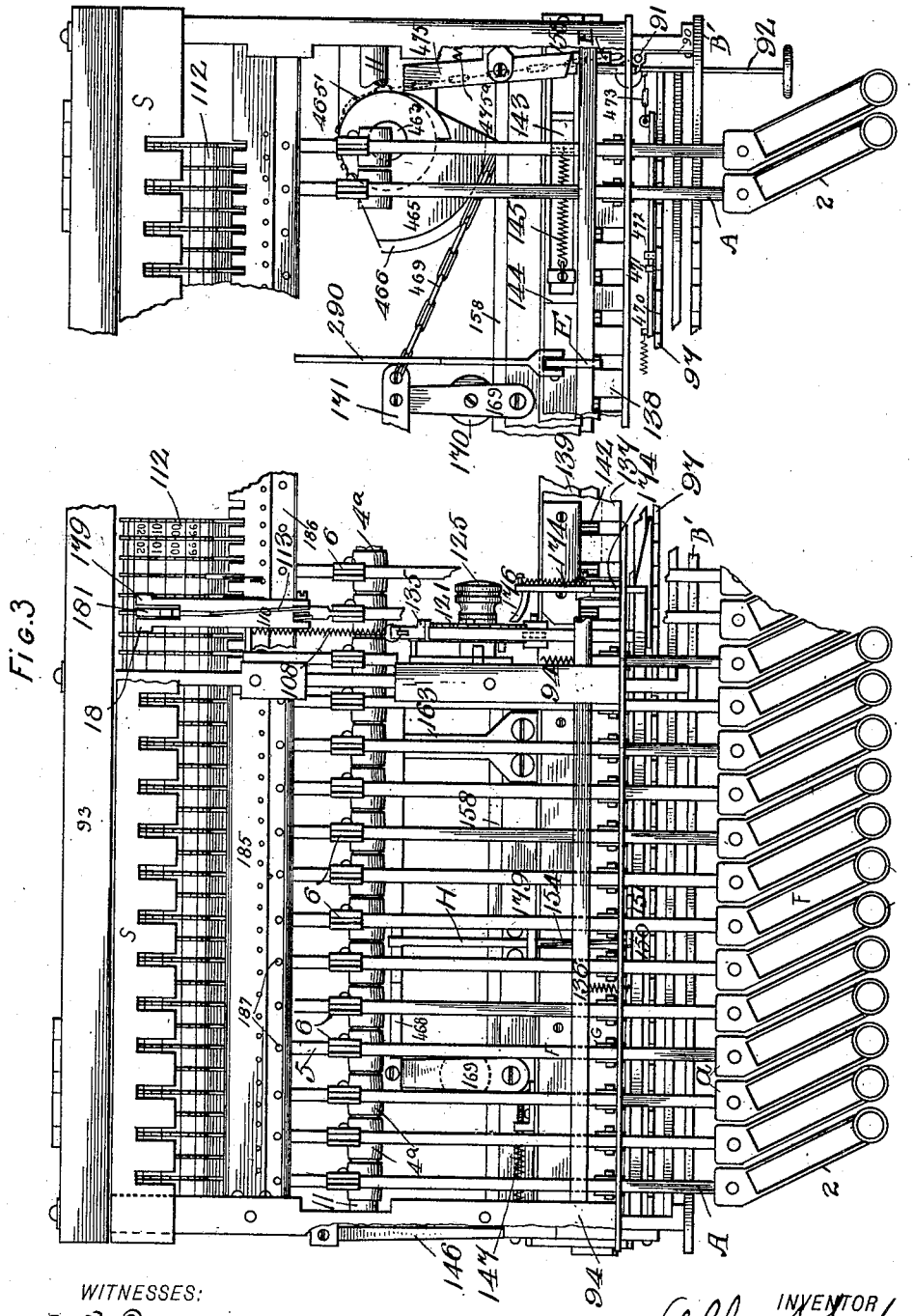

No. 758,708. PATENTED MAY 3, 1904.
A. SJOBERG.
VOTING MACHINE.
APPLICATION FILED JULY 7, 1894.
NO MODEL. 34 SHEETS—SHEET 4.
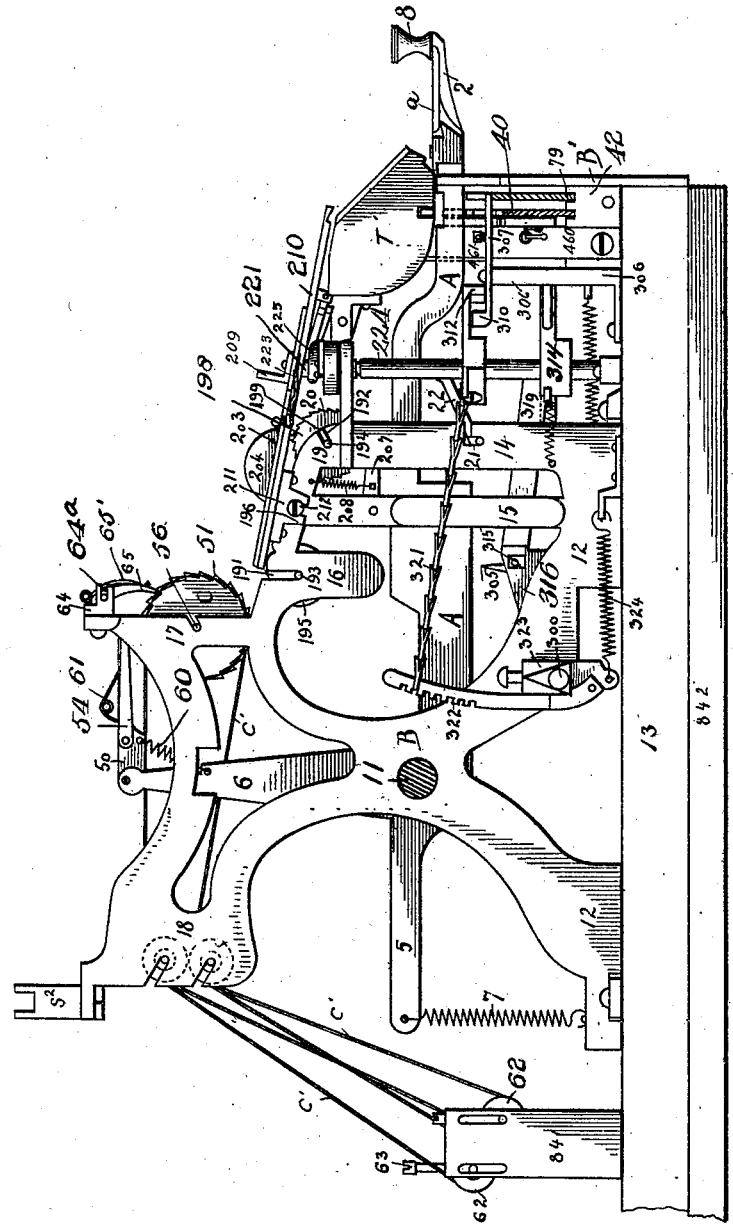
WITNESSES:
O. F. Dourow
L. D. Erion
INVENTOR
Albert Sjoberg
BY
ATTORNEY.

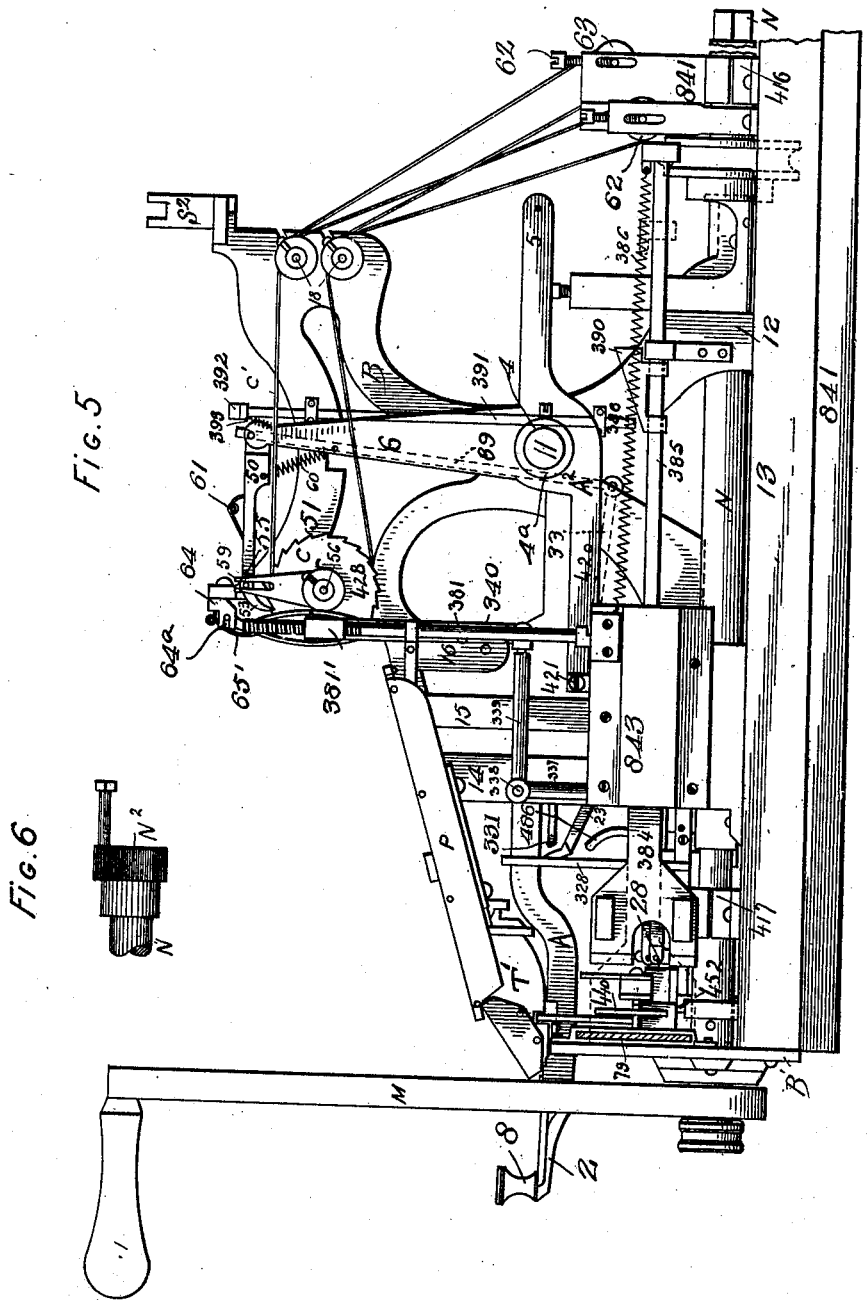

No. 758,708. PATENTED MAY 3, 1904.
A. SJOBERG.
VOTING MACHINE.
APPLICATION FILED JULY 7, 1894.
NO MODEL. 34 SHEETS—SHEET 6.
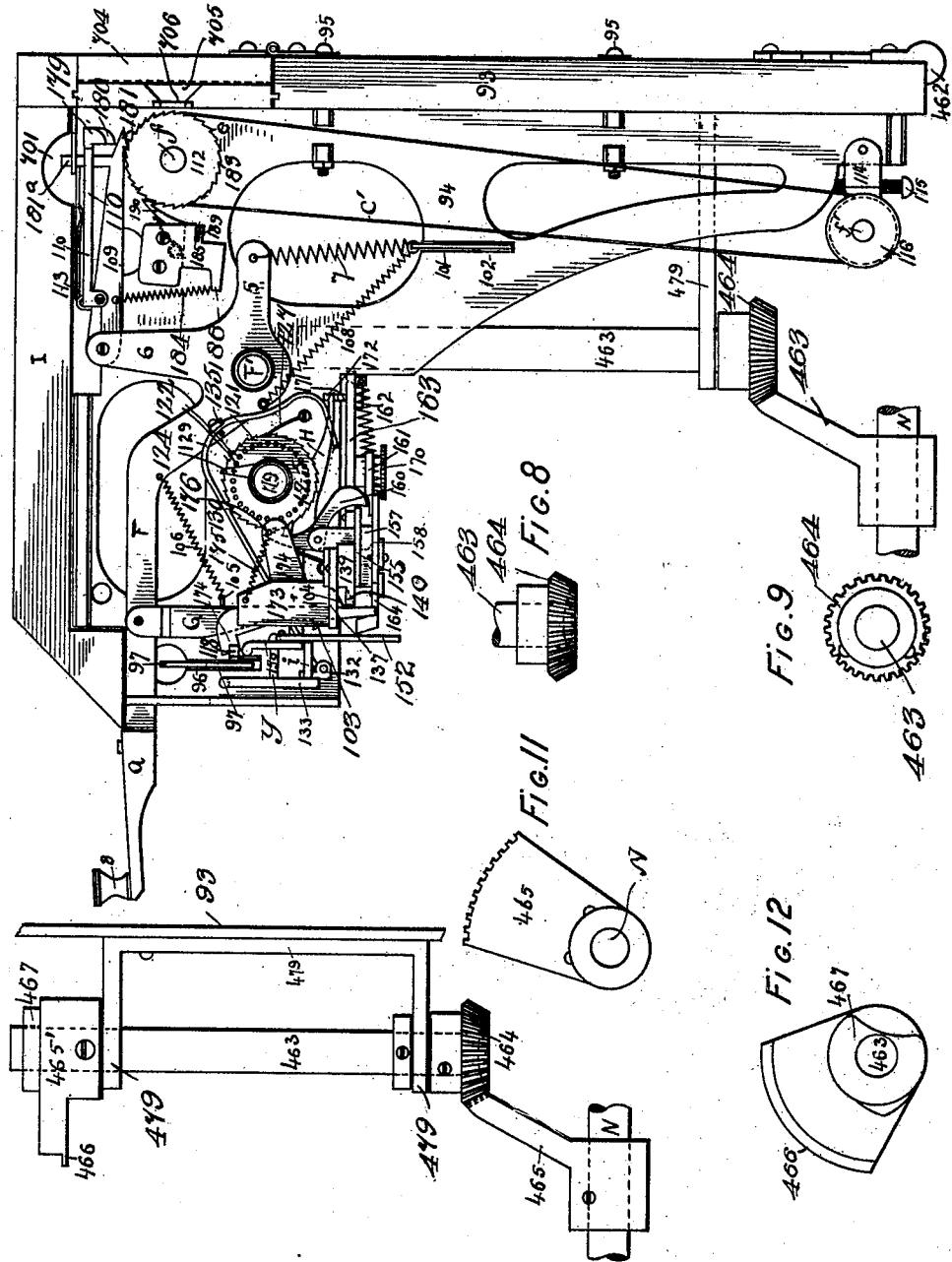
WITNESSES:
INVENTOR
Albert Sjoberg
BY
ATTORNEY.

No. 758,708. PATENTED MAY 3, 1904.
A. SJOBERG.
VOTING MACHINE.
APPLICATION FILED JULY 7, 1894.
NO MODEL. 34 SHEETS—SHEET 7.
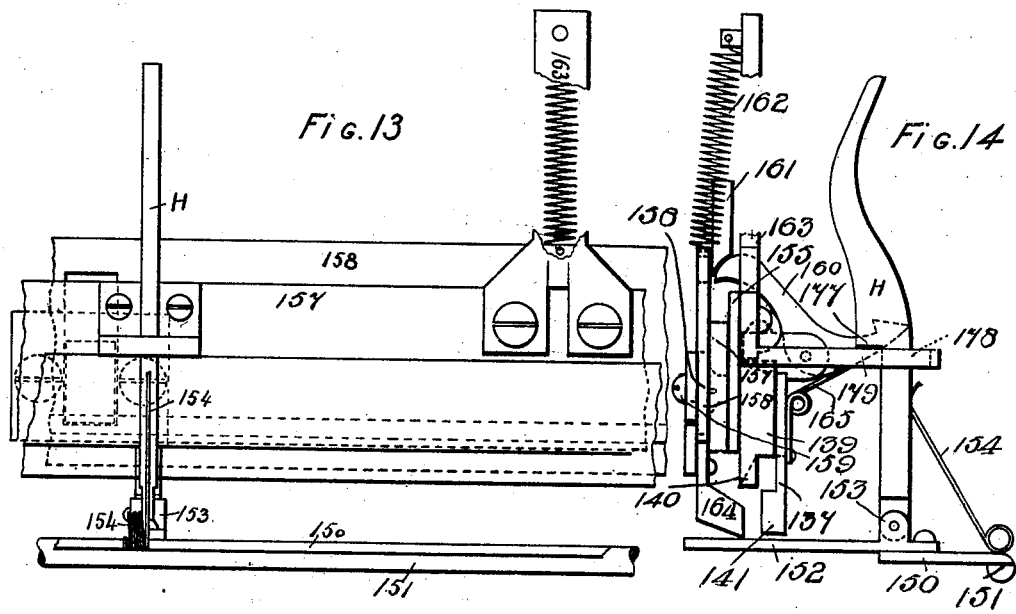
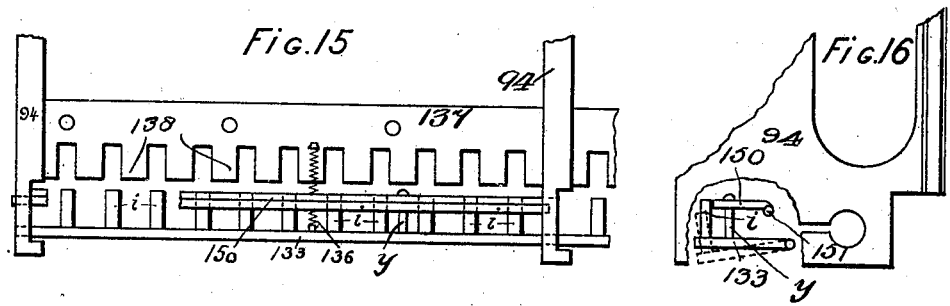
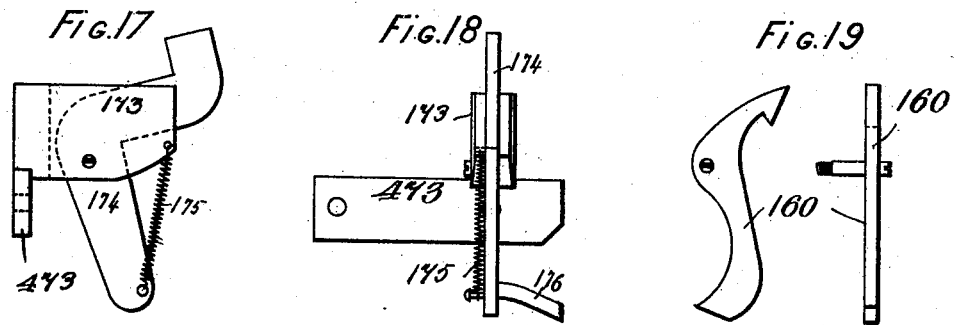
WITNESSES:
INVENTOR
Albert Sjoberg
BY
ATTORNEY.

No. 758,708. PATENTED MAY 3, 1904.
A. SJOBERG.
VOTING MACHINE.
APPLICATION FILED JULY 7, 1894.
NO MODEL. 34 SHEETS—SHEET 8.

WITNESSES:
O. F. Dowson
L. D. Erion

INVENTOR
Albert Sjoberg
BY
ATTORNEY.

No. 758,708. PATENTED MAY 3, 1904.
A. SJOBERG.
VOTING MACHINE.
APPLICATION FILED JULY 7, 1894.
NO MODEL. 34 SHEETS—SHEET 9.
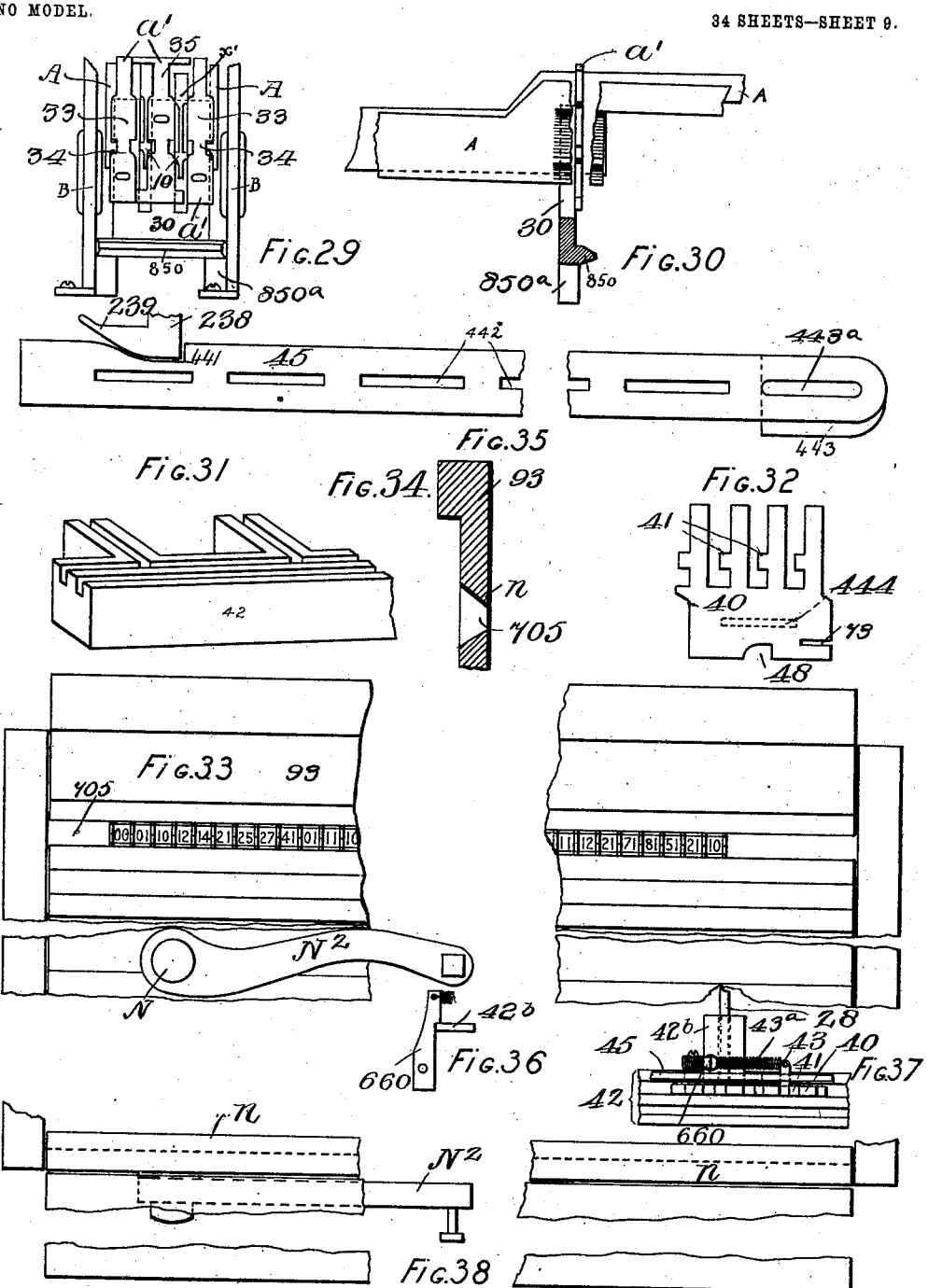

No. 758,708. PATENTED MAY 3, 1904.
A. SJOBERG.
VOTING MACHINE.
APPLICATION FILED JULY 7, 1894.
NO MODEL. 34 SHEETS—SHEET 10.
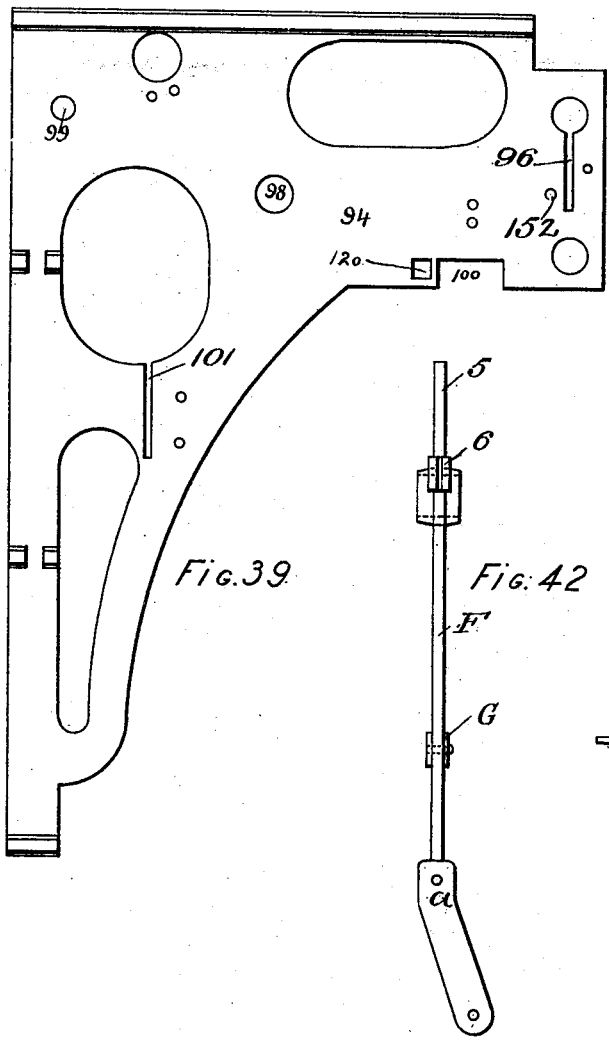
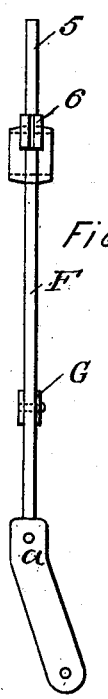
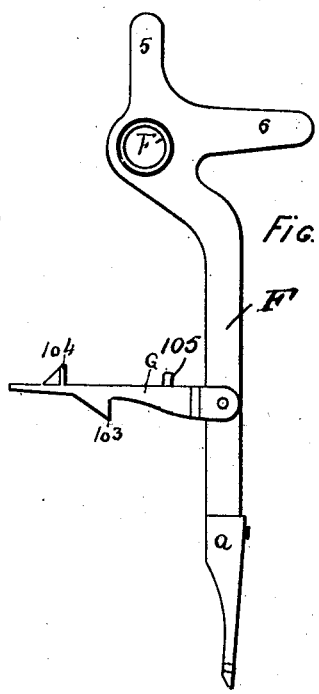
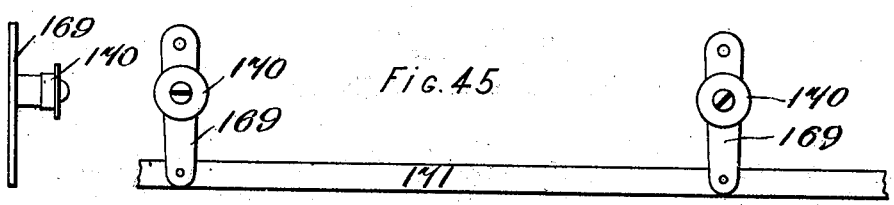
WITNESSES:
INVENTOR
Albert Sjoberg
BY
ATTORNEY.

No. 758,708. PATENTED MAY 3, 1904.
A. SJOBERG.
VOTING MACHINE.
APPLICATION FILED JULY 7, 1894.
NO MODEL. 34 SHEETS—SHEET 11.
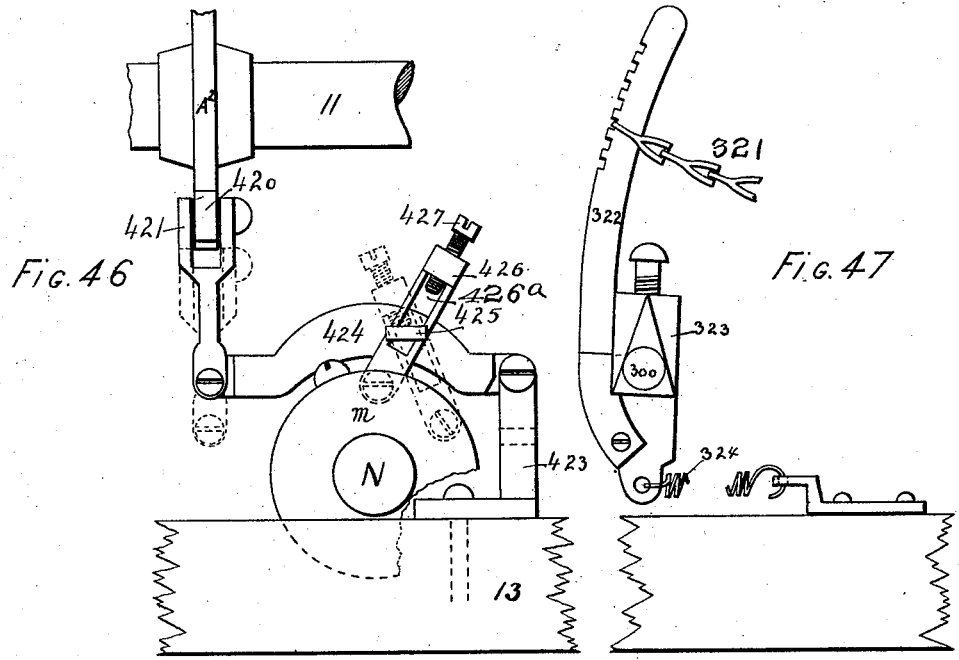
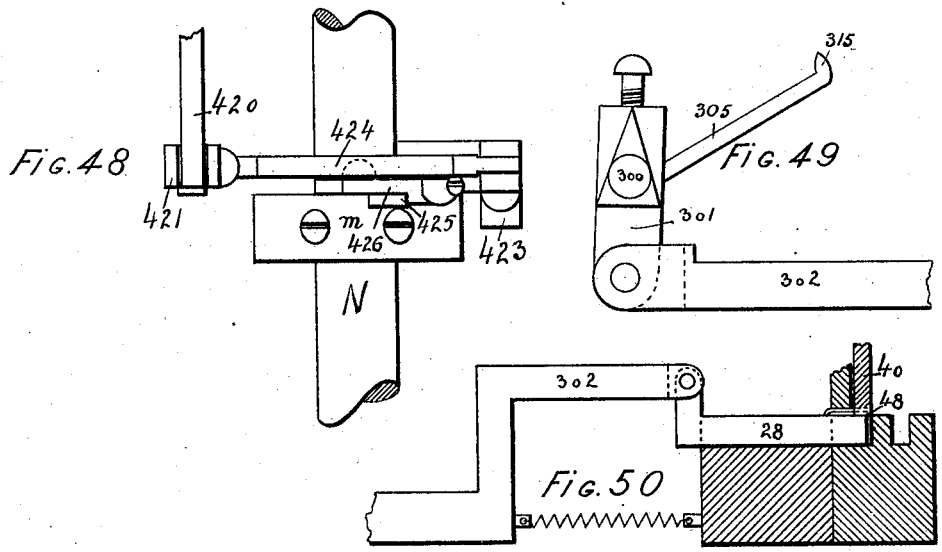
WITNESSES:
INVENTOR
Albert Sjoberg
BY
ATTORNEY No. 758,708. PATENTED MAY 3, 1904.
A. SJOBERG.
VOTING MACHINE.
APPLICATION FILED JULY 7, 1894.
NO MODEL. 34 SHEETS—SHEET 12.

WITNESSES:
O. F. Dawson
L. D. Erion

INVENTOR
Albert Sjoberg
BY
ATTORNEY.

THE NORRIS PETERS CO., PHOTO-LITHO., WASHINGTON, D. C.

No. 758,708. PATENTED MAY 3, 1904.
A. SJOBERG.
VOTING MACHINE.
APPLICATION FILED JULY 7, 1894.
NO MODEL. 34 SHEETS—SHEET 13.
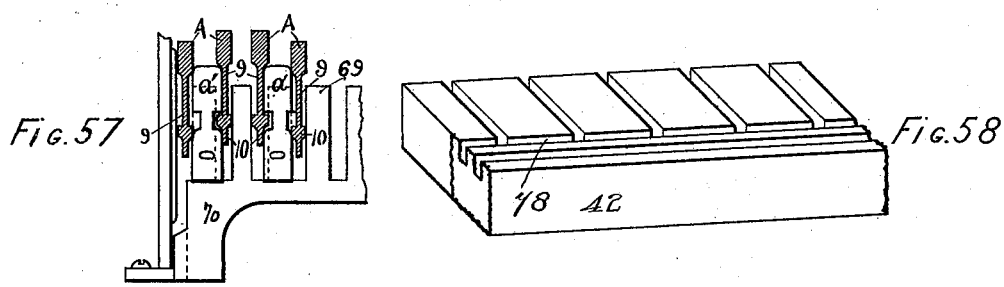
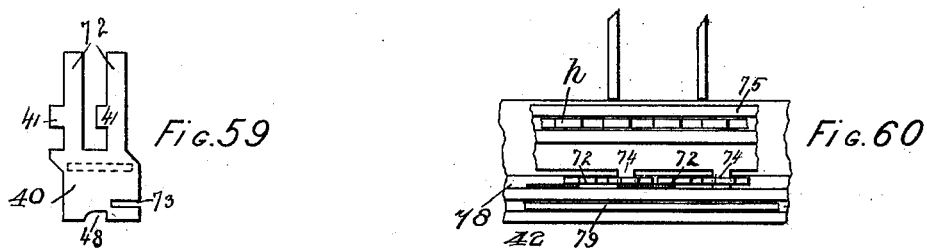
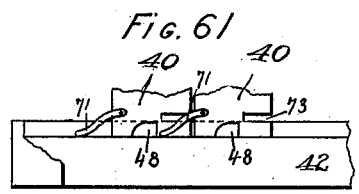
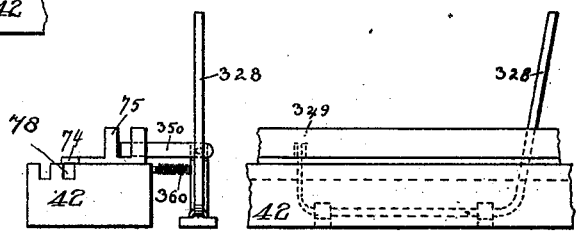
WITNESSES:
INVENTOR
Albert Sjoberg
BY
ATTORNEY.

No. 758,708. PATENTED MAY 3, 1904.
A. SJOBERG.
VOTING MACHINE.
APPLICATION FILED JULY 7, 1894.
NO MODEL. 34 SHEETS—SHEET 14.

WITNESSES:
O. F. Toulon
L. D. Erion

INVENTOR
Albert Sjoberg
BY C. W. Sues
ATTORNEY.

THE NORRIS PETERS CO., PHOTO-LITHO., WASHINGTON, D. C.

No. 758,708. PATENTED MAY 3, 1904.
A. SJOBERG.
VOTING MACHINE.
APPLICATION FILED JULY 7, 1894.
NO MODEL. 34 SHEETS—SHEET 15.
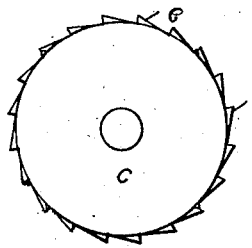
Fig.72
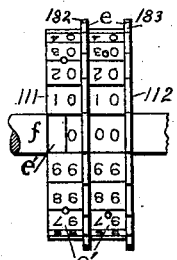
Fig.73
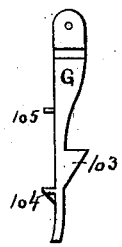
Fig.74
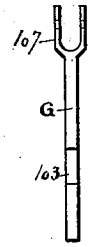
Fig.75
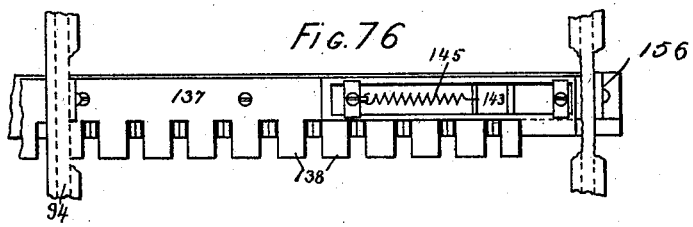
Fig.76
Fig.77.
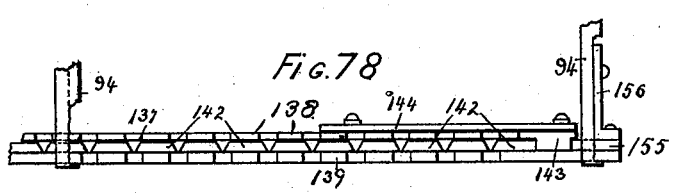
Fig.78
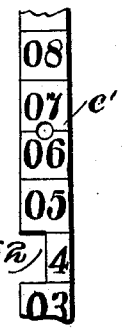
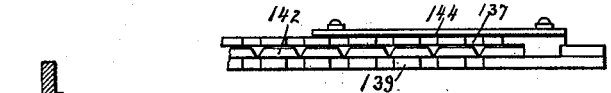
Fig.79
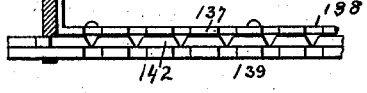
Fig.80
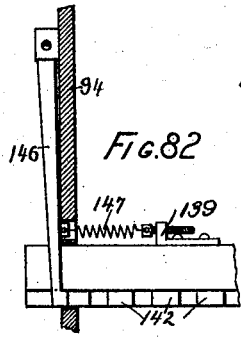
Fig.81 Fig.82
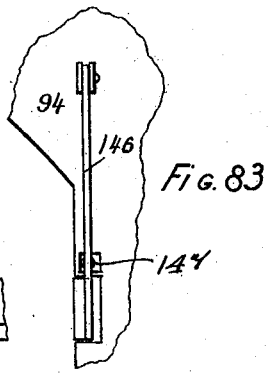
Fig.83
WITNESSES:
O. F. Dauran
L. D. Erion
INVENTOR
Albert Sjoberg,
BY G. W. Sues
ATTORNEY.

No. 758,708. PATENTED MAY 3, 1904.
A. SJOBERG.
VOTING MACHINE.
APPLICATION FILED JULY 7, 1894.
NO MODEL. 34 SHEETS—SHEET 16.
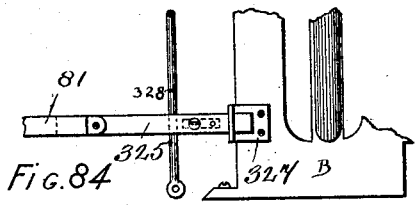
Fig.84
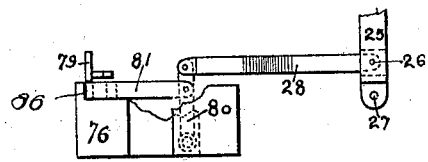
Fig.85
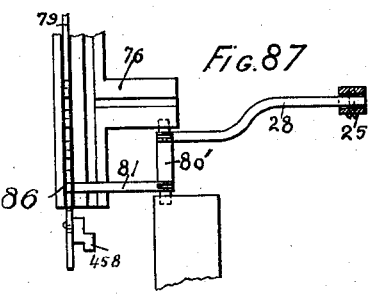
Fig.87
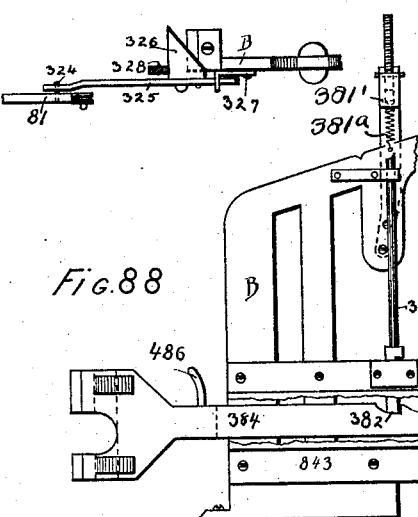
Fig.86
Fig.88
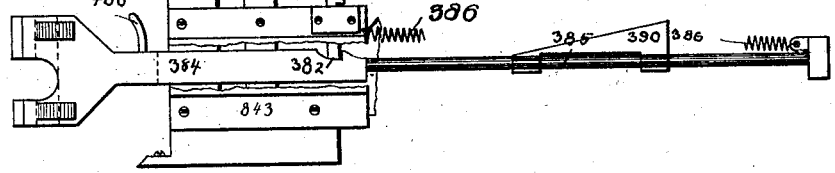
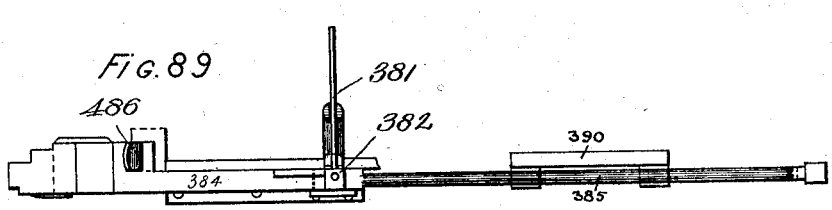
Fig.89
WITNESSES:
O. F. Douron
L. D. Erion
Albert Sjoberg
INVENTOR
BY G. W. Sues.
ATTORNEY.
THE NORRIS PETERS CO., PHOTO-LITHO., WASHINGTON, D. C.

No. 758,708. PATENTED MAY 3, 1904.
A. SJOBERG.
VOTING MACHINE.
APPLICATION FILED JULY 7, 1894.
NO MODEL. 34 SHEETS—SHEET 17.
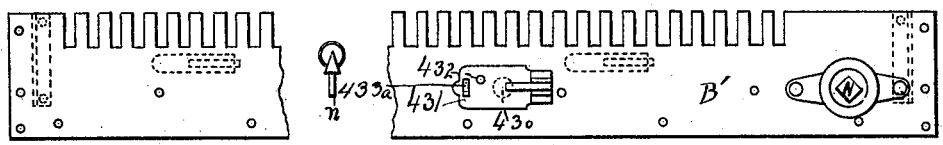
Fig. 90
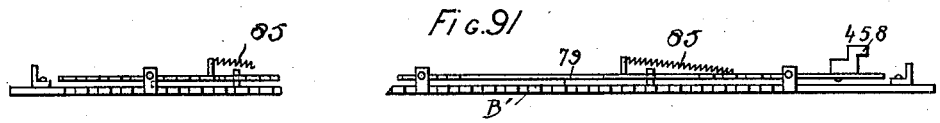
Fig. 91
Fig. 92
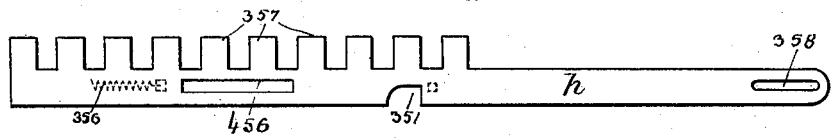
Fig. 93
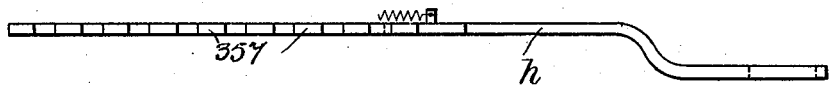
Fig. 94
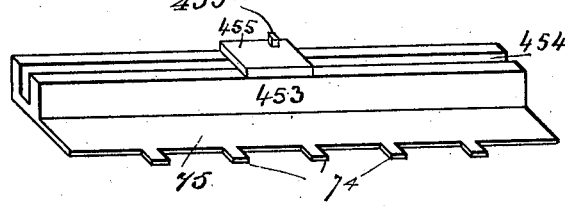
WITNESSES:
O. F. Douron
L. D. Erion
INVENTOR
Albert Sjoberg
BY
ATTORNEY.

No. 758,708. PATENTED MAY 3, 1904.
A. SJOBERG.
VOTING MACHINE.
APPLICATION FILED JULY 7, 1894.
NO MODEL. 34 SHEETS—SHEET 18.

WITNESSES:
O. F. Dauron
L. D. Erion

INVENTOR
Albert Sjoberg
BY
Attorney

No. 758,708. PATENTED MAY 3, 1904.
A. SJOBERG.
VOTING MACHINE.
APPLICATION FILED JULY 7, 1894.
NO MODEL. 34 SHEETS—SHEET 19.
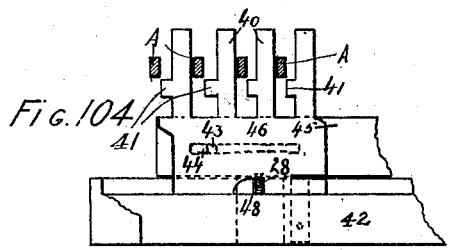
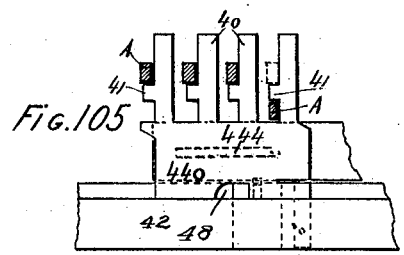
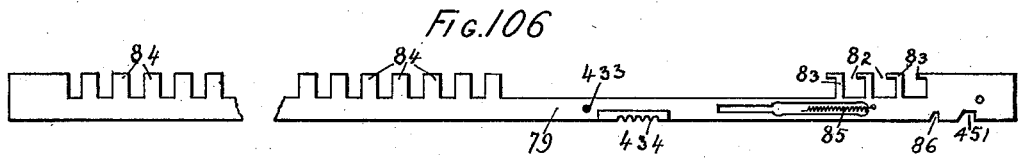
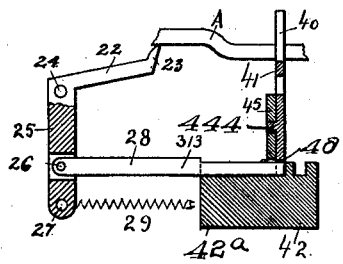
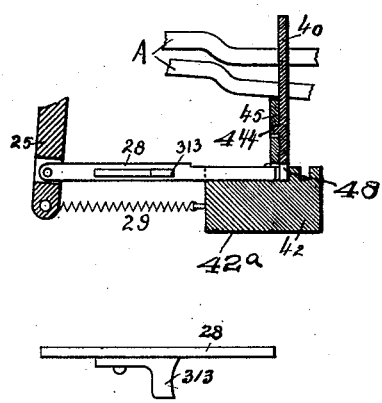
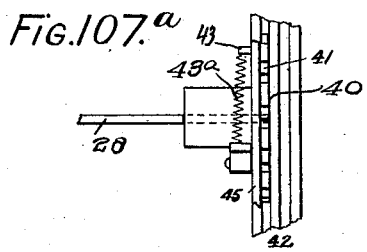
WITNESSES: INVENTOR
Albert Sjoberg
BY
ATTORNEY.

No. 758,708. PATENTED MAY 3, 1904.
A. SJOBERG.
VOTING MACHINE.
APPLICATION FILED JULY 7, 1894.
NO MODEL. 34 SHEETS—SHEET 20.

WITNESSES:
O. F. Dawson
L. D. Erion

INVENTOR
Albert Sjoberg
BY
ATTORNEY.

No. 758,708. PATENTED MAY 3, 1904.
A. SJOBERG.
VOTING MACHINE.
APPLICATION FILED JULY 7, 1894.
NO MODEL. 34 SHEETS—SHEET 21.

WITNESSES:
O. F. Dowson
L. D. Erion

INVENTOR
Albert Sjoberg
BY
ATTORNEY.

No. 758,708. PATENTED MAY 3, 1904.
A. SJOBERG.
VOTING MACHINE.
APPLICATION FILED JULY 7, 1894.
NO MODEL. 34 SHEETS—SHEET 22.
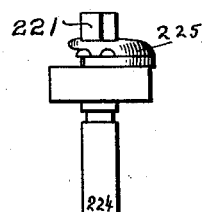
Fig.125
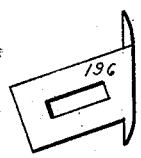
Fig.126
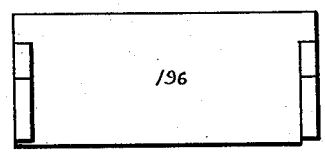
Fig.127
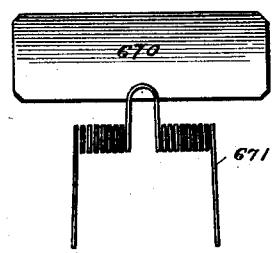
Fig.128
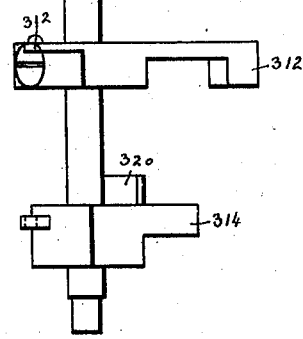
Fig.129
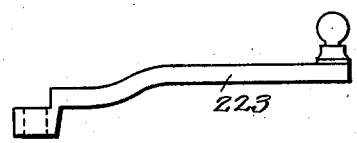
Fig.130
Fig.131
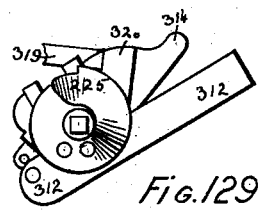
Fig.132
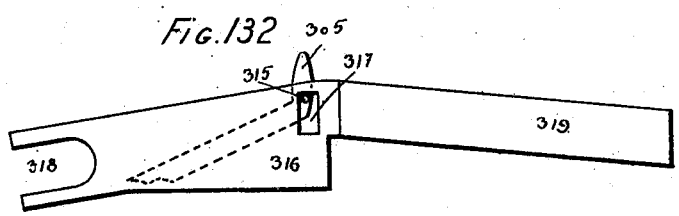
WITNESSES:
O. F. Dowson
L. D. Erion
INVENTOR
Albert Sjoberg
BY G. W. Sues
ATTORNEY.
THE NORRIS PETERS CO., PHOTO-LITHO., WASHINGTON, D. C.

No. 758,708. PATENTED MAY 3, 1904.
A. SJOBERG.
VOTING MACHINE.
APPLICATION FILED JULY 7, 1894.
NO MODEL. 34 SHEETS—SHEET 23.
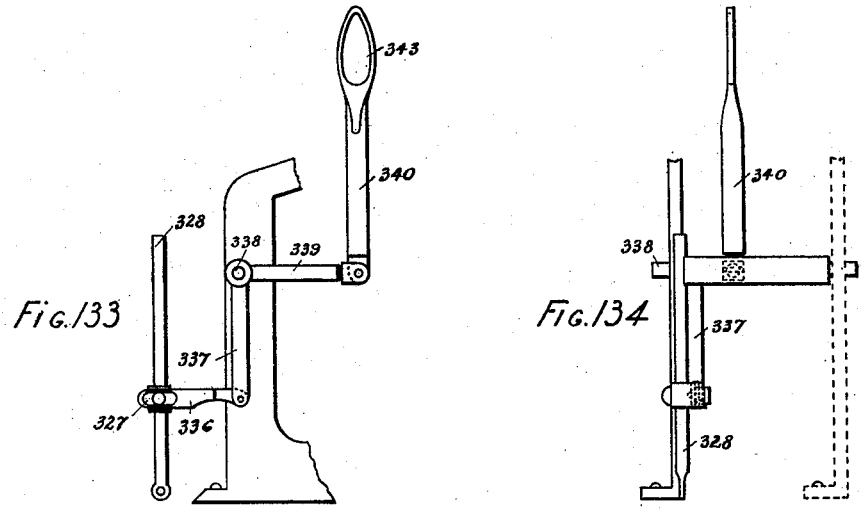
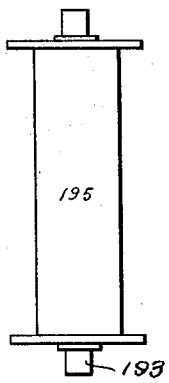
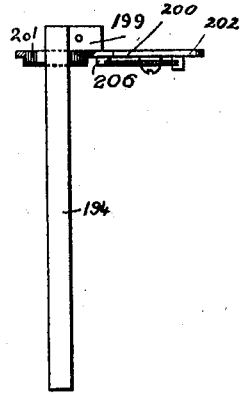
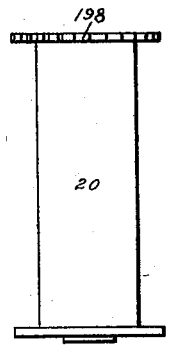
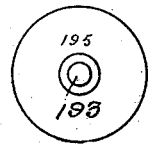
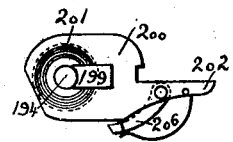
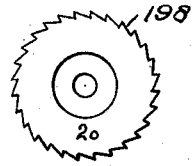

No. 758,708. PATENTED MAY 3, 1904.
A. SJOBERG.
VOTING MACHINE.
APPLICATION FILED JULY 7, 1894.
NO MODEL. 34 SHEETS—SHEET 24.
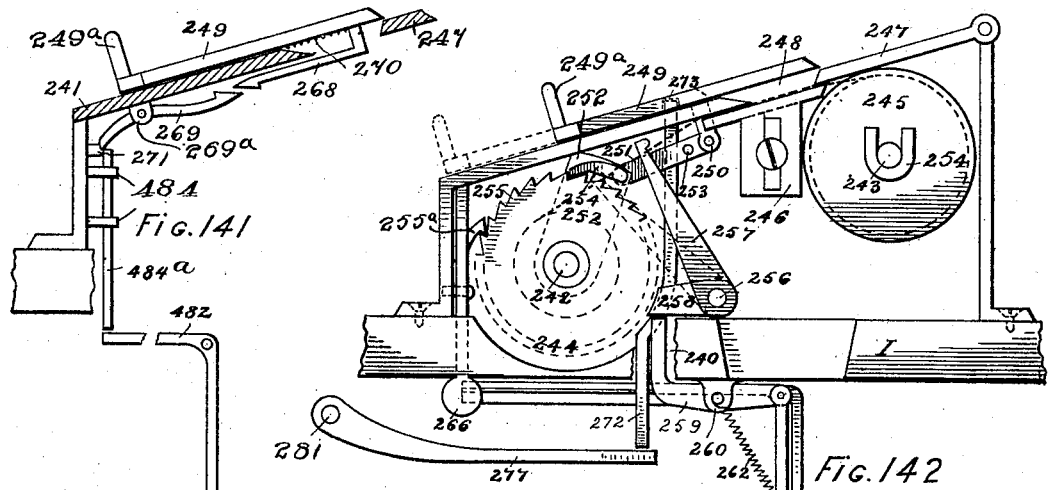
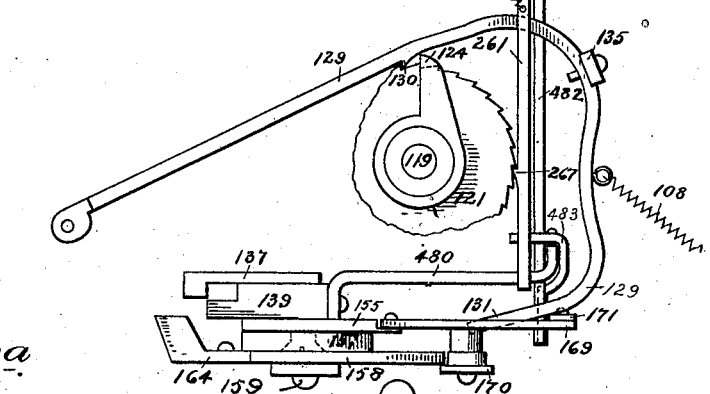
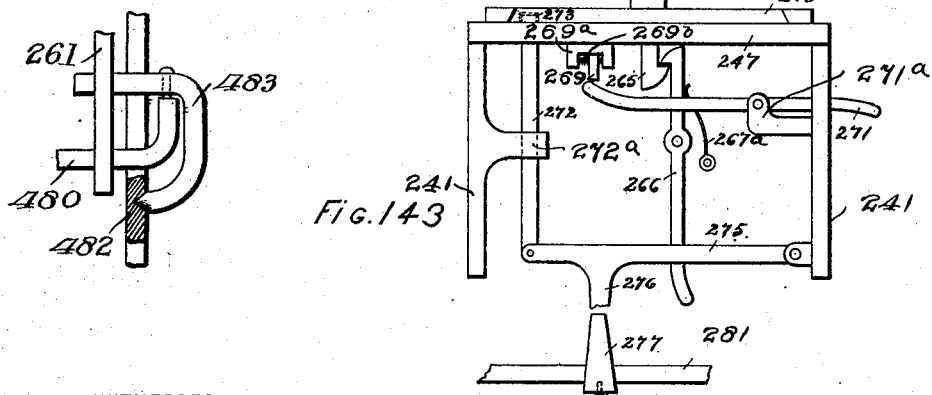
WITNESSES: INVENTOR
O. F. Douron Albert Sjoberg
L. D. Erion. BY G. W. Sues
ATTORNEY.

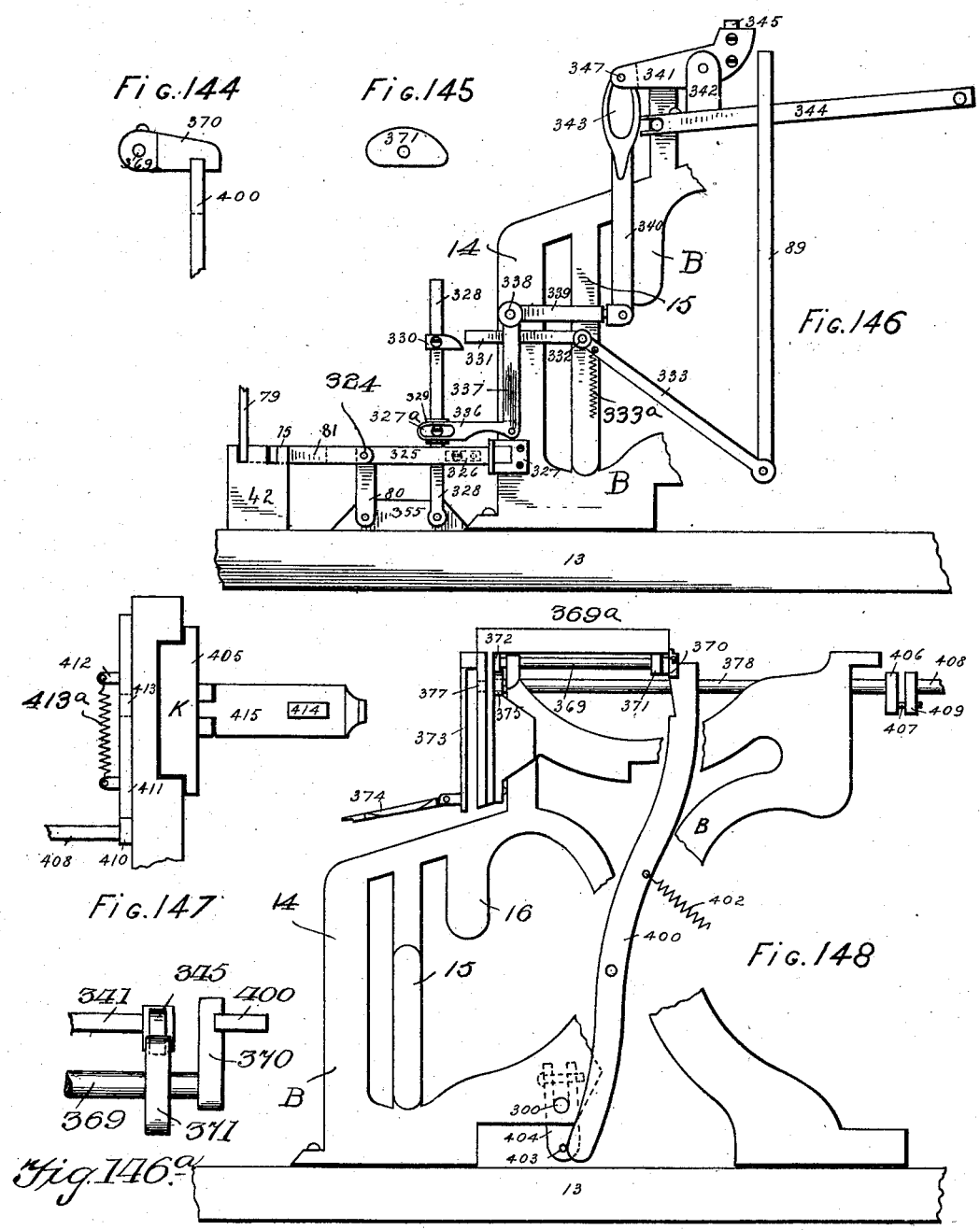

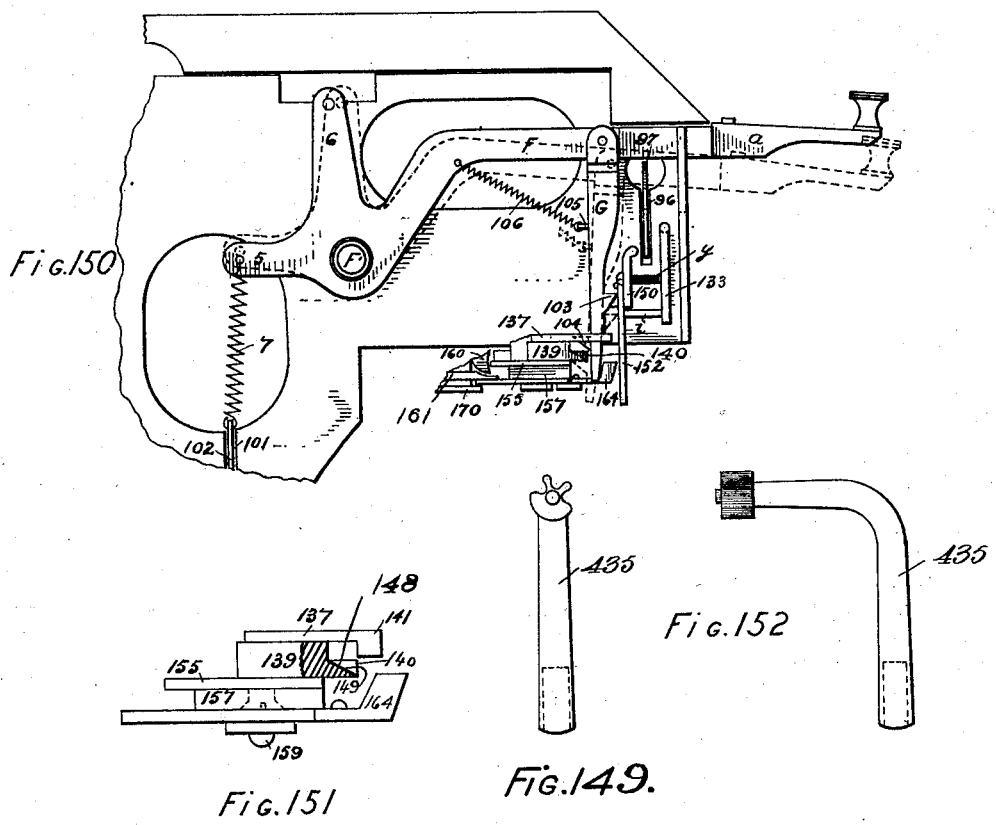

No. 758,708. PATENTED MAY 3, 1904.
A. SJOBERG.
VOTING MACHINE.
APPLICATION FILED JULY 7, 1894.
NO MODEL. 34 SHEETS—SHEET 27.

WITNESSES:
H. W. Pennock
A. M. Ellger

INVENTOR
Albert Sjoberg
BY
[signature]
ATTORNEY.

No. 758,708. PATENTED MAY 3, 1904.
A. SJOBERG.
VOTING MACHINE.
APPLICATION FILED JULY 7, 1894.
NO MODEL. 34 SHEETS—SHEET 28.

WITNESSES:
H. W. Pennock
A. M. Ellejer

INVENTOR
Albert Sjoberg
BY
ATTORNEY.

No. 758,708. PATENTED MAY 3, 1904.
A. SJOBERG.
VOTING MACHINE.
APPLICATION FILED JULY 7, 1894.
NO MODEL. 34 SHEETS—SHEET 29.

WITNESSES:
H. W. Pennock
A. M. Elkyer

INVENTOR
Albert Sjoberg
BY G. W. Sues
ATTORNEY.

No. 758,708. PATENTED MAY 3, 1904.
A. SJOBERG.
VOTING MACHINE.
APPLICATION FILED JULY 7, 1894.
NO MODEL. 34 SHEETS—SHEET 30.
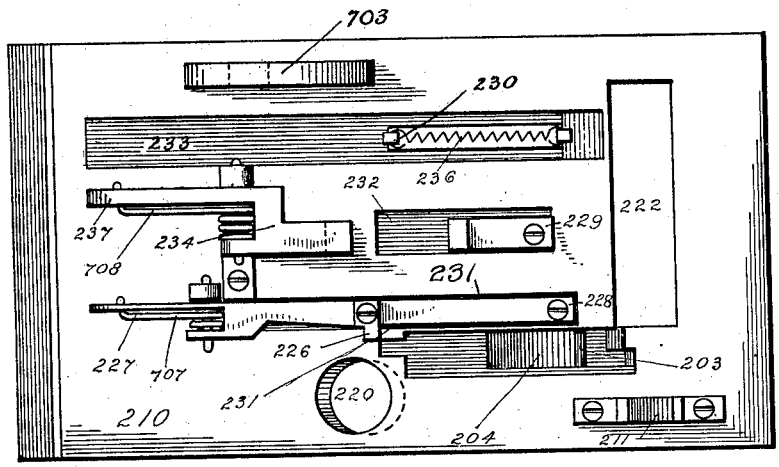
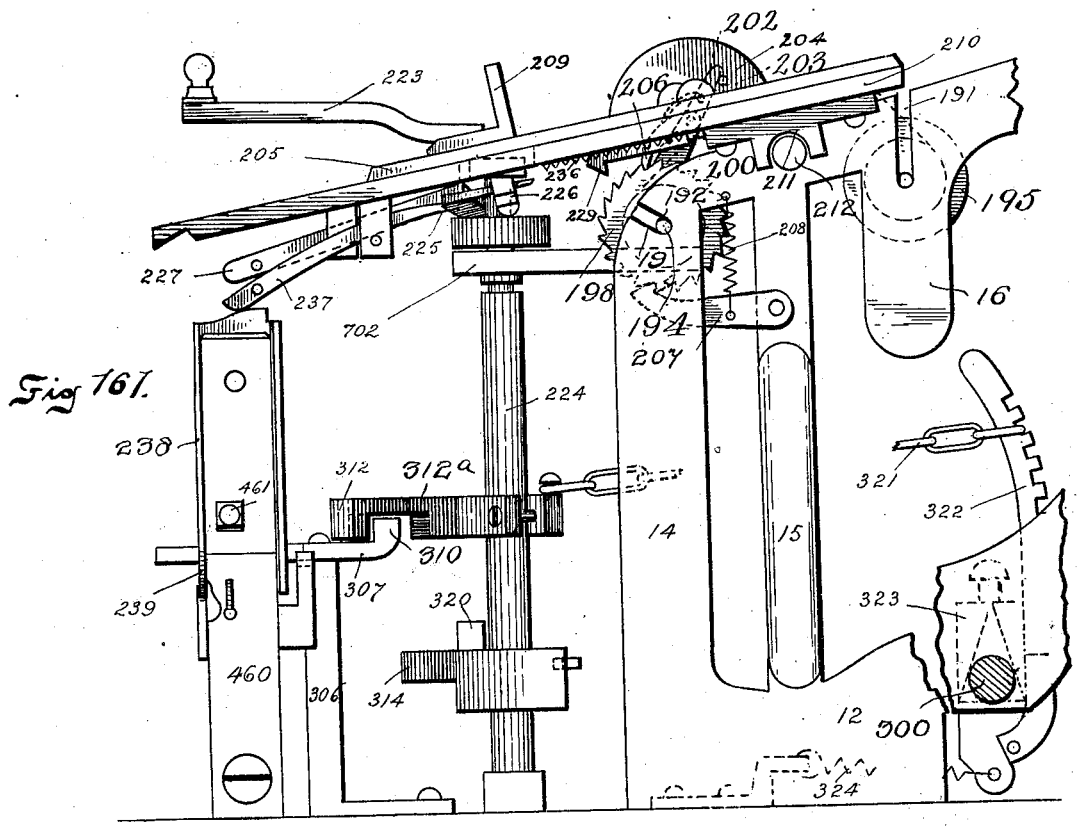
WITNESSES: INVENTOR
Albert Sjoberg
BY
ATTORNEY.

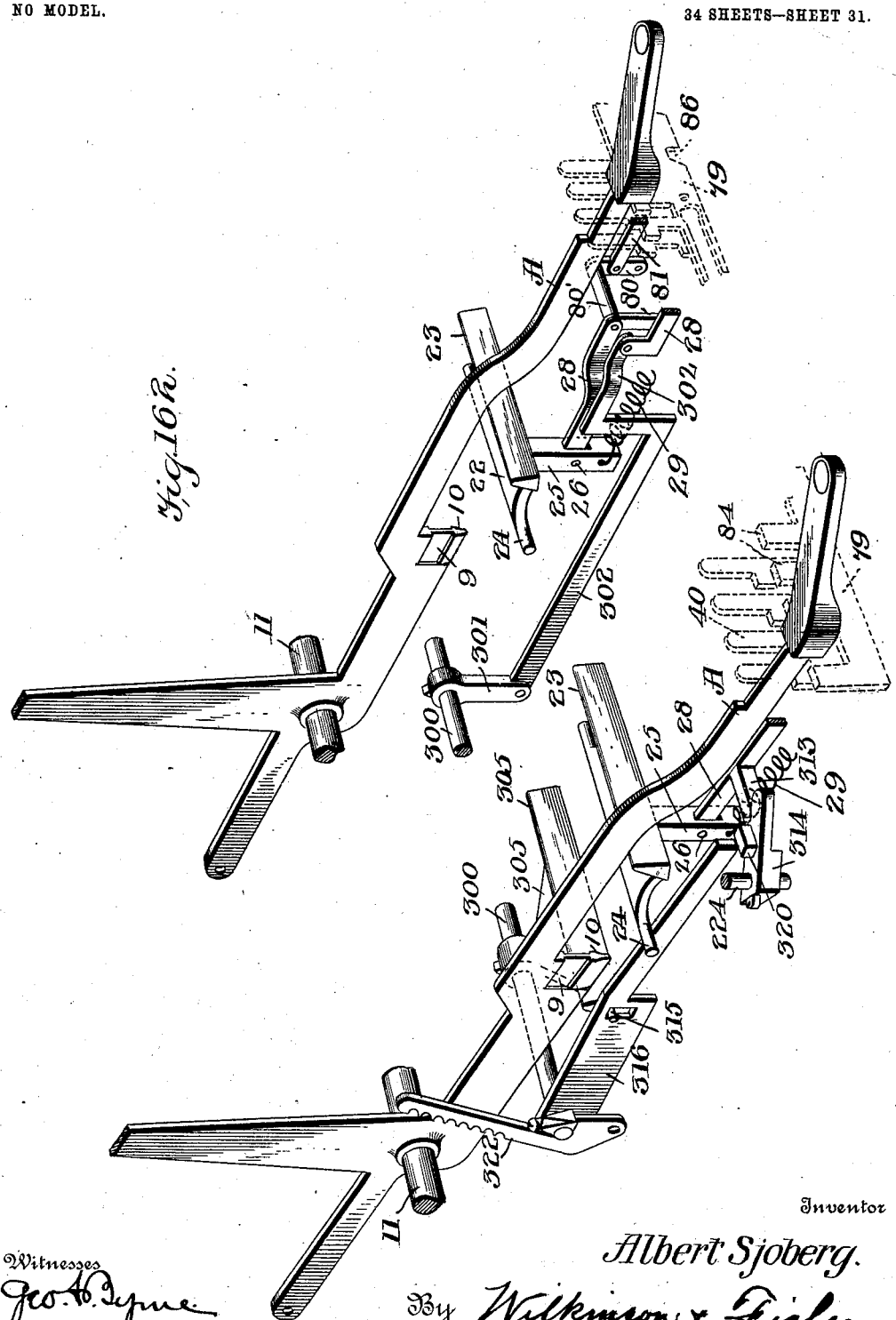

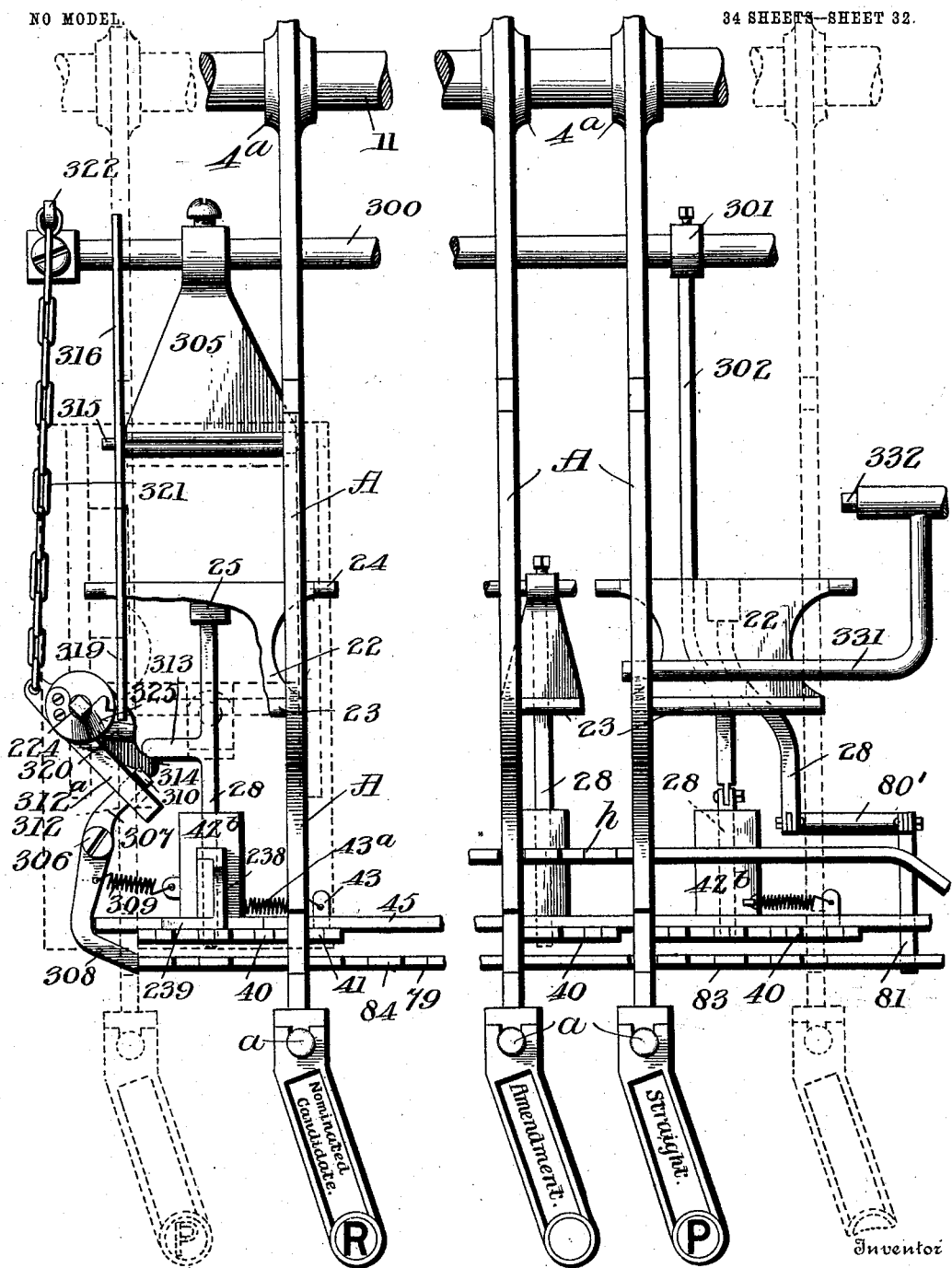

No. 758,708. PATENTED MAY 3, 1904.
A. SJOBERG.
VOTING MACHINE.
APPLICATION FILED JULY 7, 1894.
NO MODEL. 34 SHEETS—SHEET 33.
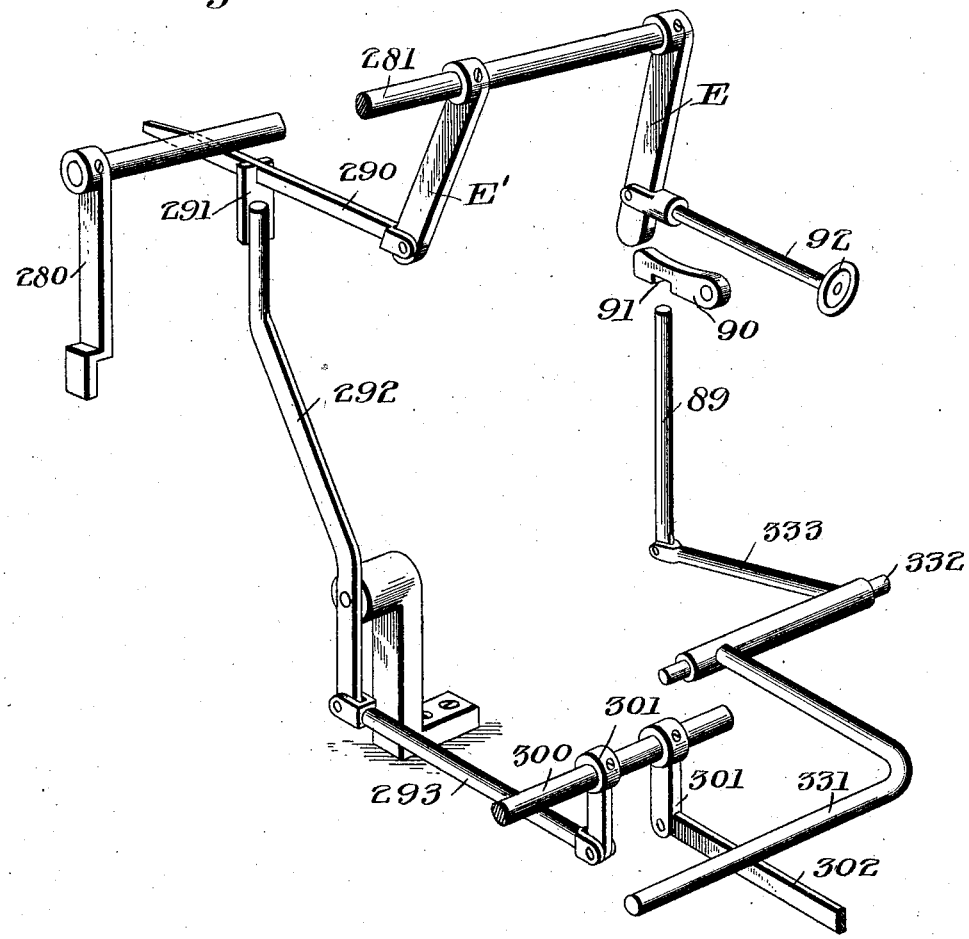
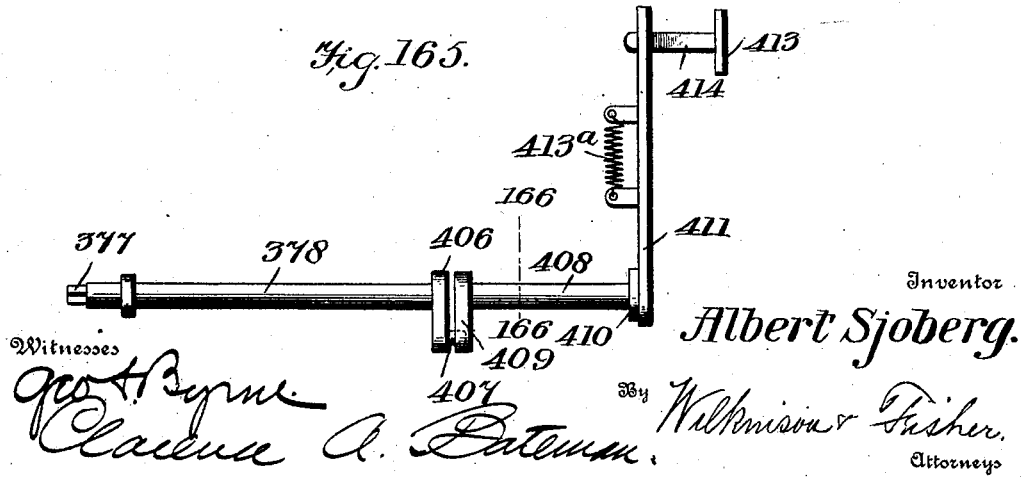
Inventor
Albert Sjoberg.

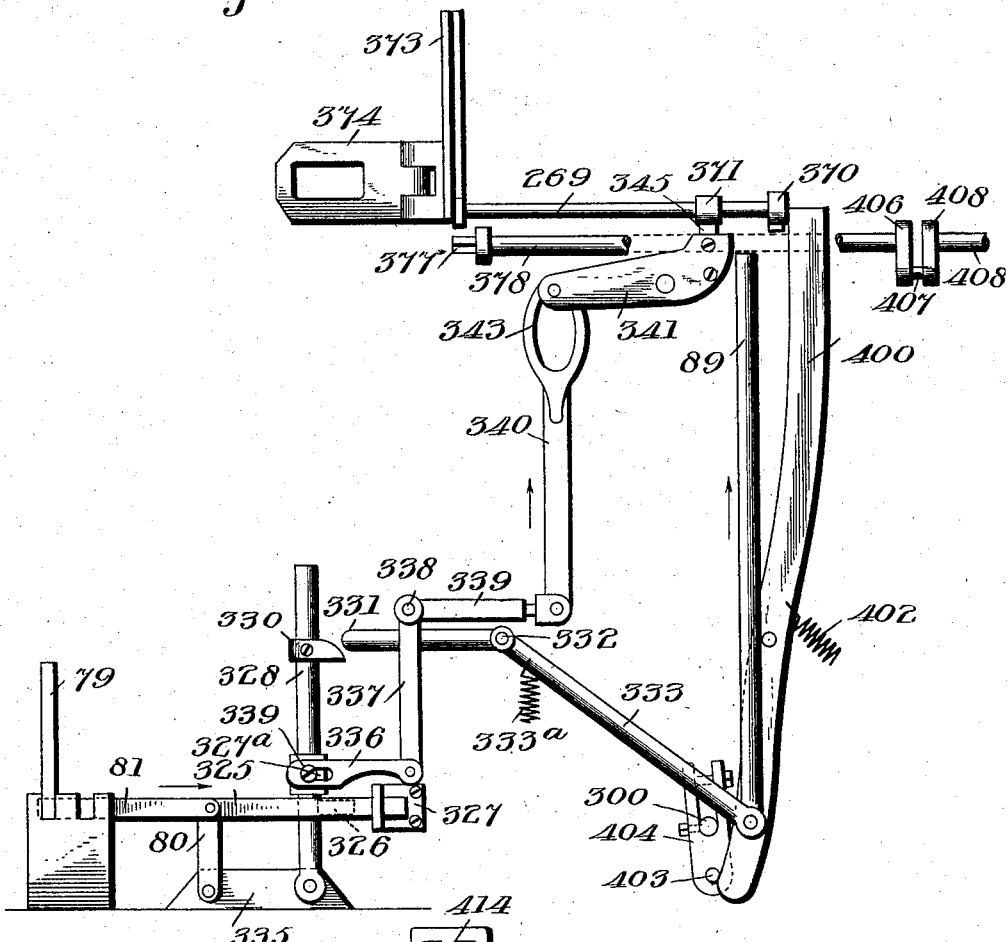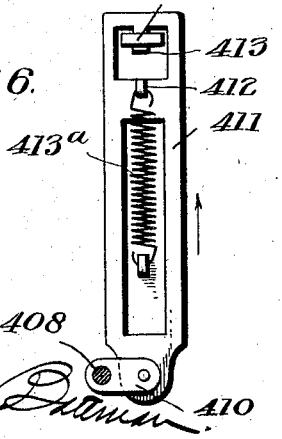

No. 758,708. Patented May 3, 1904.

UNITED STATES PATENT OFFICE.

ALBERT SJOBERG, OF OMAHA, NEBRASKA, ASSIGNOR, BY MESNE ASSIGN- MENTS, TO U. S. STANDARD VOTING MACHINE CO., OF ROCHESTER, NEW YORK, A CORPORATION OF NEW YORK.

VOTING-MACHINE.

SPECIFICATION forming part of Letters-Patent No. 758,708, dated May 3, 1904.

Application filed July 7, 1894. Serial No. 516,831. (No model.)

*To all whom it may concern:*

Be it known that I, ALBERT SJOBERG, residing at Omaha, in the county of Douglas and State of Nebraska, have invented certain useful Improvements in Automatic Vote-Registering Machines; and I do hereby declare that the following is a full, clear, and exact description of the invention, such as will enable others skilled in the art to which it appertains to make and use the same, reference being had to the accompanying drawings, which form a part of this specification.

My invention relates to improvements in voting-machines; and the object of my invention is to produce a machine by means of which the number of votes cast during an election for the various candidates shall be instantly and automatically registered and so arranged that repeating is impossible. This machine also includes an arrangement of instrumentalities by means of which the voter can vote a straight ticket, a mixed ticket, or an irregular ticket. The returns upon this machine are automatically given, and instantly after the last individual vote the whole returns can be at once obtained, as the votes are registered as soon as given, both in the total as well as in the individual voting systems or groups.

Figure 20:
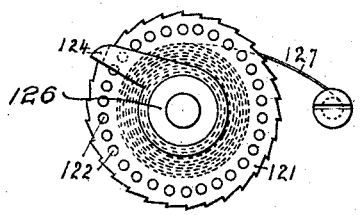
Figure 21:
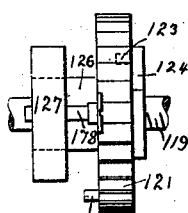
Figure 22:
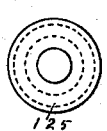
Figure 23:
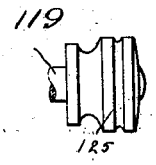
Figure 24:
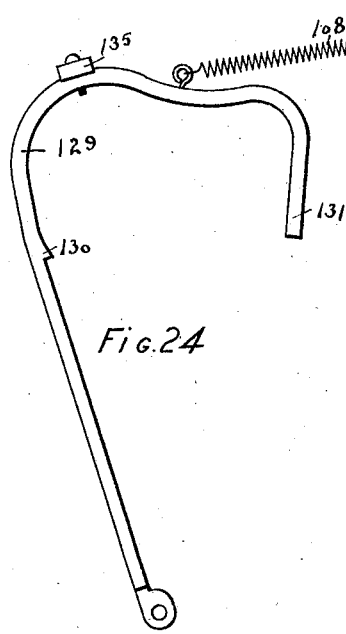
Figure 25:
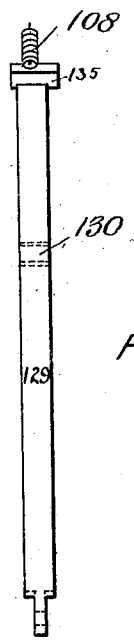
Figure 26:
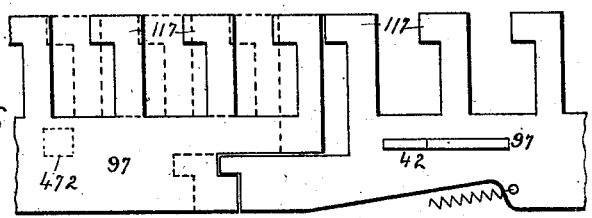
Figure 27:
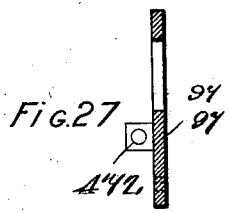
Figure 28:
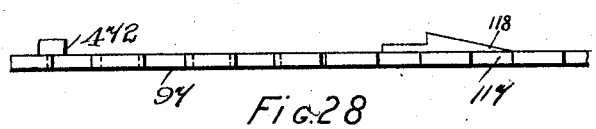

In the accompanying drawings, Figure 1 is a front view of a two-bank voting-machine embodying my invention. Fig. 2 is a broken top view of the same with the upper bank tilted back. Fig. 3 is a broken top view showing the arrangement of the upper bank. Fig. 4 is an end view of the lower bank, taken on the left of the machine, the casing and upper bank having been removed. Fig. 5 is an end view of the same, taken from the opposite end. Fig. 6 shows a detail of the main operating-shaft. Fig. 7 is a side elevation of the upper bank, the end casing having been removed. Fig. 8 is a side view of the lower gear of the resetting-shaft of the upper bank. Fig. 9 is a bottom view of the same. Fig. 10 shows the connection of the resetting-shaft of the upper bank with the main resetting-shaft. Fig. 11 is an end view of the gear-sector on the main shaft, which meshes with the resetting-shaft of the upper bank. Fig. 12 is a top view of the resetting-shaft for the upper bank. Fig. 13 is a top view of the lock guide-pawl and fastener, also disclosing the resetting-rod and movable stop-plate for the upper bank. Fig. 14 is an end view of the same. Fig. 15 is a top view of the guide-bar of the upper bank and related parts. Fig. 16 is a side view showing the stop-plate and regulating-plate. Fig. 17 is a side view of the releasing angle-bar for the locking-rack of the upper bank. Fig. 18 is a top view thereof. Fig. 19 is a side view of the locking-pawl for the regulating-wheel of the upper bank. Fig. 19$^a$ is a front view of the same. Fig. 20 is an end view of one of the spring-actuated regulating-wheels controlling the movements of the multicandidate-group keys of the upper bank. Fig. 21 is a side view of the same. Fig. 22 is an end view of the nut secured to the shaft of the regulating-wheel. Fig. 23 is a side view thereof. Fig. 24 is a side view of the operating-pawl for the regulating-wheel. Fig. 25 is a front view thereof. Figs. 26, 27, 28 show details of the movable locking-racks of the upper bank. Fig. 29 is a front view of the interlocking or limiting mechanism of the single-candidate-voting mechanism of the lower bank, the fastening-screws being removed. Fig. 30 is a side view thereof, partly in section. Fig. 31 is a fragmentary view showing the grooved guide-beam used on the left hand of the lower bank. Fig. 32 is a side view of one of the spring-actuated locking-racks of the lower bank for a single-candidate group. Fig. 33 is a broken rear view showing the registers of the upper bank and the rear resetting-crank. Fig. 34 is a cross-section of part of the frame. Fig. 35 is a broken view of the main resetting-bar of the lower bank. Fig. 36 is a detail view showing the bracket in the lower bank to which one of the locking-racks is attached by a spring, together with a covering-plate for part of the guide-beam. Fig. 37 is a fragmentary top view showing the guide-beam and locking key-rack. Fig. 38 is a top view of the rear resetting-crank, showing the rear casing partly broken away and tilted back.

Figure 51:
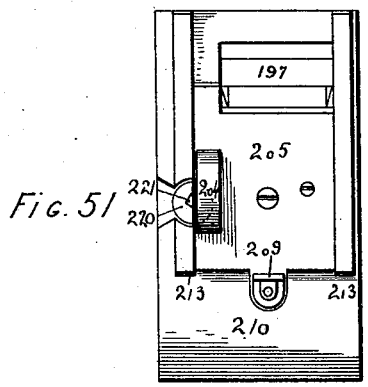
Figure 52:
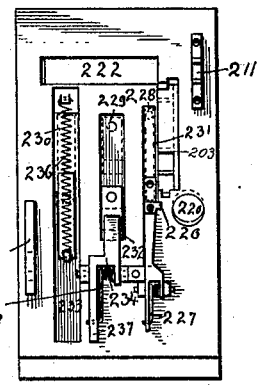
Figure 53:
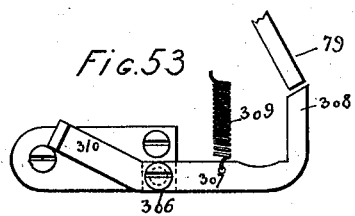
Figure 54:
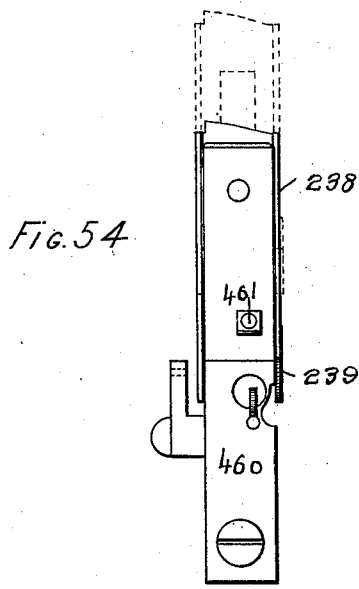
Figure 55:
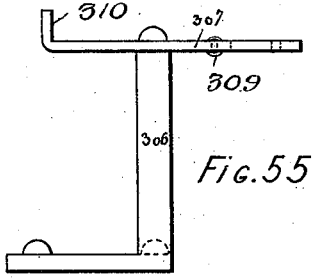
Figure 56:
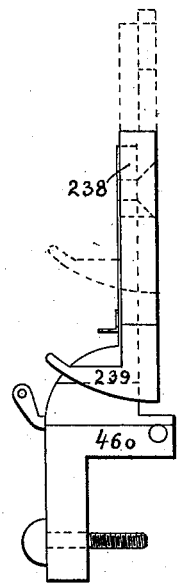
Figure 64:
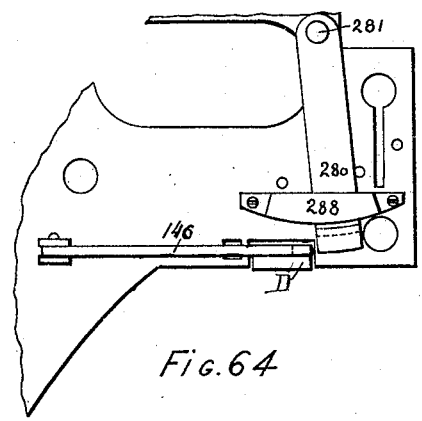
Figure 65:
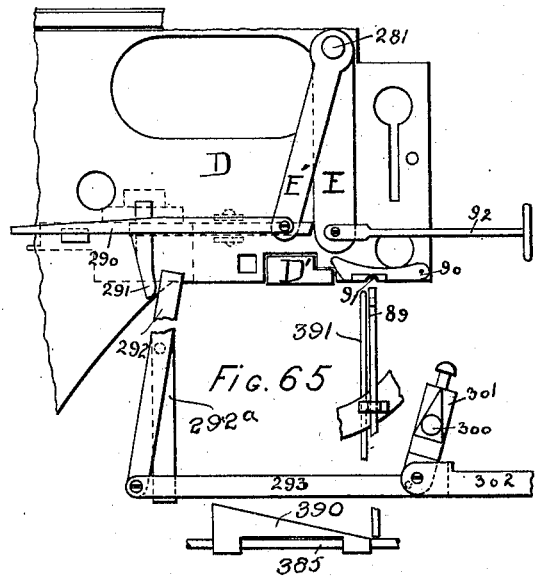
Figure 66:
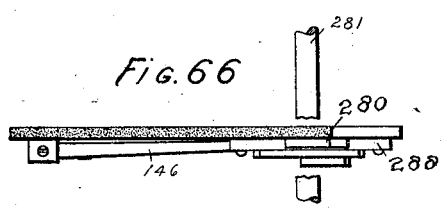
Figures 67, 68:
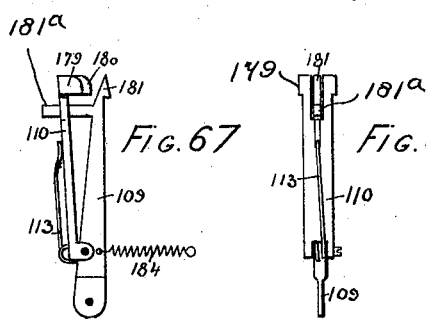
Figure 69:
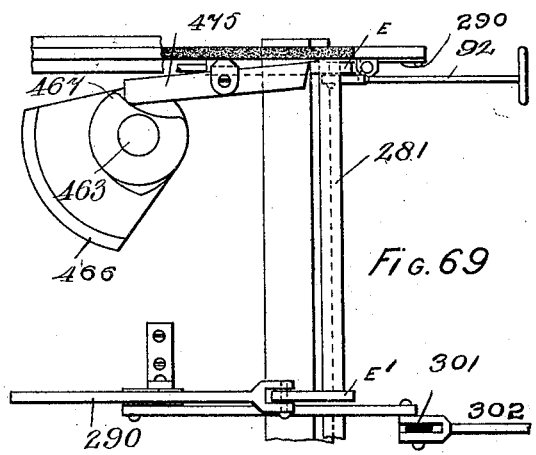
Figure 70:
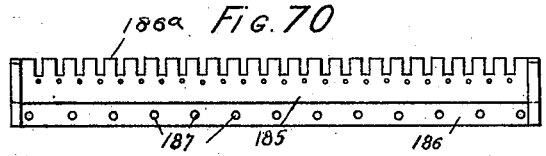
Figure 71:
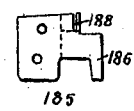
Figure 95:
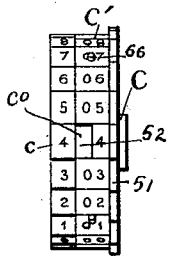
Figure 96:
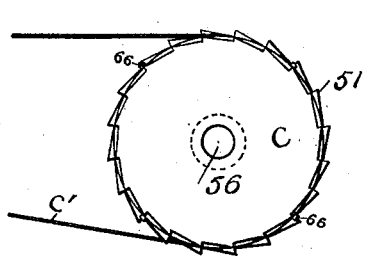
Figure 97:
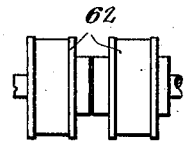
Figure 98:
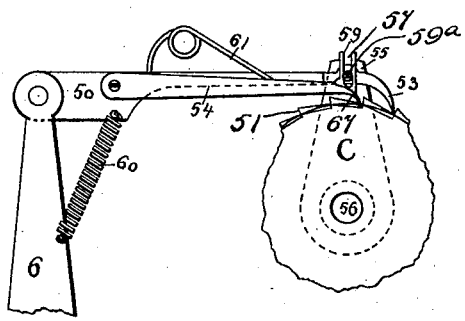
Figure 99:
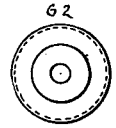
Figure 100:
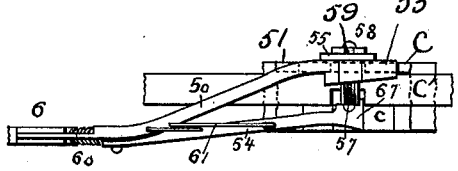
Figure 101:
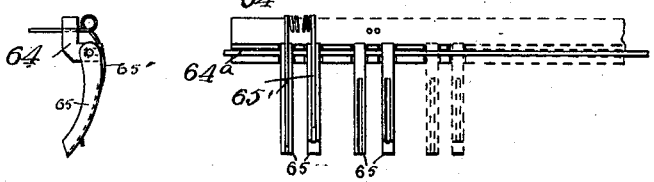
Figure 102:
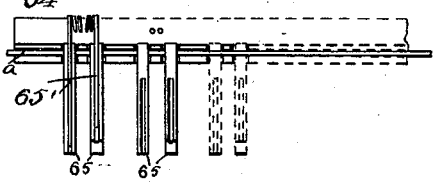
Figure 103:
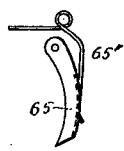
Figure 109:
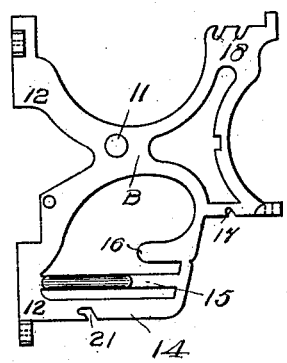
Figure 110:
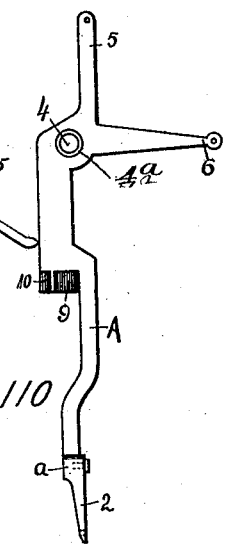
Figure 111:
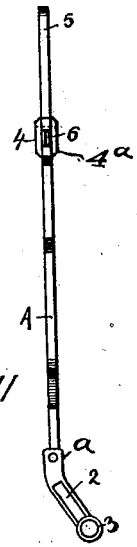
Figure 113:
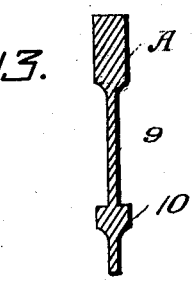
Figure 112:
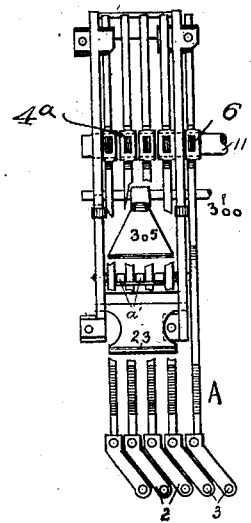
Figure 114:
Figures 115, 116, 117:
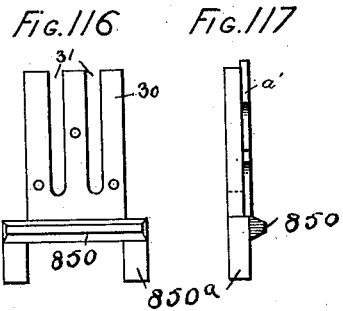
Figure 118:
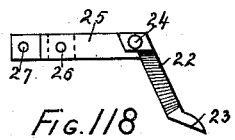
Figure 119:
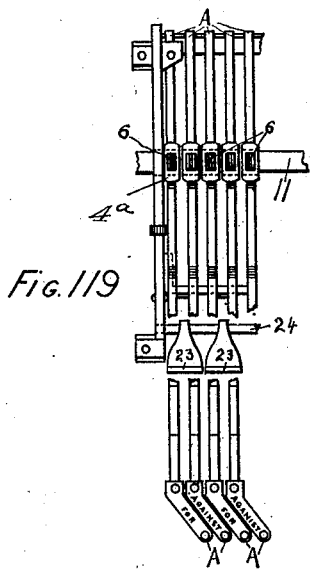
Figure 120:
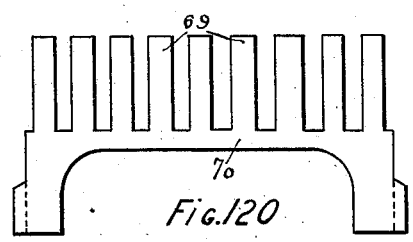
Figure 121:
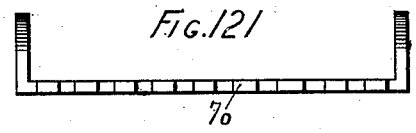
Figure 122:
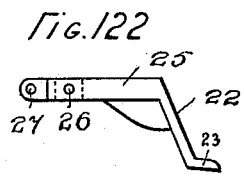
Figure 123:
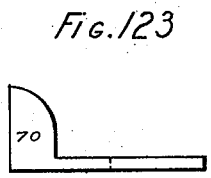
Figure 124:
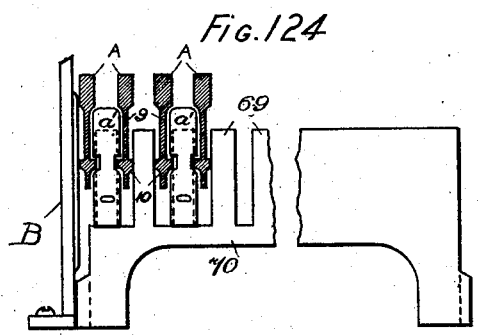
Figure 155:
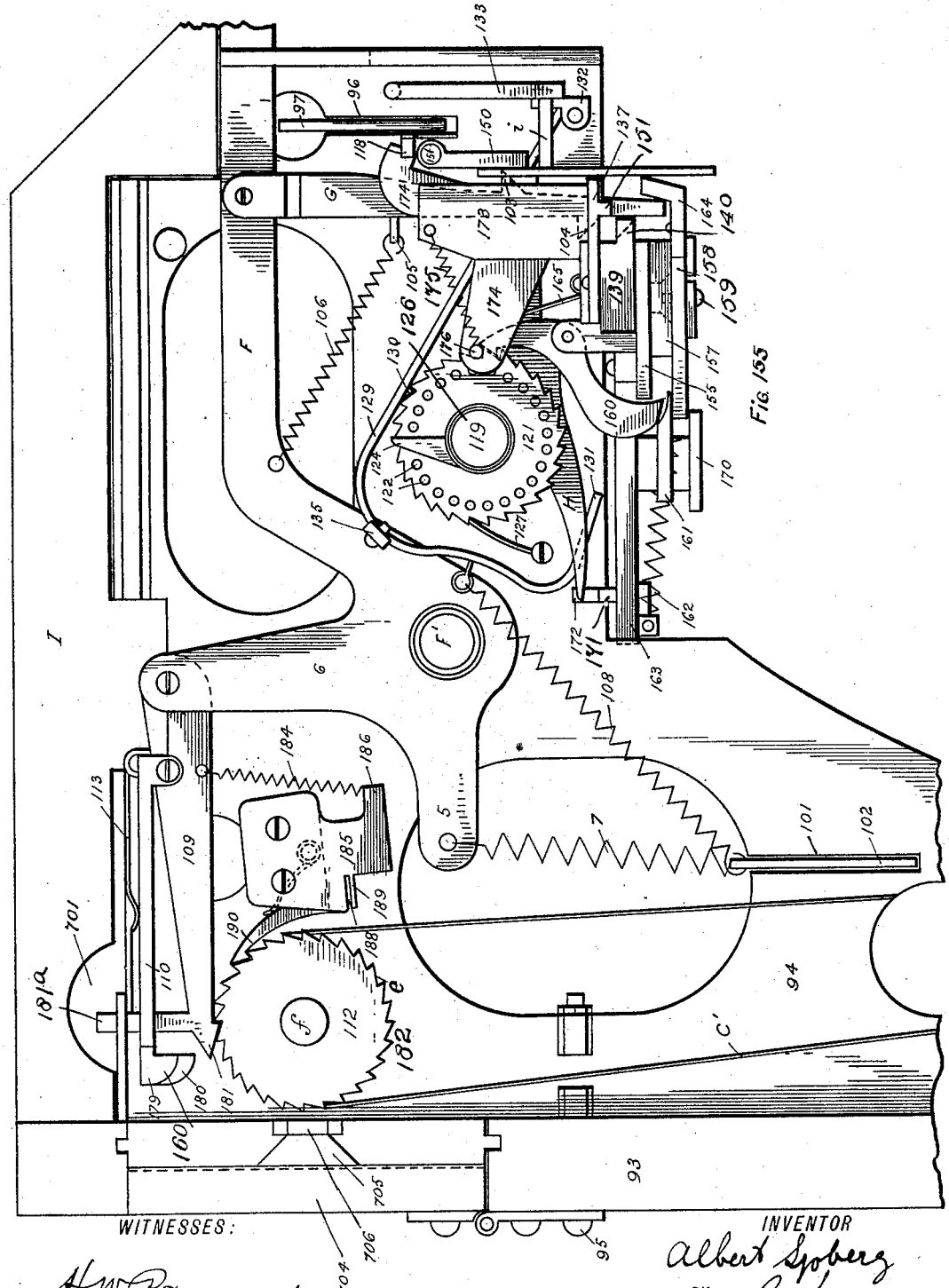
Figure 156:
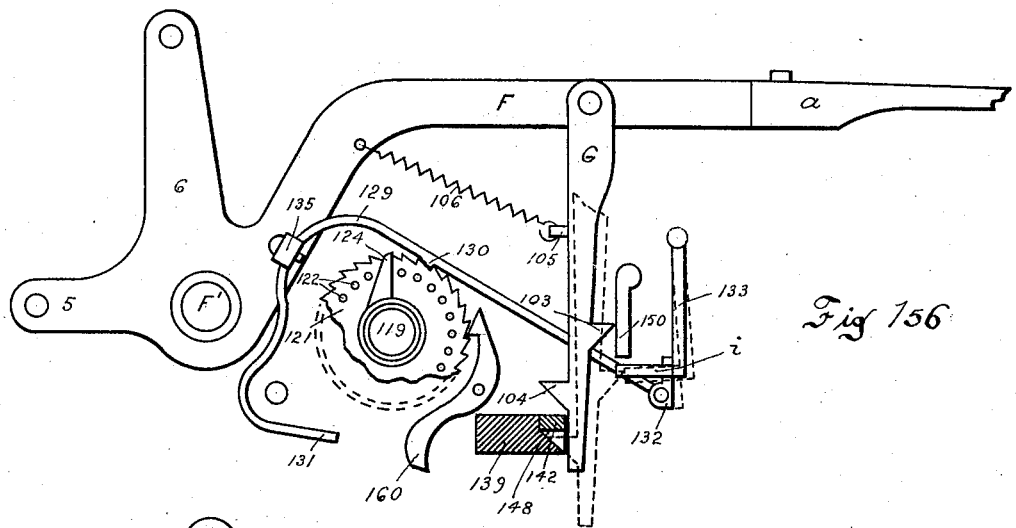
Figure 157:
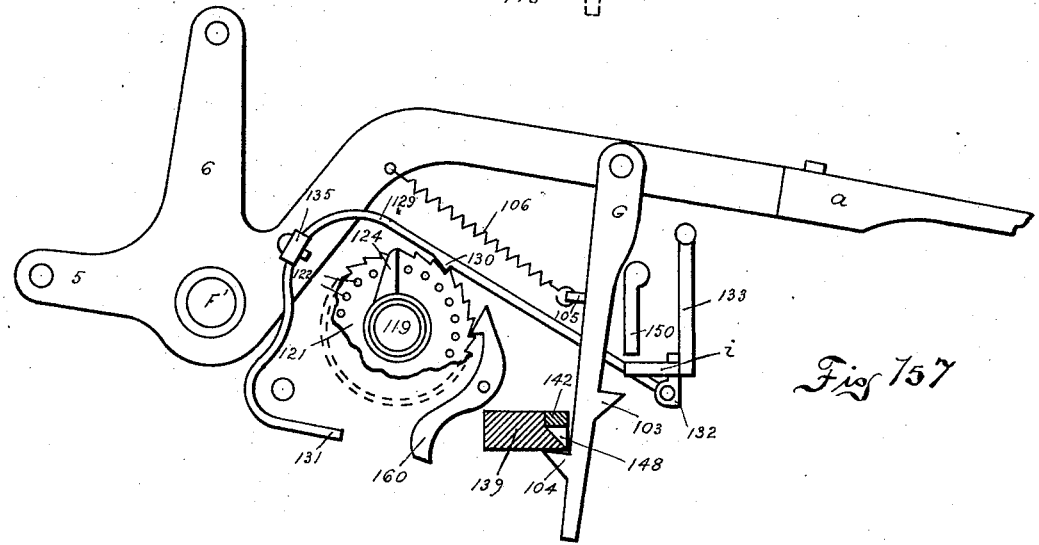
Figure 158:
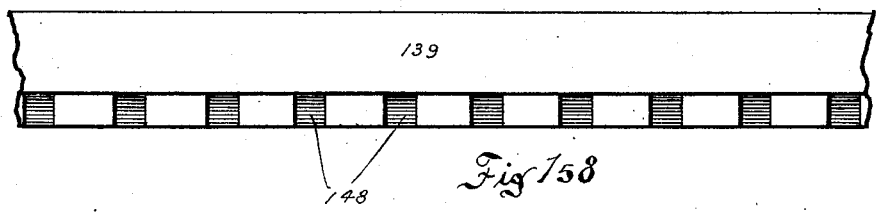
Figure 159:
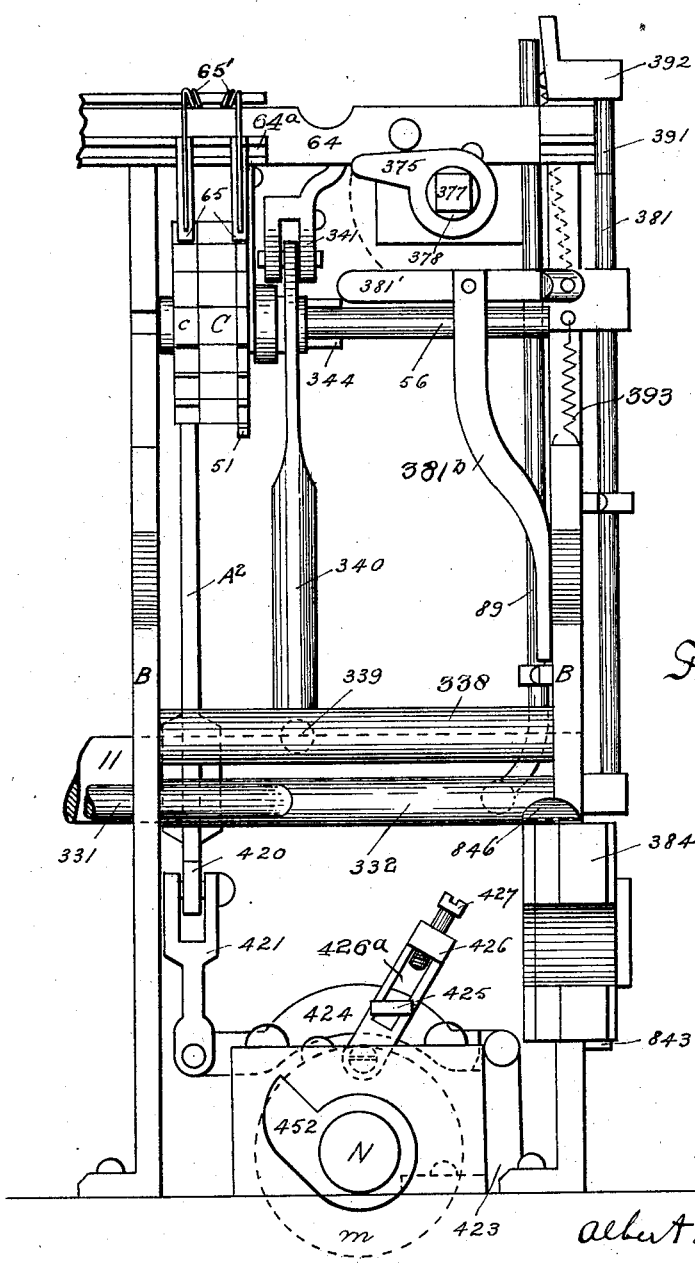

Fig. 39 is a side view of one of the supporting-brackets for the upper bank. Fig. 40 is a side view of the bracket and spring fastener for the resetting-plate of the upper bank. Fig. 41 is a top view of the same with the spring removed. Fig. 42 is a top view of one of the voting-keys of the upper bank. Fig. 43 is a side view of the same. Fig. 44 is a side view of one of the guide-pulleys for the resetting-plate of the upper bank. Fig. 45 is a bottom plan view showing two of said pulleys and the connecting-bar. Fig. 46 is a fragmentary front view showing the main resetting-shaft and means for actuating the registering mechanism to show the total number of votes cast. Fig. 47 is a side view showing part of the interlocking mechanism of the irregular-voting device of the lower bank. Fig. 48 is a top view of the parts shown in Fig. 46. Figs. 49, 50 show details of the interlocking and releasing mechanism of the lower bank. Fig. 51 shows a top view of one of the irregular-voting mechanisms of the lower bank, the same being shown in an open position. Fig. 52 is a bottom view of the same. Fig. 53 is a top view of the locking-dog for one of the irregular-voting mechanisms of the lower bank. Fig. 54 is a side view of part of the resetting mechanism of the irregular-voting devices of the lower bank. Fig. 55 is a side view of the locking-dog shown in Fig. 53. Fig. 56 is a front view of the means shown in Fig. 54 for resetting the irregular-voting devices of the lower bank. Fig. 57 is a front view illustrating the arrangement of the voting-keys for the questions or amendments and the interlocking or limiting devices therefor, said keys being shown in section and two of them depressed. Fig. 58 is a view of the grooved guide-beam used on the right of the lower bank. Fig. 59 is a side view of one of the short or stub locking-racks for the questions or amendments voting mechanisms. Fig. 60 is a top view of the guide-block and locking-racks used on the right of the lower bank. Fig. 61 is a view of the stub locking-racks as held in the grooved beam or base, portions being removed. Fig. 62 shows a side view of the locking-lever operated by the key-guard and its attachments. Fig. 63 is a front view of the same. Fig. 64 is a left-hand side view of part of one of the main brackets of the upper bank, showing the end locking mechanism. Fig. 65 is a similar view of the main bracket and related parts on the other side of the upper bank. Fig. 66 is a top view, partly in section, of the parts shown in Fig. 64. Fig. 67 is a side view of one of the duplex pawls operating the registering-wheels of the upper bank. Fig. 68 is a top view of the same. Fig. 69 is a top view, partly in section, of the parts shown in Fig. 65. Fig. 70 is a top view of the pawl-rack for the registering-wheels of the upper bank. Fig. 71 is an end view of the same. Fig. 72 is an end view of one of the registering-wheels of the upper bank. Fig. 73 is a side view of a pair of said registering-wheels. Fig. 74 is a side view of one of the locking key-dogs of the upper bank. Fig. 75 is a front view of the same. Fig. 76 is a top view of the guide-bar for the sliding blocks of the upper bank, disclosing the spring-actuated stop. Fig. 77 is a partial top view of one of the registering-tapes for the upper bank. Figs. 78, 79, 80, 81 show various details of the guide-bar and blocks of the upper bank. Fig. 82 is a top view showing the spring-actuated confining-arm for the guide-blocks located on the left of the upper bank. Fig. 83 is a side view of the same. Fig. 84 is a side view of the levers for releasing the main locking-bar. Fig. 85 is a side view of the locking and releasing mechanism for the main locking-bar. Fig. 86 is a top view of the part shown in Fig. 84. Fig. 87 is a top view of the parts shown in Fig. 85. Fig. 88 is a side view of one of the locking mechanisms of the lower bank. Fig. 89 is a top view thereof. Fig. 90 is a broken front view of the outer key guide-plate of the lower bank. Fig. 91 is a top view thereof, showing the main or straight-ticket locking-bar in position. Fig. 92 is a side view of the locking-bar for the questions or amendments voting mechanisms. Fig. 93 is a top view of the same. Fig. 94 is a perspective view of one of the guide-blocks for said mechanism. Fig. 95 is a front view of one of the pairs of registering-wheels for the lower bank. Fig. 96 is a side view of the same. Fig. 97 is a side view showing the guide-pulleys for the registering-tape. Fig. 98 is a broken side view showing part of one of the key-levers of the lower bank, part of one of the registering-wheels, and the duplex connecting-pawl. Fig. 99 is an end view of one of the guide-pulleys for the registering-tape. Fig. 100 is a top view of the parts shown in Fig. 98. Fig. 101 is a side view of a spring-pawl and support therefor used to prevent backward motion of the registering-wheels of the lower bank. Fig. 102 shows a top view of a number of these pawls secured to a retaining-bar. Fig. 103 is a detail view of one of said pawls. Fig. 104 shows a number of keys (constituting a group) of the lower bank in section and a locking-rack therefor, the parts being shown in an open non-locking position. Fig. 105 is a view of the same parts after one of the keys has been depressed and the locking-rack operated. Fig. 106 is a side view of the main or straight-ticket locking-bar. Fig. 107 is a view, partly in section, showing one of the operating-keys and the rack locking and releasing mechanism. Fig. 107$^a$ is a top view of a portion of the parts shown in Fig. 107. Fig. 108 is a similar view to Fig. 107, but showing one of the voting-keys depressed. Fig. 108$^a$ is a top view of one of the locking and releasing bars adapted to be operated by the irregular-voting mechanism of the lower bank. Fig. 109 is a side view of one of the main supporting-brackets of the lower bank. Fig. 110 is a side view of one of the lower-bank voting-keys and one of the parts operated thereby. Fig. 111 is a top view of one of said keys. Fig. 112 is a top view showing a series of lower-bank voting-keys partly broken away. Fig. 113 is a cross-section of one of the voting-keys of the lower bank, showing the arrow-head portion. Fig. 114 is a side view of one of the tilting interlocking and rack-releasing plates. Fig. 115 is a front view showing the arrow-head portion of some of the voting-keys of the lower bank in connection with the limiting or interlocking plates for said keys. Fig. 116 is a front view of one of the plate-holders detached. Fig. 117 is a side view of the same, also showing the plates. Fig. 118 is a side view of one of the rack-releasers. Fig. 119 is a partial top view of two of the questions or amendments voting mechanisms, parts being broken away. Fig. 120 is a side view of the guide-rack for such mechanisms. Fig. 121 is a top view of the same. Fig. 122 is a side view of one of the rack-releasers for the same. Fig. 123 is an end view of the guide-rack for the same. Fig. 124 shows a broken front view of one of the guide-rack guide-plates in position and part of the operating-keys of said questions mechanism in section. Fig. 125 is a side view showing the operating-shaft used in the irregular-voting mechanism in the lower bank. Fig. 126 is a side view of the adjustable table used in said irregular-voting mechanism. Fig. 127 is a top view of the same. Fig. 128 is a rear view of the tension-plate bearing against the upper paper-roll of the irregular-voting mechanism of the lower bank. Fig. 129 is a top view of the parts shown in Fig. 125. Fig. 130 is a top view of the crank used in operating the irregular-voting mechanism of the lower bank. Fig. 131 is a side view of the same. Fig. 132 is a side view of the locking-bar operated by the tilting rack-releasing plate in the irregular-voting mechanism of the lower bank. Figs. 133, 134 are side and front views, respectively, of the locking-levers controlling the universal locking mechanism. Fig. 135 is a top view of the upper roll used in the irregular-voting mechanism of the lower bank. Fig. 136 is a top view of the shaft and its accessories used on the lower roll of the irregular-voting mechanism of the lower bank. Fig. 137 is a top view of the lower-roll of said irregular-voting mechanism. Figs. 138, 139, 140 are end views of the parts shown, respectively, in Figs. 135, 136, and 137. Fig. 141 is a partial transverse sectional view showing the locking mechanism used in connection with the sliding plate of the irregular-voting mechanism of the upper bank. Fig. 142 is a side view with the side casing removed, showing the irregular-voting mechanism of the upper bank and the parts connected therewith. Fig. 142ª is an enlarged view of a part of the resetting mechanism shown in Fig. 142. Fig. 143 is a front view of the locking mechanism therefor. Fig. 144 is a side view of the locking-hook operated by the removable key-guard of the lower bank. Fig. 145 is a side view of the main locking-cam. Fig. 146 is a side view showing details of the locking mechanism. Fig. 146ª is an enlarged plan view of the cam-operating mechanism shown in Fig. 146. Fig. 147 shows a detail of the locking-hasp of the upper bank and parts connected therewith. Fig. 148 is a detail view showing the guard in connection with its locking-bar. Fig. 149 is a front view of the locking-key for the straight-ticket locking-rack. Fig. 150 is a side view showing one of the keys of the upper bank in connection with parts coöperating therewith. Fig. 151 is a side view, partially in section, of part of said coöperating means. Fig. 152 is a side view of the locking-key shown in Fig. 149. Fig. 153 is a front elevation of the pawl which is adapted to actuate the regulating-wheel and used in connection with the irregular-voting mechanism of the upper bank. Fig. 154 is a side view of the same. Fig. 155 is an enlarged side view showing the principal parts of the operating mechanism of the upper bank. Figs. 156, 157 are similar views of some of the parts shown in Fig. 155. Fig. 158 is a top view of the horizontal guide-bar for the key-dogs of the upper bank. Fig. 159 is a front view, the casing being removed, showing parts operatively connected with the main operating-shaft for registering the total vote and various features of the locking mechanism. Fig. 160 is an enlarged bottom view of the removable plate of the irregular-voting mechanism of the lower bank and the parts connected therewith, and Fig. 161 is an enlarged detail side view showing the operating mechanism of the irregular-voting devices of the lower bank. Fig. 162 is a perspective view showing a straight-ticket key, a single-candidate key, and connections between them. Fig. 163 is a plan view of the locking and interlocking mechanism of the lower bank. Fig. 164 is a perspective view of the pull-button arrangement of the upper bank, parts of the lower bank being also shown in this figure. Fig. 165 is a side view of parts of the device by means of which the machine is locked at the end of an election. Fig. 166 is a section on the line 166 of Fig. 165, and Fig. 167 shows the means by which the machine is locked at the end of an election.

My invention, as shown, comprises a casing of any suitable size and material, which is built something like an organ, having two banks of keys, each bank being provided with a suitable number of vote-registering mechanisms operated by keys upon which the names of the offices or subjects to be voted upon are secured. The machine is arranged to comprehend any suitable number of systems or groups of vote-registers, the number of registers corresponding to the number of candidates and subjects to be voted for. The systems are so arranged that no two registers in the same system or group can be operated at the same instant, and the various systems are disconnected to act independently of each other, although various interlocking mechanisms are provided. These systems also embrace a main system by means of which a straight party-ticket may be voted, and a series of auxiliary vote-register systems, there being one or more registers for every office or subject to be voted upon. The interlocking mechanisms, which will be hereinafter described in detail, connect the various systems, so that the machine is completely locked when the required number of offices and subjects have been voted for. There are in addition irregular-voting mechanisms by means of which a voter is enabled to vote for candidates who have not been regularly nominated. These irregular-voting mechanisms are also arranged so that they may be interlocked with all the other voting mechanisms except those arranged for subjects or questions.

In the drawings only two irregular-voting mechanisms have been shown, one to be used in connection with a single-candidate group in the lower bank and the other to be used in connection with a multicandidate group in the upper bank. It is obvious, however, that each single-candidate group and each multicandidate group may be provided with an irregular-voting mechanism attached thereto, and this was my intention from the first; but to avoid complication in the drawings only one irregular-voting mechanism has been shown in each bank.

The invention further includes multicandidate-group-voting mechanisms which are also adapted to be interlocked with the other voting mechanisms. These multicandidate mechanisms are arranged so that they may be set for any desired number of candidates, and when that number has been voted for the system or group becomes automatically locked. Each of these multicandidate groups or systems is adjustable, so that the number of candidates that may be voted for in such a group may be varied, as desired. At the conclusion of the operation of voting the voter himself or any authorized official can actuate a lever which simultaneously resets all the systems, resetting the machine for the next voter. As each individual register corresponding to an office or subject to be voted for is actuated by the operation of voting, the entire vote is registered, so that at any time the exact number of votes for a certain candidate or subject may be determined.

The machine is also provided with registering mechanism by means of which the total number of votes cast for any candidate or subject may be registered, as well as with a registering mechanism upon which the total number of votes cast is separately registered.

The machine is further provided with two separate locks of differing form, which must be unlocked before votes can be cast, the object being that two different officials are to be provided each with one of the keys for these locks, so that no single official can control the machine.

My invention therefore comprises a straight-ticket-voting mechanism, single-candidate-voting mechanisms, mechanisms for voting upon questions or amendments, irregular-voting mechanisms, multicandidate group-voting mechanisms, and suitable locking, interlocking, limiting, and registering mechanisms for all of said mechanisms, together with means for locking the entire machine.

The machine includes nine different locking mechanisms, which are so arranged as to absolutely prevent any tampering or improper action in connection with the machine.

The first locking or limiting mechanism is the one in connection with the single-candidate-group-voting mechanisms and is so arranged that the operation of one of the single-candidate keys will lock all the other keys representing candidates for the same office and will at the same time lock the straight-party-voting mechanisms and the corresponding irregular-voting mechanism.

The second locking mechanism is used in connection with the multicandidate-voting mechanism, shown in this machine in the upper bank, whereby the operation of a single key in the multicandidate-group mechanism will lock the straight-party keys and whereby the operation of the proper number of keys will lock the other keys in the same multicandidate group.

The third locking mechanism relates to the irregular-voting devices of the lower bank and operates to lock the corresponding single-candidate-voting mechanisms and the straight-ticket-voting mechanisms, The fourth locking mechanism is arranged so as to instantly lock the irregular-voting mechanisms when a straight-party key is actuated.

The fifth locking mechanism is used to lock the machine before it is sent to the voting-precinct. By this mechanism the county or city clerk or whoever has charge of the machine locks each and every voting mechanism of the whole machine without disturbing the registering devices.

The sixth locking mechanism operates in connection with the shield hiding the registering mechanisms or counters, and the instant this shield is removed the whole machine is locked. Before this shield can be removed every voting-key must be in its normal position. This shield of course is not intended to be operated until the close of the election, when the returns are desired, the arrangement being such as to prevent any person from reading the registering mechanisms or counters without detention, thus preventing any fraud in connection with the various registering mechanisms. As soon as this shield is removed, which is accomplished by a specially-constructed lock and key, every voting mechanism is locked and made inoperative, so that no key can be actuated after this sliding-shield is removed. This one operation of unlocking actuates the sliding shields covering the registering mechanisms for both banks. These shields are self-locking when replaced.

The seventh locking mechanism is common to the voting-keys of all the different voting mechanisms, although it does not interfere with the different registering mechanisms. This mechanism is more especially designed to prevent the accidental actuation of the voting-keys and counters before the election begins. In setting the machine preparatory for an election each of the registers is brought to the zero-mark, and after this operation the seventh locking mechanism is brought into play. After the machine is placed in the voting-booth the locking mechanism is operated by the proper official, thereby unlocking the machine and placing it in condition for operation.

The eighth locking mechanism is used in connection with the upper bank, which bank is normally locked until operated by this mechanism, which is a simple pull-button. As soon as this pull-button is drawn out the upper bank is ready for voting. This operation of unlocking the upper bank immediately locks the straight-ticket keys and corresponding registers of the lower bank.

The ninth locking mechanism is used in connection with the straight-party-ticket mechanism. This ninth mechanism locks all the voting mechanisms the moment one of the straight-ticket keys is actuated, (only one of which can be operated at the same time,) with the single exception of the amendments or questions mechanisms.

The machine as shown in the drawings comprises two banks capable of accommodating the names of one hundred and forty-five candidates, five questions and amendments voting mechanisms, and four straight-party-voting mechanisms. It is of course obvious that the machine might be made of any desired length and comprise any number of banks and be arranged for any suitable number of parties, candidates, and questions.

The machine as shown comprises six different kinds of voting mechanisms: two for the irregular vote, one being situated in each bank; one for the single-candidate group—that is to say, where only one candidate is to be voted for for a single office; one for the election propositions; one for the straight-party tickets, and one for the multicandidate-group-voting mechanisms. It is designed, however, to use an irregular-voting mechanism in connection with each of the single candidate and multicandidate groups.

In the drawings, Fig. 1 represents a front view of the machine. The irregular mechanism of the lower bank is shown on the left. The main operating-crank M, provided with a handle I, is located at the right of the machine on the main operating-shaft N, which is mounted in brackets 416 417, Fig. 2, on the base of the machine. This crank may be placed on the front of the machine to be operated by the voter, as shown in Fig. 1, or upon the rear of the machine on the extension 675, (Figs. 6 and 33, wherein the crank is lettered $N^2$,) to be operated by one of the election officials, it being understood that the shaft N extends entirely through the machine transversely to its length, Fig. 5. To the shaft N is secured a cross-piece 490, which limits the rotation of said shaft in both directions, since it will strike against the button of the machine when the shaft N is partially rotated in either direction. A chain 491 is attached to a pulley 493 on said shaft and to a spring 492, Fig. 2, which is attached to the base of the machine and acts to restore the shaft N to its normal position after it has been actuated.

A represents the pivoted voting-keys of the lower bank, which preferably project horizontally in front of the casing of the machine and are shown in Figs. 2, 110, 111, 162, and 163. Each key comprises a projecting stem provided in front with a part 2, which acts as a card-holder, (see Fig. 2,) which has an opening 3 near its outer end in which a knob or button is secured, which button is used in depressing the key. The card-holder is riveted or otherwise secured at the point $a$, Fig. 163, to the main portion of the key and is preferably arranged at an angle thereto, so that the voter may more readily distinguish between the candidates nominated by the different parties. The cards are of different colors for the same reason, one color being used for each party. The button is preferably provided with a raised letter (see Figs. 2 and 163) indicating the particular party to which the candidate represented by that particular key belongs, so that the machine may be used by a blind voter. These keys are of considerable length and extend through the front of the machine nearly to the rear thereof, as is shown in Fig. 4. Each key is provided with an opening 4, Fig. 110, and a projection $4^a$, surrounding said opening, which projection operates as a bearing and a spacing-block. Each key is provided with a rearwardly-projecting arm 5 and an upwardly-projecting arm 6. The arm 6 is perforated at its upper point, which perforation serves as a point of support for one of the duplex spring-pawls used in connection with the registering mechanism, as shown in Fig. 98. The arm 5 is perforated at its rear end, and in this perforation is secured a spring 7, (see Fig. 4,) which normally holds the front end of the key elevated. The other end of the springs 7 is secured to a bracket or bar fastened to the bottom of the machine. Each key is provided with a reduced portion 9 (see Figs. 57, 110, 113, and 162) and an enlarged portion 10, forming an arrow-head, these portions of the key being adapted to engage with the interlocking or limiting mechanism, as will hereinafter be more fully described. These keys are adapted to move in slots in the face-plate B', Fig. 1. Each of these keys in the lower bank is mounted upon the shaft 11, which extends the full length of the machine. (See Figs. 3, 4, and 5, 162 and 163.) This shaft is mounted in a series of supporting-brackets B, Fig. 4, which extend transversely of the machine at suitable intervals and serve as the main supporting means for nearly all of the mechanisms of the lower bank.

Each bracket B has a spreading base portion 12, (see Fig. 4,) by means of which it is screwed to the base 13 of the machine. In front each bracket has two upwardly-extending stems or arms 14 and 15 and a depending stub arm 16. It also has two upwardly-extending arms 17 and 18, to the former of which are attached the registering mechanisms and the supports for the spring-pawls used in connection with said registering mechanisms, while the rear arm supports the pulleys over which the numbered tapes of the registering mechanism pass and to which arms, as well as to the sides of the machine, a brace $S^2$ is firmly secured. (See Figs. 2, 4, and 5.) These brackets are fastened at intervals to the base of the machine and to the brace $S^2$, one of said brackets being used to separate each single-candidate group from the next one, two of said brackets being used to include the straight-party-voting keys, two more being used to include the questions or amendments voting mechanism, and one being used at each end of the machine.

The two brackets B on the left of the lower bank of the machine also furnish supports for the irregular-voting mechanism of that bank. It is of course understood that one of these irregular-voting mechanisms is intended to be used in connection with each of the groups of the single-candidate-voting mechanisms, although in the drawings but one of said irregular-voting-mechanisms has been shown. The arms 14 of these brackets are provided with bearings 19, within which is supported the shaft 194 (see Fig. 4) of the receiving-roll 20, Fig. 137, of said irregular-voting mechanism, it being understood that said voting mechanism comprises, among other parts, two rolls over which a strip of paper is wound, the operation of said irregular-voting mechanism causing the paper to travel from one of said rolls to the other. The stub-arm 16 is provided with a slot 191, (see Fig. 4,) in which is mounted the shaft 193 of the delivery-roll 195, Fig. 135, of the irregular-voting mechanism. (Shown in top view in Fig. 1, in side view in Fig. 4, in top view with the casing removed in Fig. 2, and shown on a larger scale in Figs. 160 and 161.)

The paper in its passage from the delivering-roll to the receiving-roll passes over a table which is adjustably secured to adjacent brackets B. This table is shown in detail in Figs. 126 and 127 and is numbered 196. Said table is adjustably secured between two adjacent brackets B by means of screws passing through slots in said table. The receiving-roll 20, as shown in Fig. 137, is provided on its left end or outer side with a ratchet-wheel 198 and is hollow and mounted on the shaft 194, which shaft is shown in Fig. 136. This shaft is provided with an arm 199, which arm is adapted to lie within the slot 192, and thus prevent the shaft from revolving, Fig. 4. Movably mounted upon this shaft 194 is a dog 200, which is secured to this shaft by an ordinary coiled spring 201, as shown in Fig. 139. This dog is further provided with an upwardly-extending lip 202, which lip is adapted to engage a pin 203, transversely positioned within the hood 204 of the sliding shield 205, as shown in Figs. 4, 51, and 52, 160 and 161. This lip is provided with a spring-pawl 206, Figs. 139 and 161, which pawl is adapted to engage the ratchet 198 of the roll 20. As the sliding top or shield 205 is moved downward the pin 203 engages the lip 202, and so feeds the receiving-roll forward to present a clean surface on the paper on which the voter may write his ballot.

To prevent the receiving-roll 20 from feeding backward, I provide a secondary pawl 207, which is held in engagement with the ratchet-wheel 198 by the spring 208, (see Figs. 4 and 161,) and to prevent the delivery-roll from revolving too freely I provide a tension or friction device therefor. (Shown in Fig. 128.) This device consists of a concave plate 670, adapted to fit around the roll 195 and held against it by the two-armed coil-spring 671, the arms bearing against any convenient support. (Not shown.)

To actuate the sliding top or shield 205, a finger-piece 209 is provided, as shown in Figs. 4, 51, and 161. The sliding top or shield 205 is held by means of undercut guides 213, Fig. 51, upon a top plate 210, which plate is in turn removably secured to the upper portion of the bank by means of an ear 211, passing over the screw 212. (See Figs. 4, 51, 160, and 161.) On the other side of the plate 210 is a downwardly-projecting perforated lug 703, (see Figs. 52 and 160,) by means of which it may be fastened to one of the brackets B. Plate 210 is further provided with an opening 220, (see Figs. 51 and 160,) through which the upper end 221 of the shaft 224 projects, as shown in Figs. 4, 51, and 160. This plate is also provided with an opening 222, which appears when the plate or shield 205 is moved down, leaving a part of the paper strip exposed, upon which the voter may write his vote. The upper end of the shaft 224 is provided with a squared end 221. (Shown in Figs. 51 and 125.)

Should a voter desire to vote for a person not regularly nominated, all he has to do is to insert a crank 23 (see Figs. 130 and 161) into the opening 220 to engage the square head 221 of the shaft 224. By drawing the handle of the crank 223 forward the shaft 224 is actuated and locks the single-candidate-voting mechanism over which the irregular-voting mechanism is mounted, so that it is impossible to operate any of the single-candidate-voting keys underneath the irregular-voting mechanism, while at the same time the straight-party keys are also locked, as will be hereinafter explained. The movement of the lever 223 also unlocks the top or shield 205, which is normally held locked. This is accomplished as follows: The shaft 224 is provided near its top with a spiral cam 225. (Shown in Figs. 4, 125, 129, and 161.) As this spiral cam revolves it engages a projection 226, (see Figs. 52 and 160,) which projection forms part of the spring-actuated locking-bar 227, which is provided with a spring 707. The sliding shield or cover 205 is provided on its lower face with a bar 228, a hook 229, and a projection 230, which project downwardly, respectively, through the slots 231, 232, and 233 within the top plate 210. The pivoted bar 227 normally engages the bar 228, and therefore locks the shield 205 in position until the bar 227 is carried downwardly out of the path of the bar 228 by the spiral cam 225, which occurs when the shaft 224 is actuated by the crank 223. As soon as the bar 227 is carried downward the sliding shield 205 may be drawn downward, uncovering the slot 222, and thereby exposing part of the strip of paper, upon which the voter may write his vote. When the shield 205 is drawn downward, the hook 229 engages the pivoted catch 234, provided with a spring 708, so that they are locked, as shown in Figs. 52 and 160. The spring 236 is attached to the projection 230 of the shield 205 and also to the plate 210, which spring tends to normally hold the shield 205 in a closed position. The spring-actuated catch 234 is provided with a downwardly-extending arm 237, which arm is adapted to be engaged by a vertically-reciprocating plunger 238, (see Figs. 56 and 161,) which plunger is provided with a curved upper surface and with a curved lower surface 239, (see Fig. 56,) which is adapted to be engaged by the main resetting-rod 45 (see Fig. 35,) when the whole machine is reset at the close of a voting operation. This plunger is slotted for the reception of a guiding-screw and is channeled around a fixed upright, whereby said plunger is guided, as shown in Fig. 56. It should be noticed as soon as the shield 205 is drawn downward it locks the single-candidate mechanism with which it is in connection and is itself held in an open locked position, so that it cannot be closed until the main operating-crank is turned to put the machine in condition to be operated by the next voter. It will thus be seen that by the operation of opening the irregular-voting mechanism three things are accomplished—the single-candidate mechanism in connection with which the irregular-voting mechanism is used is locked, the straight-ticket mechanism is locked, as will be hereinafter described, and the irregular-voting mechanism itself is held in an open locked position. A casing T', Fig. 4, extends from said irregular-voting mechanism down to the face-plate B.

As above stated, this machine is arranged for four parties. Four keys are therefore provided for each office—one for each political party. On the left of the machine the first four keys A denote the regularly-nominated candidates for governor. When one of these keys is operated, it locks out the three other keys, the corresponding irregular-voting mechanism, and the straight-ticket-voting mechanism, as will be hereinafter described. Beneath the keys A is the lower or outer face-plate B', provided with slots in its upper edge, within which slots the keys are adapted to be moved. (See Fig. 1.) Immediately behind the face-plate B', to which it is connected by springs 85, is the sliding locking-rack 79 for the straight-ticket mechanism. (See Figs. 4, 60, 87, 91, 106, 162, and 163.) This plate slides in slots in the upper face of beams 42 and 76, (see Figs. 4, 31, 60, 85, 87, 108, 162, and 163,) which are secured to the base-plate 13 of the machine. Immediately behind the rack 79 are the flat locking-racks 40 for the single-candidate groups. (See Figs. 32, 50, 105, 107, 108, 162, and 163.) These racks are spring-actuated and vertically slotted. They are also provided with locking teeth 41, Figs. 32, 104, and 105, and slide in a groove in the upper face of the beam 42. Each of these racks has four projections—one for each party. If more parties than four are in the field, the racks would be correspondingly varied in size, so as to have one projection for each party. Behind the racks 40, supported near the edge of the beam 42, is the main resetting-bar 45, Figs. 35, 37, 104, 107, 107$^a$, and 108, provided at intervals along its length with slots 442, in which slots projections 444 on the racks 40 play. These slots and projections of course limit the motion of the racks 40. To a pin 43 on each of the racks 40, which pin projects through a slot 442, is attached a spring 43$^a$, (see Figs. 37 and 107$^a$,) which spring is attached at the other end to a bracket 660, Fig. 36, attached to the beam 42. These springs of course constantly tend to draw each of the corresponding locking-racks 40 to the left. This action is prevented, however, when the machine is in its normal open position by the locking and releasing bar 28, (see Figs. 37, 104, 107, 107ª, 108, 162, and 163,) one for each rack 40, which locking-bar normally engages with an opening 48 in the rack 40. (See Figs. 32, 50, 104, 162, and 163.) This bar keeps the rack 40 in the position shown in Fig. 104 until one of the keys A or the corresponding irregular-voting mechanism has been actuated. Beneath the keys A of each single-candidate-voting group is a bell-crank lever the upper arm 22 of which is provided with a broad upper end 23, (see Figs. 107, 112, 162, and 163,) which is reduced to a sharp edge. Each of these bell-crank levers is pivoted at 24 upon a shaft supported in the slots 21 in the arms 14 of two adjacent brackets B. At a point 26 on the lower arm 25 of said bell-crank lever is pivoted the locking and releasing bar 28, which engages with a slot 48 of the locking-rack 40. Each of these bars 28 runs in a groove transversely to the machine in the short beam 42ª, (see Figs. 31, 107, and 108,) which groove is covered by the plate 42ᵇ, Figs. 36, 37, and 163, attached to the beam 42. When one of the keys A is pressed downward, it carries with it the corresponding bell-crank lever and withdraws the bar 28 from the slot 48 in the locking-rack 40, which rack is immediately drawn to the left and locks the key which has been depressed in its lowest position and locks the other three keys in their elevated or normal position. A spring 29, Fig. 107, normally holds the bar 28 in the slot 48 of the rack 40.

Fig. 104 shows the position of the keys in one of the single-candidate groups before actuation by a votor and Fig. 105 the position after one of the keys has been actuated by a voter, the locking-rack 40 in the latter figure having been drawn to the left. This action locks the particular irregular-voting mechanism corresponding to the single-candidate-voting mechanism, one key of which has just been operated, and also locks the straight-ticket-voting mechanism, as will be hereinafter described. If the voter merely depresses one key in a single-candidate-voting group, the movement of the locking-rack 40 will prevent him from thereafter depressing a second key in the same single-candidate group; but to prevent him from actuating two keys at the same time in the single-candidate group or from in any other way improperly voting in such a group an interlocking or limiting mechanism (shown in Figs. 115 to 117) is provided. As before stated, each of the keys A is provided with an arrow-head portion. These portions pass between teeth of the stationary plate-rack 30, (see Fig. 116,) which is secured between the arms 15 of two adjacent brackets B. The plate-rack 30 is provided with elongated slots 31, forming teeth on said rack. In each of these slots and on the outside of the exterior teeth, as shown in Fig. 115, the arrow-headed portions of the keys A play. Secured to these racks, one of which is provided for each single-candidate group, are the regulating-plates $a'$. These are slidably secured to the racks by means of the screws 32, and each has a central outwardly-projecting portion 33 and a lower neck 34, between which the arrow-headed portion 10 of the keys A are held. These plates $a'$, when four keys are used in a group, are arranged in sets of three, the central plate being provided with a T-shaped head 35, the projecting ends of which engage the upper projecting ends of the other two face-plates $a'$, as shown in Fig. 115. The plates $a'$ are provided with elongated slots, through which the screws 32 pass. (See Fig. 29.) Each plate-rack 30 is provided with feet 850ª, by means of which it is secured to the base of the machine, and a rib 850, Figs. 29 and 30, adapted to fit between two adjacent brackets B.

As soon as any one of the four keys comprising a group has been actuated it will prevent the actuation of any other key, for the reason that the plates $a'$ are of such dimensions that they will only slide far enough to permit one of the keys A to be depressed whether it is attempted to operate two or more keys simultaneously or successively.

The votes in the single-candidate groups are registered as follows: The arms 17 of the brackets B are slotted in front, as shown in Fig. 4. In these slots is journaled the axle 56 of the registering-wheels C, of which there are two, $c\ c^0$, Fig. 95, for every one of the voting-keys A. Over the wheel $c^0$, which is double the width of the wheel $c$, runs the steel tape $c'$, (see Figs. 4 and 96,) which is numbered consecutively from "00" to "99." The wheel $c^0$ is provided at intervals with pins 66, and the steel tape $c'$ is provided with holes so spaced as to fit over these pins, which therefore act to keep the tape in its proper position upon its wheel $c^0$. Each of these tapes is also provided with cut-away portions 52 for a purpose to be hereinafter described. These tapes pass over idler-pulleys located in slots in the arms 18 in the brackets B (see Fig. 4) and then downwardly over pulleys 62, adjustably secured, by means of screws 63, in slots in a bracket 841, secured to the base 13 of the machine, as shown in Fig. 4. The wheel $c$ is provided with ratchet-faces numbered consecutively from "0" to "9." Each one of these sets of wheels $c\ c^0$ is operated by a duplex pawl fastened to the upright arm 6 of one of the keys A, as shown in Figs. 4 and 98. To the arm 6 of each key A a pawl 50 is pivotally secured, and a spring 60, attached to said arm and to said pawl, normally holds the latter down. This pawl 50 is bent as shown in Fig. 100, and its outer end engages with the ratchet-wheel 51, fastened to the wheel $c^0$.

On the shaft 56, which carries the registering-wheels, and adjacent to each ratchet-wheel 51 is a movable arm 55, provided with an opening 59 at its upper end. In this opening 59 a screw 58, which passes completely through the pawl 50, rests. To the pawl 50 is pivotally secured the pawl 54. (See Figs. 4, 98, and 100.) This pawl 54 is normally held downwardly by a spring 61, secured to the pawls 50 and 54. The pawl 54 is provided at one side near its outer end with a pair of upturned ears forming a slot 57, which engages the screw 58 on the pawl 50. The pawl 50 is provided with a downwardly-curved sharp end 53, which engages the teeth on the ratchet-wheel 51, and the pawl 54 is provided with a similar sharp end 67 (shown in Fig. 100) and which is a little wider than the wheel $c$.

The operation is as follows: The depression of one of the keys A throws the arm 6 of said key forward, carrying with it the pawl 50, which by means of its sharp end 53 advances the ratchet-wheel 51 one tooth, thereby carrying the steel tape $c'$ the space required to go—for example, from "00" to "01." The pawl 54, however, does not operate the wheel $c$, for the reason that the point 67 of the pawl 54 rides upon the tape (see Fig. 100) and is prevented from actuating the ratchet-faced wheel $c$. When, however, ninety-nine votes have been registered, a cut-away portion 52 (see Fig. 95) in the tape comes under the point 67 of the pawl 54. The point 67 is forced downward by the spring 61, and therefore the movement of the arm 6 in this particular case carries forward both wheels $c$ $c^0$ one space, carrying wheel $c$, which represents the hundreds, from "0" to "1" and carrying the tape $c'$ on the wheel $c^0$, which represents the units and tens, from "99" to "00."

To prevent the registering-wheels from being moved in a backward direction, securing-pawls 55 are used. (See Figs. 4, 101, 102, and 103.) A slotted bar 64 is secured to the brackets B and runs the entire length of the machine. Between the projections formed by the cut-away portions $64^a$, Fig. 4, are secured pawls, one for each of said wheels $c$, and ratchet-wheels 51, which pawls are held in engagement with said wheels by springs 65'. This registering mechanism is the same for the single-candidate-voting mechanism, the questions or amendments voting mechanism, and the straight-party-voting mechanisms.

Mechanism is provided near the right-hand end of the lower bank for registering the total number of votes cast. This mechanism may be operated either by the voter himself or an official, as desired. The counters of this total-registering mechanism are always exposed to view through slots in the casing. This mechanism is shown in Figs. 2, 46, 48, and 159, in which the main resetting-shaft N is shown as provided with a disk $m$, to which is pivotally attached an operating-arm 426, which has therein a slot $426^a$ and an adjusting-screw 427. Fastened to the base 13 of the machine is a standard 423, in the top of which is pivoted the curved link 424, which carries a T-headed pin 425, which engages the slot $426^a$. To the other end of the link 424 is attached a link 421, having its upper end bifurcated. To the upper end of the link 421 is pivoted a three-armed lever $A^2$ (see Fig. 5) similar in construction to the keys A, except that it does not project through the front of the machine. This lever is spring-actuated and operates a registering mechanism in the manner already described in connection with the keys A. It is obvious that a partial rotation of the crank N will move forward one number the registering mechanism for the total vote by means of the connections described.

Next in order to the single-candidate-voting mechanisms in the lower bank, starting from the left, are the questions or amendments voting mechanisms, there being two keys for each of such questions or amendments, which may be marked "Yes" and "No" or "For" and "Against," together with an inscription denoting the nature of the question or amendment to be voted upon. The arrangement and operation of the questions mechanism is very similar to that of the single-candidate-voting mechanism, with some variations which will now be described. As there are only two keys for each question or amendment, there is no need of a long locking-rack. Consequently the short locking-racks shown in Figs. 59 and 61 are used with this part of the machine. These racks 40 have locking projections 41 and upwardly-extending teeth 72, Fig. 59. They are also provided with cut-away portions 48, in which the locking and releasing bars 28 are adapted to fit, as has already been described. These racks are spring-actuated and are adapted to slide in a groove 78 in the beam 42, Figs. 58 and 60. As these racks are short, a curved supporting-bar 71 (see Fig. 61) is attached to each rack to keep it steady. Each of these racks is provided with a slot 73, with which one of the teeth 74 of the plate 75 (see Figs. 60, 62, and 94) engages for the purpose of steadying said racks. These racks are reset by means of a bar $h$ (shown in detail in Figs. 92 and 93) and which is located behind the main resetting-bar. This bar is operated by the movement of the main shaft N, as will be hereinafter more fully described. Only one limiting-plate $a'$, Figs. 57 and 124, is necessary in connection with each pair of keys in this part of the machine.

On the right of the machine in the lower bank are the four keys for the straight-party-voting mechanism. These are similar in construction and operation to the single-candidate-voting-mechanism keys; but it is of course essential that the operation of any one of the four straight-party-ticket keys will immediately lock the entire machine, (including the other three straight-party-ticket keys,) with the single exception of the questions or amendments voting mechanism. This is done by mechanism which will be hereinafter fully described.

Referring now to the upper bank, it may be said that this shows four multicandidate-group-voting mechanisms and one irregular-group-voting mechanism, although it is of course understood that an irregular-voting mechanism is intended to be used in connection with each of the multicandidate-group-voting mechanisms. The entire upper bank is located in a casing 93, which is supported on hinges 462 (see Fig. 7) upon the bottom 13 of the machine and is adapted to be folded back, as shown in Fig. 2. The operating mechanism is supported by brackets 94, a detail side view of one of which is shown in Fig. 39, fastened to the upper casing by bolts 95, Fig. 7. This bracket is triangular in its general shape and is provided with openings 98, 99, 120, and 152 for the reception of various shafts, which will be hereinafter described, and with a slot 96, enlarged at its tops for the reception of the spring-actuated locking-rack 97, which is made in sections and is shown in detail in Figs. 26, 27, and 28. It is also provided with a slot 101 for the reception of the plate or flat bar 102, which serves as an anchor-plate for the springs 7 and 108, Fig. 155. It is also provided with a rectangular cut-away portion 100 for the reception of the plate 139, Figs. 39 and 155. On a shaft F', Figs. 7 and 155, running entirely through the upper bank, are journaled the voting-keys F thereof, which are similar in general shape to the keys A of the lower bank except that the outer projecting end is more upturned, as shown in Fig. 7. Each key is provided with a card-holder, a knob with a raised letter upon it, and with arms 5 and 6 similar to those described in connection with the keys of the lower bank. On each key, near the front thereof, is a locking-dog G. (See Figs. 7, 43, 74, 75, and 155.) The upper part of each of these dogs is bifurcated at 107 (see Fig. 75) to partially surround one of the keys F and is pivotally secured thereto. On the rear each dog is provided with a pin 105, Figs. 74 and 155, and a spring 106 connects said pin with the body of the key. Each dog is further provided on its rear with a locking-lip 104 and with a similar projecting lip 103 on its front edge. The registering mechanism is operated by means of a duplex pawl 109 110, Figs. 67 and 68, secured to the upwardly-projecting arm 6 of each key F. The registering is done by means of steel tapes, each numbered from "00" to "99," two of said tapes being provided for each key F. These tapes are mounted upon pulleys 112, supported by a shaft f, Figs. 7, 73, and 155, which runs longitudinally through the entire upper bank. These tapes also pass around flanged pulleys 116, mounted on a shaft f' in the lower part of the upper bank, which shaft is supported by brackets 114, pivoted on the brackets 94 and capable of adjustment to loosen or tighten the tapes by means of the screws 115. The depression of the keys F causes the proper movement of the tapes by means of the duplex pawl 109 110. (See Figs. 7, 67, 68, and 155.) The pawl 109 is pivoted to the arm 6. A spring 184, attached to the pawl 109 and to the lip 186 of the pawl-rack 185, Fig. 155, constantly tends to hold the pawl 109 downward. The pawl 109 is provided with a tooth 181 and an upwardly-projecting portion 181$^a$, (working in the cut-away portion 701 of the casing I, Fig. 155,) which part extends between the double head of the pawl 110, which is pivoted to the pawl 109 and normally held downward by the spring 113, connecting the two pawls. The pawl 110 is provided with two downwardly-projecting teeth 179 and 180 at its outer end, the former being shorter than the latter. The depression of one of the keys F (see Fig. 155) draws forward the pawl 109 and carries forward one of the wheels 112, with the numbered tape thereon, one step.

In Fig. 73 is shown a face view of the two registering-wheels 111 and 112 used for one of the keys F. These wheels are smooth except that they are provided with tape retaining and guiding pins, as already described in connection with the registering-wheels of the lower bank. Next to each wheel is provided a ratchet-wheel $e$, provided with teeth 182 183. One of the tapes is also provided with a cut-away portion $e'$.

Referring to Fig. 155, as the pawl 109 is drawn forward it will by engagement with the teeth 182 feed forward one of the registering-wheels one notch. The pawl 110, however, will not feed the other wheel, for the reason that the tooth 180 of said pawl will ride upon one of the steel tapes. This will continue until ninety-nine votes have been registered, at which time the tooth 180 of the pawl 110 will drop into the depression $e'$ in one of the tapes, and the tooth 179 will then engage with the teeth 183 and feed the second tape forward one space. It will thus be seen that this registering mechanism is capable of registering as high as nine thousand nine hundred and ninety-nine votes.

The wheels 112 are prevented from moving backward by the spring-pawls 190, Fig. 155, a series of which are mounted between the teeth 186$^a$ of the pawl-rack 185, Fig. 70. These pawls 190 are mounted on a bar 188, secured in a slot above a lip 189 of the pawl-rack 185.

The mechanism for preventing a greater number of votes being registered in each group than is proper will now be explained. In each group, preferably near the center and attached by a stub-shaft 119 to one of the brackets 94, is a ratchet-wheel 121, (see Figs. 7, 20, and 155,) each tooth of which represents one vote. This ratchet-wheel is provided with a hub 126, upon which is wound the coiled spring 127, one end of which is attached to said hub and the other end by a screw to one of the brackets 94. This ratchet-wheel is provided with a number of holes 122, into one of which a tooth 123 of a dog 124 is adapted to be placed. The dog 124 after being properly adjusted is held in place by a screw 125, adapted to engage with the shaft 119. On the other side of the ratchet-wheel is a tooth 128, Fig. 21, which is adapted to engage with a screw 178, fixed to one of the brackets 94, to limit the travel of said wheel on its return, when the machine is reset. A curved pawl 129 (see Figs. 24 and 156) surrounds said wheel and is provided with a tooth 130, adapted to engage said wheel, Figs. 7 and 156. The curved portion of this pawl is provided with a block 135, Figs. 24, 25, and 156, which block is adapted to fit in between two adjacent voting-keys F and to be guided thereby. The outer end of this pawl 129 is curved, as shown at 131, Figs. 7, 24, and 142, which end is adapted to be engaged and operated by the swinging resetting-bar 171, which disengages the pawl 129 from the wheel 121, allowing the latter to return to its original position under the influence of the spring 127, when the machine is reset. To further insure the proper operation of the pawl 129, it passes through the slot 261$^a$ of the pawl 261, Figs. 142, 153, and 154, for the irregular-voting mechanism of the upper bank, so that when the pawl 261 is moved backward to disengage it from the wheel 121, which is done by the connections shown in Fig. 142 and which will be hereinafter described in detail, the pawl 129 will be disengaged from the wheel 121. A spring 108, attached to the anchor-plate 101 and to the pawl 129, normally holds said pawl in contact with said wheel. The front end of said pawl is pivoted at 132 to a pivoted plate 133, Fig. 155, (one being provided for each multicandidate group,) which plate is provided with teeth $i$, one for each voting-key, and arranged opposite to the dog G on said key.

To prevent the ratchet-wheel 121 from moving backward, a toothed pawl 160 is provided, Figs. 7, 19, and 156. When the machine is reset, this pawl is withdrawn from engagement with the ratchet-wheel 121 by means of the cam 161, attached to the bar 158, as will be hereinafter more fully described. As soon as this pawl is withdrawn the spring 127 draws the wheel back to its original position—that is to say, until the pin 128 engages the screw 178, Fig. 21. This wheel is also adapted to be operated by the irregular-voting mechanism, (shown at the right-hand upper corner of Fig. 1,) as will be hereinafter described.

A bracket 173, provided with a base 473, (see Figs. 7, 17, and 155,) is fastened to the plate 137 in front of each ratchet-wheel 121. On this bracket is pivoted an angle-bar 174. A spring 175, attached to the angle-bar 174 and bracket 173, normally tends to throw said angle-bar forward. At the rear part this bar is provided with a projecting pin 176, Figs. 18 and 155. When the proper or maximum number of votes in a multicandidate group has been cast, the dog 124 will strike the pin 176 and draw the upper part of the angle-bar 174 back. As this angle-bar engages with the projection 118, Figs. 7, 28, and 155, of one of the locking-racks 97, the movement of said angle-bar will release the corresponding locking-rack, which will then be drawn by the spring 97$^a$, attached thereto, toward the left. The teeth 117, Fig. 26, will then bind below the keys F which have not been voted and above the keys F which have been voted, thus effectually locking that particular group and preventing any more votes from being cast in said group. The pin 176 also acts as a stop for the wheel 121, for when it is struck by the dog 124 it is thrown against the wheel 121.

In the depression 100 in the brackets 94 is firmly mounted a fixed plate 139, extending the full length of the upper bank. This plate is attached to the brackets 94 by screws or end brackets 156, Fig. 78, or in any other desired manner. Below the plate 139 and attached thereto is another plate 155, Figs. 14, 151, 155, and 156. The plate 139 has a rectangular channel cut upon its upper face, and at intervals sloping passages 148 (see Figs. 155, 156, and 158) are cut. Above the plate 139 and fixed thereto is the plate 137, provided with projections 138, (see Figs. 15 and 76,) between which are passages in which the dogs G are adapted to reciprocate, and also provided with downwardly-extending teeth 141, Figs. 14 and 151. These downwardly-extending teeth, together with the channel cut in the bar 139, form a passage-way for the locking-blocks 142. (See Figs. 78 to 82, 156, and 157.) These locking-blocks slide freely in the channel and are preferably formed with beveled upper faces, (see Fig. 78,) so that the dogs G may more readily pass between them. At the left-hand end of the machine these blocks are prevented from slipping out of the channel or raceway by means of the horizontally-pivoted arm 146, attached to a projection on one of the brackets 94 and held in engagement with the blocks 142 by means of the spring 147, attached to said arm and to the bar 139, Fig. 82. On the right-hand end of the machine these blocks are held in position by a spring 145, attached to the block 143, Fig. 76, working below a plate 144, Fig. 78. These blocks 142 prevent any two keys from being actuated at the same time, as an attempt to do this would inevitably cause the dogs G to bind upon said blocks and prevent their operation and also to throw said dogs forward against the swinging sectional plate 150, Figs. 14 and 155.

When a key has been depressed, Fig. 157, the lip 104 binds beneath the bar 139, the blocks 142 closing above said lip. Any attempt to restore the key to its normal position would bring the lip 103 into contact with one of the pins $i$ on one of the swinging plates 133, as shown in Fig. 157, which must therefore be swung aside before the key can be restored to its normal position. The means for effecting this will be described later on. As a key F is depressed the triangular lip 104 will pass between two of the blocks 142 and will then strike the incline 148 on the bar 139. This will throw the dog G forward, and the triangular lip 103 will strike against the pin $i$ on the pivoted plate 133, swinging it outward. As the plate swings outward it carries with it the pawl 129 and feeds the ratchet-wheel 121 forward one step or number. This operation is continued by the depression of the successive keys until the required number of votes in the group has been cast, whereupon one of the sections of the locking-rack 97 will be released and lock said group, as has already been described. A spring 136, Fig. 15, attached to the plate 137 and the plate 133, normally holds the latter in its rearmost position.

The irregular-voting mechanism of the upper bank will next be described.

Referring to Fig. 142, I designates the upper casing of the machine provided with an opening 240, over which is mounted a small casing 241, provided with a hinged top 247, containing the irregular-voting mechanism, which includes two rolls 244 and 245, the latter carrying a roll of paper (shown in dotted lines) and the former being provided with a ratchet-wheel 255, the roll of paper extending, of course, from the upper or delivery roller 245 to the lower or receiving roller 244. These rollers are supported by shafts 242 243 in U-shaped brackets 254, mounted in the casing. The top 247 is provided with an opening 248, beneath which is a table 246, which may be adjusted up and down by means of screws passing through slots in the end portions of said table and into the ends of the casing. Above the top 247 of said casing is a sliding or plate cover 249, provided with a handle 249ª and adapted to slide in undercut grooves, Fig. 143, on the top 247. An arm 250 is rigidly attached to the lower part of the sliding plate 249, and to this arm is pivotally attached a second arm 251, which is attached to a plate 252, carried on the shaft 242. This plate 252 is provided with a spring-actuated pawl 254, which engages with the ratchet-teeth 255 to feed the roller 244 forward. An ordinary pawl 255ª prevents the backward motion of said wheel. The arm 251 is provided with a pin 250, which when the plate 249 is drawn to its lowest position, as shown in dotted lines in Fig. 142, strikes the lever 257, pivoted at 256 on the top of the casing I. To the lever 257 is attached an arm 258, which bears against the top of a bent lever 259, pivoted at 260 in a bracket on the casing I. Depending from the end of the lever 259 is a pawl-arm 261, provided with a tooth 267, adapted to engage the teeth on the ratchet-wheel 121. A spring 262, attached to the pivot 260 and the arm 261, normally holds the tooth 267 against the ratchet-wheel 121.

It will thus be seen that the operation of sliding down the cover feeds the ratchet-wheel forward one space, and as the hole 248 is only large enough to permit one name to be written thereon and as the sliding plate must be closed and reopened before the paper can be fed a second time over the table 246 the successive movements of the sliding plate will feed forward the ratchet-wheel 121. As soon as this has been done a certain number of times, which will depend upon the number of candidates to be voted for in that group, it will be impossible to again pull down the plate 249 or to actuate any of the keys within said group, this whole portion of the apparatus being completely locked by the striking of the wheel 121 against the pin 176.

Thus it will be seen that in, for example, a group of six the voter may vote for any six regularly-nominated candidates or for six candidates not nominated at all or for any combination of candidates who have been nominated and have not been nominated, provided, of course, the number be not more than six. Each time the slide 249 is moved down to expose the paper in the irregular-voting mechanism of the upper bank the toothed wheel 121 (see Fig. 142) is moved forward one notch. This same wheel is moved forward one notch whenever a voting-key in the upper bank is pressed down to register a vote. (See Fig. 155.) It follows, therefore, that irregular votes or regular votes, or a combination of the two, may be registered in the upper bank up to a certain number, when the group becomes locked, as has already been described.

The cover 247 is held locked by means of a hook 265, Fig. 143, with which a hook 266, which is pivoted on the casing 241 and extends down through a slot in the casing I, engages. A spring 267ª normally keeps the two hooks in contact. When it is desired to put in new rolls, for example, or to reach this irregular mechanism for any purpose, the hooks are disengaged from each other and the cover 247 thrown back.

Access can be obtained to the lower end of the hook 266 when the hinged cover I is thrown back, which can be done in preparing the machine for an election.

The locking, interlocking, and resetting mechanisms will now be described.

Beginning with the irregular-voting mechanism of the lower bank, it is obvious that the operation of unlocking this mechanism so that it may be used must lock the single-candidate group in connection with which the irregular-voting mechanism is arranged, and must also lock the straight-ticket keys. The first of these operations is accomplished as follows: Referring to Figs. 161, 162, and 163, it will be noted that the crank 223, the movement of which unlocks the irregular-voting mechanism, is arranged to fit over the end of and move the shaft 224. This shaft 224 is provided with an arm 314, Figs. 125, 161, 162, and 163, which arm is adapted to engage a projection 313 (see Figs. 108 and 108$^a$) on the locking and releasing bar 28. The unlocking movement of the shaft 224 will therefore draw back the releasing-bar 28, allowing the corresponding spring-actuated rack-bar 40 to move to the left. The projections 41 on said rack will therefore come beneath the keys A of the corresponding single-candidate group and will prevent their actuation. The locking of the straight-ticket keys is accomplished at the same time by the following means: On the shaft 224 is fastened a horizontal arm 312 Figs. 4, 161, 162, and 163, to the rear end of which is fastened a chain 321, which engages a curved rack-bar 322. This rack-bar is mounted on a dog 323, which is fastened to the shaft 300, which shaft runs the entire length of the lower bank. A spring 324 normally tends to throw the upper part of the rack 322 backward. At the other end of the lower bank the shaft 300 (see Fig. 49) is provided with a dog 301, to which is pivoted a bent arm 302, which in turn is pivoted to the rack locking and releasing bar 28, Fig. 50. A partial rotation of the shaft 300, caused by the unlocking of any of the irregular-voting mechanisms of the lower bank (only one of which is shown) will draw back the bar 302 and with it the releasing-bar 28, allowing the spring-actuated locking-rack 40 to slide beneath the straight-party-ticket keys, thereby locking them. It will thus be seen that the unlocking of the irregular-voting mechanism of the lower bank will lock all the members of the single-candidate group to which said irregular-voting mechanism is applied and will at the same time lock the straight-ticket-voting mechanism. The other single-candidate groups, the questions and amendment voting mechanisms, and the multicandidate groups will of course not be effected by this locking action. Moreover, said irregular-voting mechanism will be held in an open position until the whole machine is reset by the action of the main shaft N, either by the voter himself or by an official.

The resetting of the irregular-voting mechanism is accomplished by means of the pivoted arm 237, which engages when the irregular-voting mechanism is open with the hook 229, Figs. 160 and 161. The operation of the main crank N, which draws the main resetting-bar 45 to the right, lifts the arm 238, which is provided with a cam-face 239, (see Fig. 35), which arm strikes the arm 237, releasing the sliding plate 205, whereupon it slides upward and closes the aperture 222 under the influence of the spring 236, Figs. 160 and 161. The arm 238 slides upon a bracket 460, Figs. 54, 56, and 161, secured to the beam 42$^a$, and a screw 461 in said bracket, passing through a slot (shown in dotted lines in Fig. 54) in the arm 238, limits the motion thereof. Referring to the single-candidate groups, the interlocking or limiting means preventing the actuation of more than one key in a group have already been described and are shown in Figs. 29 and 115. The actuation of one of the single-candidate-voting keys at the same time locks the irregular-voting mechanism which corresponds to said group, and this is accomplished in the following manner: On the shaft 300 is secured an arm 305. (See Figs. 4, 49, 132, 162, and 163.) This arm 305 terminates in a reduced portion, which lies immediately beneath the voting-keys A, Fig. 4. This arm is provided with a pin 315, extending sidewise, Figs. 132 and 162, which pin engages with a slot 317 in an arm 316, which is provided with a slot 318 at the rear portion thereof, which is adapted to fit over the shaft 300. This arm has a projection 319 extending toward the front of the machine. The shaft 224 (see Figs. 125 and 161) is provided with an arm 314, which arm is provided with an upwardly-extending projection 320. When one of the keys in the single-candidate-group-voting mechanism is depressed, it strikes the upwardly-extending end of the arm 305 and depresses it. The pin 315 thereupon carries down the arm 316, bringing the extended end 319 thereof behind the projection 320, thereby locking the shaft 224 against rotation. It is also evident that the operation of one of the keys in any of the single-candidate group must lock the straight keys. This is accomplished in the following manner: On the shaft 300 are mounted a series of arms 305, broadened at their upper edges, Figs. 112, 162, and 163, there being one of these arms for each single-candidate group and also one for the straight-ticket group. The depression, therefore, of any key in any one of said groups will tilt the shaft 300 and by means of the connections 301, 302 and 28, Figs. 49 and 50, release the locking-rack 40, which slides under the straight-ticket keys, thereby instantly locking them.

There is of course no need for interlocking the questions or amendment mechanism with the other parts of the machine. It is only necessary that the applicant be prohibited from voting both for and against a certain question or amendment. This is accomplished by the limiting or interlocking mechanism which has already been described (see Figs. 57, 59, 60, 61, 119, 120, and 124) and which is similar to that used in connection with the single-candidate groups, Figs. 29 and 115.

The resetting of the amendments or questions voting mechanism is accomplished by means of the bar $h$, operated by the main crank N and shown in Figs. 92 and 93. A spring 356, attached to the bar $h$ and the projection $455^a$ of the plate 455, which is fastened to the plate 75, Fig. 94, and engages the slot 456 of the bar $h$, normally tends to throw it to the left. More than one spring may be used, if desired, and in Fig. 92 a second one is shown in dotted lines. This bar is situated behind the main resetting-bar 45 and is provided with an offset and with a slot 358, with which the lug 458 on the bar 79, Fig. 91, engages. This lug 458 also extends through the slot $443^a$ in the head 443 of the main resetting-bar 45, Fig. 35, which head is adapted to be engaged by the lug 452, Fig. 159, on the main shaft N. The rotation of the main shaft therefore carries to the right the straight-ticket locking-plate 79, the main resetting-bar 45, and the resetting-bar $h$ for the questions or amendment voting mechanism. The movement to the right of this bar $h$ carries with it the short stub-racks 40, Fig. 59, and therefore allows the keys of this mechanism to resume their normal positions.

It is evident that it is necessary that the actuation of one of the straight-ticket keys should completely lock the other three straight-ticket keys, the irregular-voting mechanisms, the single-candidate-group-voting mechanisms, and the multicandidate-group mechanisms—in fact the entire machine with the single exception of the amendments or questions voting mechanisms. This is accomplished as follows: The depression of one of the straight-ticket keys depresses the arm 22 of the bell-crank lever 22 25, Figs. 107, 162, and 163. In case of the straight-ticket keys the releasing and locking arm 28 is not directly in operative relation with the bar 79, Figs. 106 and 162; but it is pivoted to a vertical arm 80, which is in turn secured to a horizontal arm 80'. This horizontal arm near its other end is provided with a second vertical arm 80, to the upper end of which is pivoted a horizontal arm 81, Figs. 85, 87, and 162, which engages the notch 86 in the locking-bar 79. When one of the straight-ticket keys is depressed, the arm 81 is thereby drawn back, permitting the locking-bar 79 under the influence of the springs 85 to slide to the left. The inverted-L-shaped portions 83 of the bar 79 are thus moved over the depressed straight-ticket key and under the three other undepressed straight-ticket keys, locking the voted key in its depressed position and preventing the operation of the other straight-ticket keys. This movement of the bar 79 at the same time brings the projections 84 thereon under all the single-candidate keys and locks them from movement. This at the same time locks the irregular-voting mechanisms of the lower bank (only one of such mechanisms being shown) in the following manner: At the left of the lower bank of the machine near its front is a short stub-shaft 306, Figs. 4, 55, and 161. On the top of this shaft is pivotally mounted a bent arm 307, Figs. 53, 55, 161, and 163. This bent arm has a projecting portion 308 at the front of the machine normally held against the straight-ticket-locking rack 79 by the spring 309, attached thereto and to the bracket 460. To the rear this arm is provided with an upturned end 310. On the shaft 224, which is used to unlock the irregular-voting mechanism, is an arm $312^a$, provided with a cut-away portion, leaving a downwardly-extending end 312, Fig. 161. As the sliding locking-rack 79, which is used to lock the single-candidate-voting keys after one of the straight-ticket keys is actuated, is drawn to the left by the springs attached to said rack (which always happens when a straight-party key is depressed) it strikes the end 308 of the arm 307 and throws the upturned end 310 of said arm behind the projecting end 312, thereby locking said arm and preventing the rotation of the shaft 224. The depression of one of the straight-ticket keys therefore accomplishes three things: first, it locks all the straight-ticket keys; secondly, it releases the locking-plate 79, which locks the single-candidate keys; thirdly, through the medium of the plate 79 and the arm 307 it locks the irregular-voting mechanism of the lower bank. At the same time it locks all the voting mechanisms of the upper bank, as will hereinafter be described. In this connection it should be noted that a partial rotation of the shaft N (which is mounted in brackets 416 417, Fig. 2) will entirely reset the voting mechanisms of the lower bank. This is accomplished by means of the lug 452, Fig. 5, thereon, which when the shaft is rotated draws to the right the locking-plate 79 of the straight-ticket mechanism, the resetting-plate 45, which carries with it the locking-racks 40, and the toothed plate $h$ for the questions or amendments voting mechanism. As the shaft N is rotated the lug 452 thereon engages the cut-away portion 451 of the plate 79, Fig. 106. This plate 79 is provided with a lug 458, Fig. 91, which extends through the slot $443^a$ in the end of the bar 45 and through the slot 358 in the end of the bar $h$, the latter slot being considerably longer than the lug. The rotation of the shaft N therefore draws to the right the bar 79 by means of the lug 452 engaging in the cut-away portion 451, draws to the right the bar 45 by means of the lug 452 engaging with the projecting portion 443, and draws to the right the bar $h$ by means of the lug 458 engaging with the slot 358 in said bar $h$. The locking-racks 40 are withdrawn by the resetting-bar 45 and the keys are allowed to spring into their normal position under the influence of the springs 7. At the same time as the bar 79 is withdrawn the projecting portion 308 of the arm 307 and the entire arm is drawn back by the influence of the spring 309, thus unlocking the irregular-voting mechanism. At the same time the arms 305 are raised to their normal position, carrying with them the arms 316. The raising of the arms 305 is caused by the tilting back of the shaft 300 under the influence of the spring 324, Fig. 4. Thus it will be seen that a partial rotation of the shaft N completely resets all the mechanism of the lower bank.

Referring now to the upper bank, before any of the voting-keys can be actuated the upper bank must be unlocked by pulling out the pull-button 92, Figs. 3, 69, and 164. Until this has been done none of the keys in the upper bank can be actuated, for the reason that the blocks 142 are prevented from moving (thereby preventing the actuation of the voting-keys F) until this pull-button has been drawn out. This is accomplished by the means best shown in Figs. 64 and 65. The pivoted spring-actuated arm 146 on the left of the upper bank must be free to move before any one of the dogs G on the keys F can be depressed. A shaft 281 runs the whole length of the front of the upper bank and to it is attached on the right-hand end a lever or swinging plate E, which is attached to the pull-button 92. At the left-hand end of the upper bank a depending plate 280 is attached to said shaft 281, Fig. 164. A clip 288 surrounds the lower end of the plate 280 to prevent said plate from being swung too far. The plate E on the right of the upper bank is adapted to rest when in its lowermost position opposite the blocks 142. When this plate, and consequently the plate 280, is vertical, the plate E locks against one end of the channel carrying the blocks 142, and the plate 280 overlaps the arm 146, which abuts against the blocks at the other end of said channel, the plate 280 being provided with an offset for this purpose, as shown in Figs. 64 and 164. When the button 92 is pulled out, both plates are swung forward out of the path of said blocks, leaving them free to operate.

The resetting of the voting mechanism in the upper bank is accomplished in the following manner: The plate 155 (see Figs. 14 and 155) has attached to it at intervals short washers 157. A plate 158, extending the whole length of the upper bank, is movably held against said washers 157 by means of screws 159 passing through slots in said plate 158. These screws have large washers, which are situated below the slots in said plate 158 to keep it in place. Attached to the plate 155 are the pivoted arms 169, Figs. 3 and 45, which are provided with flanged pulleys 170, Figs. 44 and 155, which engage with the rear of plate 158 and underneath the same. A bar 171 connects these arms, so that they may be all swung in a curved path in unison, and when they are so swung they force the plate 158 forward. (See Fig. 3.) The bar 171 is swung to the right by means of the chain 469, Fig. 3. This chain is attached to a projecting portion 466, Figs. 3, 10, and 12, of a segment of a wheel mounted upon the upright shaft 463, which is supported in the two-armed bracket 479, secured to the casing 93. This shaft is provided on its lower end with a beveled gear-wheel 464, Figs. 7 and 10, and is operated by a segmental gear-wheel 465, Figs. 7 and 10, on the main shaft N. It will thus be seen that the movement of the main shaft will not only reset the voting mechanisms of the lower bank, but also the voting mechanisms of the upper bank, which is accomplished by means of the outward movement of the plate 158, as will now be described. The swinging sectional plate 150, Figs. 7, 150, and 155, which plate is pivoted on the shaft 151, Fig. 155, extending the full length of one of the multicandidate groups, is provided at suitable intervals with projecting screws or pins $y$, Fig. 150, which are adapted to engage the corresponding sectional swinging plate 133, Fig. 150. The plate 150 is provided at suitable intervals (between the keys) with downwardly-extending projections 152, Figs. 7, 14, and 155. The plate 158 is provided with corresponding projections 164. The outward movement of the plate 158 therefore carries with it the projections 152, thereby moving outward the plate 150, which in turn moves outward the plate 133. The outward movement of the plate 158 by means of the cam 161 thereon, Fig. 155, presses the pawl 160 against the tension of the spring 165 away from the wheel 121, thereby disengaging said pawl from said wheel and allowing the spring 127 to return it to its original position, as has been already described. Brackets 163 are attached to the rear of the plate 155, and springs 162 are attached to said brackets and to the plate 158, Figs 7, 13, 14, and 155, normally holding said plate 158 in its rearward position against the shafts of the pulleys 170. Brackets 179, Fig. 14, are attached at intervals to the plate 155 and extend upwardly. Each bracket is provided with a slot 178. Pivoted to the plate 150 at the point 153 is a cam H, normally held downward by the spring 154. This cam is provided with a projection forming a tooth 177. The cam H (see Figs. 7 and 155) projects rearwardly and is adapted to be raised by cams 172 on the bar 171 when this is drawn back by the main shaft N of the machine. As the cam H is lifted it comes opposite the slot 178, and therefore permits the plate 150 to move outward, carrying with it the plate 133. This releases the dogs G from contact with the pins $i$ on the plate 133 and allows the keys F which have been depressed to be drawn back into their original position by the springs 7. The locking-racks 97 are drawn back into their original position by means of a chain 473, (see Fig. 3,) attached to a bar 470 and to the pulley 465' on the shaft 463. (See Figs. 3 and 10.) The rod 470 is provided at intervals with projections 471, which strike against the lugs 472, Figs. 3 and 27, of the locking-racks 97. These projections 472 are perforated and the shaft 470 passes through them.

The means by which the actuation of the straight-ticket keys in the lower bank locks the mechanism in the upper bank will now be described.

Referring to Figs. 146, 163, 164, and 167, 331 represents a side view of a bar bent at right angles, one arm of which lies immediately above and behind the plate 22 underneath the straight-ticket keys. Consequently the depression of one of the keys will depress the arm 331, which is pivoted to a shaft 332, supported between two of the brackets B at the right-hand end of the lower bank. Extending downwardly and rearwardly from the shaft 332 is a bar 333, and a spring $333^a$, attached to said bar and to the frame of the machine, normally holds said bar depressed. Pivoted to said bar 333 is a bar 89. (See Figs. 65, 146, 163, 164, and 167.) The depression of a straight-ticket key will therefore carry the bar 89 upward, and its upper end will strike the depression 91 of a pawl 90, Figs. 65 and 164, pivoted in the upper bank and normally resting on the plate 139. This will lift said pawl 90, which will come in front of the lever E, thus preventing the pull-button 92 from being drawn out.

As has already been said, none of the voting mechanisms in the upper bank can be operated until the pull-button 92 has been pulled out. Thus it will be seen that the lifting of the bar 89, which occurs when any one of the straight-ticket keys is depressed, will prevent any of the voting mechanisms in the upper bank from being actuated. On the other hand, when the straight-ticket keys are reset by the partial rotation of the main shaft N the arm 331 will be allowed to rise and the spring $333^a$ will pull down the bar 89, rendering it possible to pull out the button 92.

Referring now to Figs. 146 and 167, 355 represents a block fastened to the bottom 13 of the machine, and in this block is pivotally supported an upright shaft 328, provided with a lip 330, which lip is adapted to fit over the arm 331 when the latter is depressed, as may be done by hand after the removal of the plate P, Fig. 5, and hold the upper bank locked by means of the connections 331, 332, 333, and 89, as has been already described. When one of the straight-party-ticket keys has been actuated, the arm 325 is drawn back by the action of voting, (by means of the tilting lever 22 25,) and the bar 81 is drawn back at the same time. When the machine is reset by the rotation of the main shaft N, the bar 81 is drawn forward by the spring attached thereto and passes into the cut-away portion 86 of the bar 79 by means of said spring. As the bar 81 is thrown forward the bar 325 is also thrown forward and the projection 326 draws forward the vertical bar 328, disengaging the dog 330 from the arm 331, thereby allowing the bar 89 to fall and releasing the upper bank.

The mechanism by which the pull-button 92 is allowed to be drawn back into place will next be described. The hub on the top of the shaft 463, Fig. 10, is provided with a curved cam 467. This cam engages with a bar 475. (See Figs. 3 and 69.) This bar 475 is actuated by the spring $475^a$, Fig. 3, and when the pull-button 92 is drawn out the bar 475 flies behind the plate E and locks the pull-button in its outward position. The rotation of the shaft 463, which is caused by the rotation of the main shaft N, presses back the spring-actuated bar 475 and allows the plate E to fall or to be pressed back to its original position.

It is of course necessary, if any key in the upper bank is to be operated, that the straight-ticket keys be locked before or at the time of such operation. This locking is effected when the pull-button 92 is drawn out (this being an essential prerequisite to the movement of any key and to the operation of any irregular-voting mechanism in the upper bank) as follows: To the shaft 281, Figs. 65 and 164, by which the arm E and pull-button 92 are supported, is rigidly fastened an arm E', to which is attached a horizontal sliding bar 290, Figs. 65 and 164, provided with a downward extension 291. This extension is adapted to engage a vertical lever 292, pivoted upon a bracket $292^a$, attached to the base of the lower bank. This lever is connected by a link 293 with the dog 301 on the shaft 300, which dog has attached to it the bent arm 302, which carries the locking and releasing bar 28 for the straight-ticket keys, Figs. 49, 50, 65, and 164. This sets free the spring-actuated locking-rack 40 for the straight-ticket keys, and thus locks said keys. The drawing out of the pull-button 92 therefore locks the straight-ticket keys by means of these connections. When the pull-button returns to its original position under the influence of the resetting mechanism, which is operated by the shaft N, the arm E' is thrown back, and the rack 40 for the straight-ticket keys is held in the unlocked position by the spring-operated bar 28, Fig. 50.

The resetting of the irregular-voting mechanism of the upper bank is accomplished in two ways, one by the voter himself when he desires to vote for more than one candidate in a group who have not been regularly nominated and the other by the rotation of the main shaft N when the whole machine is at rest. Both forms of resetting mechanism are shown in Figs. 141, 142, and 143. The sliding plate 249 is provided with an angular arm 268, affixed thereto and terminating in a hook. A spring 270, attached to the sliding plate 249 and the cover 247, normally holds the former closed. A second hook 269 is pivoted in an ear $269^a$ on the cover 247, and a spring $269^b$ normally holds the rear end of the hook 269 elevated. A lever 271, extending through a slot in the casing 241 and pivoted in an ear $271^a$, is adapted to engage the hook 269. When the sliding plate 249 has been moved down far enough to operate the regulating-wheel 121 by means of the connections already described, the hook 268 engages with the hook 269, holding the plate 249 locked in its open position. Before a second irregular vote can be written upon the paper-roll the lever 271 must be depressed, whereupon the spring 270 carries back the plate 249 to its normal closed position. The lever 271 must of course be operated for every succeeding irregular vote in the same group.

The upper irregular mechanism is locked in the following way: Before the upper bank is put in condition for voting, which is done by drawing out the pull-button 92, the upper irregular-voting mechanism is locked by the engagement of the bar 272, Fig. 143, in a depression 273 in the sliding plate 249. A lever 275, pivoted in the casing 241 and provided with an extension 276, is pivotally connected to the bar 272, which passes through a slot in an arm $272^a$, attached to the casing 241. The lever 276 and bar 272 are kept in their highest position (thereby locking the upper irregular-voting mechanism) by means of the arm 277 on the shaft 281. Fig. 142. When the pull-button 92 is drawn out to unlock the upper bank, the shaft 281 is partially rotated, (see Fig. 65,) causing the arm 277 to drop, thereby releasing the upper irregular-voting mechanism. This mechanism is reset after one voter has finished voting and left the machine by the following means, which is shown in Figs. 141 and 142, it being supposed that the irregular-voting mechanism has been used and the plate 249 has been left in an open position by means of the hooks 268 and 269: On the plate 139 is fastened a fixed bracket 480, the rear end of which is upturned. A pin $484^a$ is slidably supported in brackets 484 on the casing 241. The upper end of the pin $484^a$ is adapted to engage one end of the hook 269, and the horizontal arm of a bell crank-lever 482 engages the other end of said pin. The vertical arm of said lever extends downwardly into proximity with the bar 171. A bent arm 483 is pivotally attached to said vertical arm and is also pivoted to a pin on the bracket 480, Fig. $142^a$, the outer part of said arm 483 being in engagement with the pawl-arm 261. When the rod 171 is drawn along by the chain 469 to reset the upper bank, it moves in a curved path, forcing the vertical arm of the lever 482 forward, which action draws the pawl-arm 261, by means of the bent arm 482, backward, thereby disengaging said pawl-arm from the wheel 121, and it also forces the pin $484^a$ upward, thereby separating the hooks 267 and 268, whereupon the plate 249 is forced into its normal closed position by the spring 270.

Means are also provided for locking the whole machine at the end of an election when it is desired to obtain the returns. The plate K, Fig. 1, is provided with a longitudinal slot, preferably covered with glass, which slot is located immediately in front of the registers of the lower bank. This slot is covered by a sliding plate (not shown) during the election, except that the total vote can at all times be seen, a small slot registering with a part of the slot on the plate K being provided in the sliding plate for that purpose. Immediately above and near one end of this sliding plate is a pivoted guard 373, provided with a locking-hasp 374, Figs. 148 and 167. This guard is secured to the shaft 369, located in brackets in the removable casing $369^a$. This shaft is provided with a cam 371 and a hook 370, Figs. 144, 145, 148, and 167. This hook when turned to a horizontal position, Figs. 144 and 167, which occurs when the guard 374 is turned up to expose a keyhole behind it, engages the top of a bar 400, Figs. 144, 148, and 167, pivoted near its center to a bracket (not shown) on the base of the machine. The shaft 300, Figs. 148 and 167, which extends nearly the whole length of the lower bank, is provided with a dog 404, on which is a pin 403, against which the lower end of the bar 400 bears, the spring 402 holding said bar in contact with said pin. As the bar 300 is tilted whenever a straight-ticket key is voted, the construction described will prevent the movement of a straight-ticket key as long as the guard is raised and conversely will prevent the operation of the guard 373 as long as any of the keys of the lower bank are in a depressed condition. The cam 371 when the guard is raised engages the extension 345, Figs. 146 and 167, of the bent lever 341, which is pivoted in an ear 342, supported on a bar 344, which in turn is supported by the through-shafts in the arms 17 and 18 of the brackets B, on which shafts the registering wheels and tapes of the lower bank are supported. On a pin 347 in the lever 341 is pivoted a link 340, the other end of which is attached to the horizontal arm 339 of a bell-crank lever, which is mounted on a shaft 338, which extends between two adjacent brackets B. To the vertical arm 337 of this bell-crank lever is attached a link 336, which is provided with a slot 327ª at its outer end. With this slot engages a lug 329 on the vertical bar 328, which is provided with a lug 330 and is pivoted in an ear 355, secured to the base 13 of the machine, Figs. 146 and 167. To the bar 81, Figs. 84, 86, and 146, which engages with the locking-bar 79, is pivoted at 324 a link 325, the rear end of which is supported in a bracket 327, located on one of the brackets B. On the link 325, behind the bar 328, is a triangular extension 326, Figs. 86, 146, and 167, with which the bar 328 engages when it is swung back by the link 326, this action drawing back the bar 81 and releasing the bar 79, thus locking the straight-ticket keys, the single-candidate groups, and the irregular-voting mechanisms of the lower bank. The bar 328 is provided with a horizontal extension, Fig. 63, running along the base of the machine and terminating in an upward extension 249, to which is pivoted the locking and releasing bar 350, Fig. 62, which engages with the slot 351 in the locking and resetting bar h, Fig. 92, for the amendments or questions mechanism, allowing said bar to be drawn to the left by the springs attached thereto, thus locking the questions or amendments mechanism. Thus the rearward motion of the bar 328 (caused by the swinging of the guard 373) locks all the voting mechanisms of the lower bank.

To lock the upper bank, it is necessary to insert a key through the opening uncovered by the movement of the guard 373. This key is adapted to engage with the square end 377 of a shaft 378, Figs. 148, 159, 165, and 167, located near the right-hand end of the machine and near the shaft 369. The shaft 378 carries a dog 375, Fig. 159, which is normally held in a horizontal position by a spring on the shaft 378. On the bracket B at the right-hand end of the machine is mounted a supporting-bracket 381ᵇ, on which is pivoted a movable arm 381′, with one end of which the dog 375 engages when it is moved down, Fig. 159. To the other end of the arm 381′ is secured a sliding bar 381, Fig. 88. The bar 381 is screw-threaded at its upper end, so that the connection between the bar 381 and the arm 381′ is an adjustable one. A spring 381ª, Figs. 88 and 159, is attached to the end bracket B and to the pivoted arm 381′, normally holding the latter in a horizontal position. The lower squared end of the bar 381 is supported in a bracket 843, Fig. 88, secured to the end bracket B, and is adapted to engage in a notch 382 of the sliding bar 384, Figs. 5 and 88. This bar has an enlarged head and is adapted when in its foremost position to engage with the bars h, 45, and 79, rendering it impossible to reset said bars until the bar 384 has been restored to its original position. To the rear end of this bar 384 is fastened a rod 385, provided with a triangular cam 390. A spring 386, attached to the rod 385 and to one of the brackets B, throws the rod 385 and bar 384 forward when the latter is released by the upward movement of the bar 381. The bar 384 can be restored to its normal position by hand after the removal of the plate P, Fig. 5, a clip 466 being provided for this purpose. Mounted in clips on the end bracket B is a vertical rod 391, the lower end of which is adapted to engage the cam 390 on the rod 385 when it is drawn forward by the spring 386, Fig. 5. A spring 393 normally holds the rod 391 depressed until the latter is acted upon by the cam 390. The upper part of the rod 391 has an L-shaped head 392 formed upon it, which head is adapted to fit under the pawl 90, Fig. 65, when lifted by the cam 390. This prevents the drawing out of the pull-button, as already explained in connection with the rod 89, and locks the entire upper bank, as no votes can be cast in the upper bank until the pull-button 92 has been drawn out. Means are also provided whereby the shield covering the registering mechanisms in the upper bank cannot be removed until the whole machine is locked—in other words, whereby the count cannot be taken in the upper bank while any part of the machine is unlocked. This means is shown in Figs. 147, 148, 155, 165, and 166. The rear casing 93 is provided with a tapering slot 705, Figs. 34 and 155, extending nearly the whole length of said casing, and is preferably covered by a strip or strips of glass 706, Fig. 155. Back of this slot is provided a hinged door 704, Fig. 155, or a sliding shield or cover 405, Fig. 147, preferably the latter. The key-shaft 378 has a crank 406 on its rear or inner end, and this crank is provided with a pin 407. A short shaft 408 is pivoted in bearings located on the anchor-plate 102, Fig. 155, and the rear casing 95. This shaft is provided with a crank 409 on its front end, which crank is adapted to be moved by the pin 407, thereby partially rotating the shaft 408, which is provided with a cam 410 on its rear end, Figs. 147 and 165. This cam 410 engages when turned upward with a sliding plate 411, which slides in ways (not shown) on the rear casing 95. This plate is provided with a slot and a projection 413 therein, and a spring 413ª, attached to a pin on the rear casing and to the sliding plate, normally holds the latter in contact with the cam 410. The sliding plate 405, which conceals the registering mechanisms of the upper bank, has a hasp 415 hinged thereto, which hasp is provided with a perforated projection 414, which is engaged by the hook or projection 413 while the election is in progress. The shield 405, therefore, cannot be withdrawn to expose the count until the key-shaft 378 has been turned, which locks the entire machine.

To prevent any person from operating the main shaft N after the bar 384 has been returned to its normal position, but before the voting begins, a locking mechanism is provided, which is shown in Figs. 1 and 90. The removable plate B' is provided with a key-opening, (shown in dotted lines in Fig. 90,) which is located behind the hasp-plate 431, which is hinged to the plate B'. In the plate B' and covered by the hasp-plate 431 is an opening 432, which registers with an opening 433 in the main resetting-bar 79, Fig. 106. A pin $n$, Fig. 90, is adapted to pass through the openings 432 and 433, thus securely locking the bar 79, thus preventing its movement, and thereby also preventing the movement of the shaft N. The hasp 431 fits over a perforated projection $434^a$ on the plate B' and is adapted to be locked in that position by an ordinary padlock. The bar 79 is also provided with a rack 434, Fig. 106, adapted to be engaged by the key 435. (Shown in Figs. 149 and 152.) After the hasp-plate 431 has been thrown back and the pin removed the bar 79 may be operated by the key 435. This construction is especially useful in adjusting the machine.

It is of course obvious that many changes might be made without departing from the spirit of my invention. For example, the main crank M might be located on the rear of the machine instead of on the front, as shown, or the main shaft N might be operated by a turnstile or by a swinging platform operated by the weight of the voter, and many other changes will suggest themselves to those skilled in the art to which my invention appertains. I wish it to be distinctly understood, therefore, that I do not limit myself to the exact details shown.

Having thus described my invention, what I claim as new, and desire to secure by Letters Patent of the United States, is—

1. In a voting-machine, the combination of single-candidate-group-voting mechanism, straight-ticket-voting mechanism, and means whereby the operation of either of said mechanisms will prevent the operation of the other mechanism.

2. In a voting-machine, the combination of single-candidate-group-voting mechanism composed of members each representing a single candidate, straight-ticket-voting mechanism composed of members each representing a political party, and means whereby the operation of any one of the members of either mechanism will prevent the operation of all of the members of the other mechanism.

3. In a voting-machine, the combination of single-candidate-group-voting mechanism composed of members each representing a single candidate, straight-ticket-voting mechanism composed of members each representing a political party, and means whereby the operation of any one of the members of either of said mechanisms will prevent the operation of all the other members of both mechanisms.

4. In a voting-machine, the combination of single-candidate-voting mechanism, straight-ticket-voting mechanism, and means whereby the operation of either of said mechanisms will lock both of said mechanisms against operation.

5. In a voting-machine, the combination of single-candidate-group-voting mechanism, composed of members each representing a single candidate, straight-ticket-voting mechanism composed of members each representing a political party, and means whereby the operation of any member of either of said mechanisms will prevent the operation of all of the members of both of said mechanisms.

6. In a voting-machine, the combination with a series of keys, one key for each candidate, of another series of keys one key for each straight party-ticket, and means whereby the operation of any one of the keys of either series will prevent the operation of all the keys of the other series.

7. In a voting-machine, the combination with a series of keys, one key for each candidate, of another series of keys one key for each party-ticket, and means whereby the operation of any one of the keys of either series will prevent the operation of all the other keys of both series.

8. In a voting-machine, the combination with a series of keys, one key for each candidate, of another series of keys one key for each straight party-ticket, and means whereby the operation of any one of the keys of either series will prevent the operation of all the keys of both series.

9. In a voting-machine, the combination of a series of registers one for each candidate, with another series of registers one for each straight party-ticket, individual operating means for each register, and connections whereby upon the operation of any one of the operating means of either series all the operating means of the other series will be locked.

10. In a voting-machine, the combination of a series of registers one for each candidate, with another series of registers one for each party-ticket, individual operating means for each register, and connections whereby upon the operation of any one of the operating means of either series, all the other means of both series will be locked.

11. In a voting-machine, the combination of a series of registers one for each candidate, with another series of registers one for each straight party-ticket, individual operating means for each register, and connections whereby upon the operation of any one of the operating means of either series, all the operating means of both series will be locked.

12. In a voting-machine, the combination of straight ticket-voting mechanism, and irregular-voting mechanism, and means whereby the operation of the straight-ticket mechanism will prevent the operation of the irregular-voting mechanism.

13. In a voting-machine, the combination of irregular-voting mechanism, straight-ticket-voting mechanism, composed of members, each representing a political party, and means whereby the operation of any one of the members of said straight-ticket mechanism will prevent the operation of the irregular-voting mechanism.

14. In a voting-machine, the combination of irregular-voting mechanism, straight-ticket-voting mechanism, composed of members each representing a political party, and means whereby the operation of any one of the members of the straight-ticket-voting mechanism will prevent the operation of the other members of the straight-ticket-voting mechanism, and will also prevent the operation of the irregular-voting mechanism.

15. In a voting-machine, the combination of irregular-voting mechanism, straight-ticket-voting mechanism, composed of members each representing a political party, and means whereby the operation of any one of the members of the straight-ticket-voting mechanism will lock the other members of the straight-ticket-voting mechanism, and will also lock the irregular-voting mechanism.

16. In a voting-machine, the combination of straight-ticket-voting mechanism, single-candidate-group-voting mechanism, interlocking mechanism between said voting mechanisms, and means whereby the operation of any one of the members of either of said voting mechanisms will lock from operation the other voting mechanism, through said interlocking mechanism.

17. In a voting-machine, the combination of straight-ticket mechanism, composed of members each representing a political party, single-candidate-group-voting mechanism, composed of members, each representing a single candidate, interlocking mechanism common to said voting mechanisms, and means whereby the operation of any one of the members of either of said voting mechanisms will operate said interlocking mechanism, thereby preventing the operation of any of the members of both of said voting mechanisms.

18. In a voting-machine, the combination of straight-ticket mechanism, single-candidate-group-voting mechanism and interlocking mechanism common to said voting mechanisms, means whereby the operation of any one of the members of either of said voting mechanisms will lock from operation the other voting mechanisms, through said interlocking mechanism, and resetting mechanism.

19. In a voting-machine, the combination of straight-ticket-voting mechanism, composed of members each representing a political party, single-candidate-group-voting mechanism, composed of members each representing a single candidate, interlocking mechanism common to both of said voting mechanisms, means whereby the operation of any one of the members of either of said voting mechanisms will prevent the operation of any one of the members of both of said voting mechanisms, through said interlocking mechanism, and resetting mechanism.

20. In a voting-machine, the combination of straight-ticket mechanism, single-group-voting mechanism and interlocking mechanism for each of said voting mechanisms, and means whereby the operation of any one of the members of either of said voting mechanisms will lock from operation the interlocking mechanism of the other voting mechanism.

21. In a voting-machine, the combination of straight-ticket-voting mechanism, composed of members each representing a political party, interlocking mechanism therefor, single-candidate-group-voting mechanism composed of members each representing a single candidate, interlocking mechanism therefor, and means whereby the operation of any one of the members of either of said voting mechanisms will lock from operation the interlocking mechanisms of both of said voting mechanisms, thereby preventing the operation of any of the members of either of said voting mechanisms.

22. In a voting-machine, the combination of straight-ticket-voting mechanism, single-candidate-group-voting mechanism, means whereby the operation of any one of the members of either of said voting mechanisms will lock from operation the interlocking mechanism of the other voting mechanism, and resetting mechanism.

23. In a voting-machine, the combination of straight-ticket-voting mechanism, composed of members each representing a political party, interlocking mechanism therefor, single-candidate-group-voting mechanism composed of members each representing a single candidate, interlocking mechanism therefor, means whereby the operation of any one of the members of either of said voting mechanisms will lock from operation the interlocking mechanism of both voting mechanisms, thereby preventing the operation of any of the members of either of said voting mechanisms, and resetting mechanism.

24. In a voting-machine, the combination of an irregular-voting mechanism, straight-ticket-voting mechanism, and means whereby the operation of the irregular-voting mechanism will prevent the operation of the straight-ticket-voting mechanism.

25. In a voting-machine, the combination of an irregular-voting mechanism, straight-ticket-voting mechanism, composed of members each representing a political party, and means whereby the operation of the irregular-voting mechanism will prevent the operation of all the members of said straight-ticket-voting mechanism.

26. In a voting-machine, the combination of single-candidate-group-voting mechanism composed of members each representing a single candidate, straight-ticket-voting mechanism composed of members each representing a political party, and means whereby the operation of any one of the members of either mechanism will lock all the members of both mechanisms in their voted and unvoted positions respectively.

27. In a voting-machine, the combination of irregular-voting mechanism, means for voting a straight ticket by the operation of a single key, and means whereby the operation of the irregular-voting mechanism will lock the straight-ticket-voting means from operation.

28. In a voting-machine, the combination of single-candidate-voting mechanism including keys, straight-ticket-voting mechanism including keys, and means whereby the operation of a key in either of said voting mechanisms will lock all the keys of both voting mechanisms in their voted and unvoted positions, respectively.

29. In a voting-machine, the combination of single-candidate-voting mechanism, straight-ticket-voting mechanism and means whereby the voting of a split ticket will prevent the operation of the straight-ticket-voting mechanism.

30. In a voting-machine, the combination of means for voting a straight party-ticket by means of keys, one for each party, single-candidate keys, one for each candidate and means whereby the voting of a split ticket on the single-candidate keys will lock the straight-ticket keys against voting operation.

31. In a voting-machine, the combination of straight-ticket keys, single-candidate keys and means whereby the operation of a plurality of said single-candidate keys of two or more political parties will, so long as said keys remain in their voted positions, prevent the operation of all the straight-ticket keys.

32. In a voting-machine, the combination of two or more series of individual registering-keys, counters for and operated by respective keys, and a separate series of straight-ticket keys operable independently of said individual keys, and interlocking means between the sets of keys.

33. In a voting-machine, the combination of straight-ticket-voting devices and multicandidate-group-voting devices, each separately operable by a voter, and means whereby the operation of the straight-ticket devices will prevent the operation of the multicandidate-group-voting devices.

34. In a voting-machine, the combination of straight-ticket-voting mechanism, including keys, one for each party, and multicandidate-group-voting mechanism, including keys, one for each candidate, and means whereby the operation of any one of the keys of the straight-ticket mechanism will prevent the operation of all of the keys of the multicandidate-group-voting mechanism.

35. In a voting-machine, the combination of multicandidate-group-voting mechanism and straight-ticket-voting mechanism, and means whereby the operation of the multicandidate-group-voting mechanism will prevent the operation of the straight-ticket mechanism.

36. In a voting-machine, the combination of multicandidate-group-voting mechanism, composed of members, one for each candidate, and straight-ticket-voting mechanism composed of members, one for each party, and means whereby the operation of any one of the members of the multicandidate-group-voting mechanism will prevent the operation of all the members of the straight-ticket-voting mechanism.

37. In a voting-machine, the combination of multicandidate-group-voting mechanism, composed of members, one for each candidate, straight-ticket-voting mechanism composed of members, one for each party, means whereby the operation of any member of the multicandidate-group-voting mechanism will prevent the operation of all the members of the straight-ticket-voting mechanism, and means for preventing the operation of any of the members of the multicandidate-group-voting mechanism after a predetermined number thereof have been operated.

38. In a voting-machine, the combination of multicandidate-group-voting mechanism composed of members, one for each candidate, straight-ticket-voting mechanism composed of members, one for each party, means whereby the operation of any one of the members of said multicandidate-group-voting mechanism will prevent the operation of all of the members of said straight-ticket-voting mechanism, means for preventing the operation of any of the members of said multicandidate-group-voting mechanism after a predetermined number thereof have been operated, and means for preventing the simultaneous action of any two of the members of said multicandidate-group-voting mechanism.

39. In a voting-machine, the combination of multicandidate-group-voting mechanism composed of members, one for each candidate, straight-ticket-voting mechanism composed of members, one for each party, means whereby the operation of any one of the members of said multicandidate-group-voting mechanism will prevent the operation of all of the members of the straight-ticket-voting mechanism, means limiting the number of members of said multicandidate-group-voting mechanism which may be operated by a single voter, and means for locking the members of said multicandidate-group-voting mechanism when a predetermined number thereof have been operated by the voter.

40. In a voting-machine, the combination of multicandidate-group-voting mechanism composed of members, one for each candidate, straight-ticket-voting mechanism composed of members, one for each party, means for limiting the number of members of said multicandidate-group-voting mechanism that may be operated by one voter, and means for locking the members of said multicandidate-group-voting mechanism when a predetermined number thereof have been operated, some in their normal position and the others in an operated position.

41. In a voting-machine, the combination of straight-ticket-voting mechanism, irregular-multicandidate-group-voting mechanism, and means whereby the operation of the straight-ticket-voting mechanism will prevent the operation of the irregular-multicandidate-group-voting mechanism.

42. In a voting-machine, the combination of straight-ticket-voting mechanism, composed of members, one for each party, irregular-multicandidate-group-voting mechanism, and means whereby the operation of any one of the members of the straight-ticket-voting mechanism will prevent the operation of the irregular-multicandidate-group-voting mechanism.

43. In a voting-machine, the combination of straight-ticket-voting mechanism, composed of members, one for each party, irregular-multicandidate-group-voting mechanism, and means whereby the operation of any one of the members of the straight-ticket-voting mechanism will prevent the operation of the other members of the straight-ticket-voting mechanism and also of the irregular-multicandidate-group-voting mechanism.

44. In a voting-machine, the combination of straight-ticket-voting mechanism, composed of members, one for each party, irregular-multicandidate-group-voting mechanism, and means whereby the operation of any one of the members of the straight-ticket-voting mechanism will lock all the members of said straight-ticket-voting mechanism and will also prevent the operation of the irregular-multicandidate-group-voting mechanism.

45. In a voting-machine, the combination of straight-ticket-voting mechanism, irregular-multicandidate-group-voting mechanism, and means whereby the operation of said irregular mechanism will prevent the operation of said straight-ticket mechanism.

46. In a voting-machine, the combination of straight-ticket-voting mechanism, composed of members, one for each party, irregular-multicandidate-group-voting mechanism, means whereby the operation of said irregular mechanism will prevent the operation of all the members of said straight-ticket-voting mechanism until the machine has been reset.

47. In a voting-machine, the combination of straight-ticket-voting mechanism, mulitcandidate-group-voting mechanism, irregular-multicandidate-group-voting mechanism, a limiting means controlling the number of votes, whether regular or irregular, common to both of said last-named voting mechanisms, and means whereby the operation of either of said last-named mechanisms will prevent the operation of the straight-ticket-voting mechanism.

48. In a voting-machine, the combination of straight-ticket-voting mechanism, composed of members, one for each party, multicandidate-group-voting mechanism, composed of members, one for each candidate, an irregular-multicandidate-group-voting mechanism, limiting means common to both of the last two-named mechanisms, and means whereby the operation of the irregular-multicandidate-group-voting mechanism, or of any of the members of the multicandidate-group-voting mechanism, will prevent the operation of all of the members of said straight-ticket-voting mechanism.

49. In a voting-machine, the combination of straight-ticket-voting mechanism, composed of members each representing a political party, single-candidate-voting mechanism, composed of members each representing a single candidate, a locking-rack operating immediately upon and in consequence of the movement of any one of the members of said straight-ticket-voting mechanism, thereby preventing the operation of all the members of said single-candidate-voting mechanism, and also preventing the movement of the unoperated members of the straight-ticket-voting mechanism.

50. In a voting-machine, the combination of straight-ticket-voting mechanism, composed of members each representing a political party, irregular-single-candidate-voting mechanism, a locking-rack controlled in its operation by the movement of any one of the members of the straight-ticket-voting mechanism, and means operated by said locking-rack to prevent the operation of said irregular-single-candidate-voting mechanism.

51. In a voting-machine, the combination of straight-ticket-voting mechanism, composed of members one for each party, a locking-rack, operating means for said rack, an irregular-single-candidate-voting mechanism, and means operated by said locking-rack to prevent the operation of said irregular-single-candidate-group-voting mechanism.

52. In a voting-machine, the combination of straight-ticket-voting mechanism, composed of members one for each party, an irregular-single-candidate-voting mechanism, said mechanism being normally held in a locked position, means for unlocking said irregular mechanism, and means operated by the movement of any one of the members of said straight-ticket-voting mechanism to prevent the unlocking of the irregular-single-candidate-group-voting mechanism.

53. In a voting-machine, the combination of straight-ticket-voting mechanism, composed of members one for each political party, an irregular-single-candidate-voting mechanism, means for normally locking said irregular mechanism, means for releasing said locking means, and means operated by the movement of any one of the members of said straight-ticket-voting mechanism to prevent the action of said unlocking means for said irregular mechanism.

54. In a voting-machine, the combination of straight-ticket-voting mechanism including keys each representing a political party, single-candidate-group-voting mechanism including keys each representing a single candidate, a registering mechanism for each of said keys of both mechanisms, a limiting means for each of said groups of mechanisms and interlocking means between said groups.

55. In a voting-machine, the combination of straight-ticket-voting mechanism composed of members one for each political party, an irregular-single-candidate-voting mechanism, means for normally holding said irregular-voting mechanism in a locked condition, means for unlocking said irregular-voting mechanism, a locking-bar, actuating means therefor operated by the movement of any one of the members of said straight-ticket-voting mechanism, means for releasing said locking-bar, and means operated by said locking-bar to prevent the operation of said irregular-voting mechanism.

56. In a voting-machine, the combination of straight-ticket-voting mechanism composed of members one for each political party, a spring-actuated locking-bar, means for releasing said bar by the action of any one of the members of said voting mechanism, an irregular-single-candidate-voting mechanism, means for normally holding said irregular-voting mechanism, means for unlocking said irregular-voting mechanism, and a spring-actuated bar operated by said locking-bar and engaging the unlocking means for the irregular-voting mechanism to prevent the operation thereof.

57. In a voting-machine, the combination of a straight-ticket-voting mechanism composed of members each representing a political party, limiting means preventing the operating of more than one of said members by a single voter, single-candidate-group-voting mechanism composed of members each representing a single candidate, limiting means preventing the operation of more than one of the members of said single-candidate-group-voting mechanism by a voter, means operated by the movement of any one of the members of said straight-ticket mechanism to lock the operated member of said voting mechanism in its operated position and the other members of said straight-ticket-voting mechanism in their normal positions, and also for locking from operation all the members of said single-candidate-group-voting mechanism, consisting of a spring-actuated locking-bar provided with projections, and means for releasing said bar upon the operation of any one of the members of said straight-ticket-voting mechanism.

58. In a voting-machine, the combination of straight-ticket-voting mechanism, an irregular-single-candidate-voting mechanism, means for holding said irregular mechanism normally locked, means for unlocking said mechanism and means operated by said unlocking means to prevent the operation of any of the members of said straight-ticket-voting mechanism.

59. In a voting-machine, the combination of straight-ticket-voting keys, and irregular-single-candidate-voting mechanism, means for holding said irregular mechanism normally locked, means for unlocking said mechanism, and means operated by said unlocking means to prevent the operation of any of the straight-ticket keys.

60. In a voting-machine, the combination of straight-ticket-voting mechanism, an irregular-single-candidate voting mechanism, locking means therefor, means for unlocking said voting mechanism, a locking-rack for said straight-ticket-voting mechanism and means for causing said locking-rack to prevent the operation of any of the members of said straight-ticket-voting mechanism upon the operation of the unlocking means for the irregular-candidate-voting mechanism.

61. In a voting-machine, the combination of straight-ticket-voting mechanism, an irregular-voting mechanism, locking means therefor, means for unlocking said irregular mechanism, a spring-actuated locking-rack for said straight-ticket-voting mechanism and means operated by the unlocking mechanism of the irregular-voting mechanism to release said locking-rack and thereby lock said straight-ticket-voting mechanism from operation.

62. In a voting-machine, the combination of straight-ticket-voting mechanism composed of members each representing a political party, an irregular-single-candidate-voting mechanism, means for holding said irregular-voting mechanism normally locked, means for unlocking said irregular mechanism comprising a shaft provided with a cam, a spring-actuated locking-rack for said straight-ticket-voting mechanism and connections between said unlocking mechanism and said locking-rack for releasing the latter by the movement of the former.

63. In a voting-machine, the combination of straight-ticket-voting mechanism composed of members each representing a political party, an irregular-single-candidate-voting mechanism, means for holding said mechanism normally locked, means for unlocking said irregular mechanism consisting of a shaft provided with a cam, a spring-actuated locking-rack for said straight-ticket-voting mechanism, a releasing-bar engaging a slot and means for withdrawing said releasing-bar from engagement with said locking-rack, said means being connected to the unlocking means for the irregular-voting mechanism.

64. In a voting-machine, the combination of straight-ticket-voting mechanism including keys, each representing a political party, a spring-actuated locking-rack therefor, provided with projections adapted to engage said keys, a releasing-bar for said rack, an irregular-voting mechanism, locking means therefor, means for unlocking said irregular-voting mechanism, a through-shaft and connections between said through-shaft and said unlocking means and between said through-shaft and said releasing-bar.

65. In a voting-machine, the combination of a series of voting-keys each representing a political party, a spring-actuated locking-rack therefor, provided with projections adapted to engage said keys, limiting means preventing the operation of more than one of said keys by a voter, an irregular-voting mechanism, and means operated by the operation of said irregular-voting mechanism to release said locking-rack.

66. In a voting-machine, the combination of a series of keys each representing a political party, limiting means therefor preventing the operation of more than one key by a voter, a spring-actuated locking-rack provided with projections adapted to engage said keys, a releasing-bar engaging a slot in said locking-rack, a through-shaft, dogs on said shaft, connections between one of said dogs and said releasing-bar, an irregular-voting mechanism, means for permitting said irregular-voting mechanism to be operated by a voter and connections between said means and a dog on the through-shaft.

67. In a voting-machine, the combination of a series of keys each representing a political party, a locking-rack provided with projections, a releasing-bar adapted to engage a slot in said rack, a through-shaft, dogs on said shaft, connections between one of said dogs and said releasing-bar, an irregular-voting mechanism, means for normally holding said voting mechanism locked, means for unlocking said mechanism, consisting of a shaft provided with a cam and a spring, and connections between said shaft and a dog on the through-shaft.

68. In a voting-machine, the combination of straight-ticket-voting mechanism, single-candidate-group-voting mechanism, limiting means for each of said mechanisms preventing the operation of more than one of the members of either of said mechanisms by a single voter, and means whereby the operation of any part of the single-candidate-voting mechanism will prevent the operation of any part of the straight-ticket-voting mechanism.

69. In a voting-machine, the combination of straight-ticket-voting mechanism composed of members each representing a political party, single-candidate-group-voting mechanism composed of members each representing a single candidate, limiting means for each of said mechanisms, whereby a voter is prevented from operating more than one member of either of said mechanisms, locking mechanisms, one for each of said voting mechanisms, and means whereby the operation of any member of either of said mechanisms will lock all the other members of both mechanisms.

70. In a voting-machine, the combination of straight-ticket-voting mechanism composed of members each representing a political party, single-candidate-group mechanism composed of members each representing a single candidate, a spring-actuated locking-rack for each of said mechanisms, limiting means for each of said mechanisms, whereby only one member of either of said mechanisms may be operated by a voter, and connections whereby the operation of any member of either of said mechanisms will lock the other members of both of said mechanisms from operation.

71. In a voting-machine, the combination of straight-ticket-voting mechanism composed of members, one for each political party, single-candidate-group mechanism composed of members each representing a single candidate, a spring-actuated locking-rack for each of said mechanisms, means for releasing said locking-racks respectively by the operation of a member of either of said mechanisms, means including a through-shaft provided with dogs fastened thereto and adapted to be struck by any of said members when it is operated, and connections between one of said dogs and the releasing-bar for the locking-rack of the straight-ticket-voting mechanism.

72. In a voting-machine, the combination of straight-ticket-voting mechanism composed of members each representing a political party, single-candidate-group mechanism composed of members each representing a candidate, an irregular-single-candidate-voting mechanism normally locked, a locking-rack for each of the two first-named mechanisms, and connections causing said locking-rack to engage with the members of said straight-ticket-voting mechanism and said single-candidate-group mechanism and lock them from operation, said means being operated by the unlocking movement of said irregular-voting mechanism.

73. In a voting-machine, the combination of straight-ticket-voting mechanism composed of members each representing a political party, single-candidate-group-voting mechanism composed of members each representing a vote, an irregular-single-candidate-voting mechanism normally locked, a locking-rack for each of said first-named voting mechanisms, a releasing-bar engaging in the slot in each of said locking-racks, and means for withdrawing said releasing-bars by the unlocking operation of said irregular-voting mechanism.

74. In a voting-machine, the combination of a series of keys each representing a political party, with another series of keys each representing a single candidate, an irregular-single-candidate-voting mechanism, means for normally holding said irregular-voting mechanism in a locked position, means for unlocking said irregular-voting mechanism, and means operated by said unlocking means to lock from operation all the keys mentioned, whether devoted to parties or candidates.

75. In a voting-machine, the combination of a group of keys, each key representing a political party, of another group of keys each representing a single candidate, an irregular-single-candidate-voting mechanism, a locking-rack for each of said first two groups of mechanism, a releasing-bar engaging in the slot in each of said locking-racks, and means for withdrawing said releasing-bars by the operation of the irregular-voting mechanism.

76. In a voting-machine, the combination of a group of keys each representing a political party, a second group of keys each representing a single candidate, an irregular-single-candidate-voting mechanism, a spring-actuated locking-rack for each of said first two groups, a spring-actuated releasing-bar engaging in a slot in each of said racks, means for normally holding said irregular-voting mechanism locked, means for unlocking said mechanism, and connections whereby the operation of said unlocking means will withdraw said releasing-bars and cause said locking-racks to lock all the keys of both groups.

77. In a voting-machine, the combination of a group of keys each representing a political party, a second group of keys each representing a single candidate, spring-actuated locking-racks provided with projections and adapted to engage said group of keys, a spring-actuated releasing-bar engaging a slot in each of said locking-racks, one of said bars being provided with a projection, an irregular-single-candidate-voting mechanism, means for holding said mechanism normally locked, and means for unlocking said irregular-voting mechanism, consisting of a shaft provided with a cam, said shaft being, also, provided with an arm affixed thereto and adapted to engage the projection on one of said releasing-bars.

78. In a voting-machine, the combination of a group of keys each representing a political party, a second group of keys each representing a single candidate, limiting means for each of said groups, whereby a voter is prevented from operating more than one key in each group, spring-actuated locking-racks for each of said groups, an irregular-single-candidate-voting mechanism, means for holding said mechanism normally locked, means for unlocking said mechanism, and means operated by said unlocking means for releasing said locking-racks.

79. In a voting-machine, the combination of a group of keys each representing a political party, a second group of keys each representing a single candidate, a registering mechanism for each of said keys, an irregular-single-candidate-voting mechanism, and means operated by the operation of said irregular-voting mechanism to prevent the operation of all the keys of the other mechanisms named.

80. In a voting-machine, the combination of a group of keys each representing a political party, a second group of keys each representing a single candidate, registering mechanism operated respectively by each of said keys, and an irregular-single-candidate-voting mechanism interlocked with the other voting mechanisms.

81. In a voting-machine, the combination of straight-ticket-voting mechanism composed of keys each representing a political party, single-candidate-group-voting mechanism composed of keys each representing a single candidate, counters or registers operatively connected to each of said keys, an irregular-single-candidate-voting mechanism, and means whereby the operation of any one of said mechanisms will prevent the operation of the other two.

82. In a voting-machine, the combination of straight-ticket-voting mechanism composed of keys each representing a political party, single-candidate-group mechanism composed of keys each representing a single candidate, a registering or counting mechanism for each of said keys, limiting means for each of said mechanisms, an irregular-voting mechanism, means for holding said mechanism normally locked, means for unlocking said irregular mechanism, and means operated by said unlocking means to lock said straight-ticket-voting mechanism and said single-candidate-group mechanism.

83. In a voting-machine, the combination of straight-ticket-voting mechanism including keys each representing a political party, single-candidate-group-voting mechanism including keys each representing a single candidate, a spring-actuated locking-rack for each of said groups of mechanism, means for releasing said rack, an irregular-single-candidate-voting mechanism, a registering mechanism for each of said keys, and means operated by the operation of said irregular-voting mechanism to release said locking-racks.

84. In a voting-machine, the combination of straight-ticket-voting mechanism including keys each representing a political party, single-candidate-group-voting mechanism, including keys, each representing a single candidate, a spring-actuated locking-rack for each of said mechanisms, a spring-actuated releasing-bar engaging in a slot in each of said locking-racks and one of said bars being provided with a projection, an irregular-single-candidate-voting mechanism, means for holding said mechanism normally locked, unlocking means for said mechanism consisting of a cam-shaft adapted to be operated by a key in the hand of a voter, said cam-shaft being provided with an arm engaging the projection on one of said spring-actuated releasing-bars.

85. In a voting-machine, the combination of straight-ticket-voting mechanism composed of keys each representing a political party, single-candidate-group-voting mechanism composed of keys each representing a single candidate, a spring-actuated locking-rack for each of said mechanisms, a releasing-bar engaging in a slot in each of said locking-racks, an irregular-single-candidate-voting mechanism, means for holding said mechanism normally locked, a cam-shaft for unlocking said mechanism, and connections operated by said cam-shaft for withdrawing said releasing-bars from engagement with said locking-racks.

86. In a voting-machine, the combination of straight-ticket-voting mechanism, multicandidate-group-voting mechanism, irregular-multicandidate-group-voting mechanism, means for holding said last two mechanisms locked, means for unlocking said mechanisms, and means operated by said straight-ticket mechanism to prevent the operation of said unlocking means.

87. In a voting-machine, the combination of straight-ticket-voting mechanism composed of members each representing a political party, multicandidate-group-voting mechanism composed of members each representing a single candidate, irregular-multicandidate-group-voting mechanism, means for holding said last two mechanisms locked, means for unlocking said mechanisms, and means connected to said unlocking means whereby the operation thereof will prevent the operation of any of the members of the straight-ticket-voting mechanism.

88. In a voting-machine, the combination of straight-ticket-voting mechanism composed of members each representing a political party, an irregular-multicandidate-group-voting mechanism, means for holding said mechanism normally locked, means for unlocking or releasing said irregular mechanism, means whereby the operation of any one of the members of said straight-ticket-voting mechanism will prevent the operation of said unlocking means, and means whereby the operation of any one of the members of said straight-ticket-voting mechanism will lock said member in its operated position and will also lock the other members thereof in their unoperated positions.

89. In a voting-machine, the combination of straight-ticket mechanism, single-candidate-voting mechanism, irregular-single-candidate-voting mechanism, and means released by the action of the straight-ticket mechanism preventing the operation of the other two mechanisms named.

90. In a voting-machine, the combination of straight-ticket mechanism, single-candidate-voting mechanism, irregular-single-candidate-voting mechanism, and a locking-rack released by the action of the straight-ticket-voting mechanism.

91. In a voting-machine, the combination of straight-ticket mechanism, single-candidate-voting mechanism, irregular-single-candidate-voting mechanism, means for locking the last two mechanisms by the operation of the straight-ticket mechanism, and means for releasing said locking means.

92. In a voting-machine, the combination of straight-ticket mechanism, single-candidate-voting mechanism, irregular-single-candidate-voting mechanism, a spring-actuated locking-rack and means for releasing said rack by the action of the straight-ticket mechanism.

93. In a voting-machine, the combination of a casing, straight-ticket-voting mechanism, single-candidate-voting mechanism, irregular-voting mechanism, a locking-rack, springs connecting said locking-rack to said casing, and means for releasing said locking-rack by the action of the straight-ticket mechanism.

94. In a voting-machine, the combination of straight-ticket-voting mechanism, single-candidate-voting mechanism, irregular-voting mechanism, a locking-rack, and means for operating said locking-rack thereby locking the three mechanisms named.

95. In a voting-machine, the combination of straight-ticket-voting mechanism, composed of members each representing a political party, multicandidate-group-voting mechanism, locking means for said mechanism, a hand-operated lever and connections between said lever and said locking means.

96. In a voting-machine, the combination of straight-ticket-voting mechanism, locking means therefor, multicandidate-group-voting mechanism, irregular-multicandidate-group-voting mechanism, locking means for said mechanisms, a hand-operated lever and connections between said lever and all of said locking means.

97. In a voting-machine, the combination of straight-ticket-voting mechanism, locking means therefor, multicandidate-group-voting mechanism, irregular-multicandidate-group-voting mechanism, the two mechanisms last named being normally held in a locked position, means for unlocking or releasing the two mechanisms last named, a hand-operated lever, connections between said lever and the locking means for the straight-ticket-voting mechanism, and connections whereby the operation of said lever will prevent the operation of the unlocking means for the multicandidate-group-voting mechanisms, both regular and irregular.

98. In a voting-machine, the combination of straight-ticket-voting mechanism, a movable key-guard, and means whereby the operation of said key-guard will prevent the operation of said straight-ticket-voting mechanism.

99. In a voting-machine, the combination of straight-ticket-voting mechanism, single-candidate-group-voting mechanism, each comprising movable keys, a spring-actuated locking-bar, a tilting plate below said straight-ticket-voting mechanism and controlling one movement of said spring-actuated locking-bar, and means for returning said locking-bar, said parts being so arranged that when one of the straight-ticket keys is depressed it locks the keys within the single-candidate-group-voting mechanism.

100. In a voting-machine, the combination of straight-ticket-voting mechanism, single-candidate - group - voting mechanism, each provided with movable keys, said straight-ticket mechanism being provided with a locking-rack, and said rack being controlled by the keys in said single-candidate-group-voting mechanism, so that when any key within said single-candidate-voting mechanism is depressed it locks the straight-ticket-voting mechanism.

101. In a voting-machine, the combination of straight-ticket-voting mechanism, single-candidate-group-voting mechanism, each provided with keys, a suitable locking-rack for said straight-ticket-voting mechanism, and a tilting plate in said single-candidate-group-voting mechanism, said tilting plate controlling the movement in one direction of said locking-rack, and means for moving said locking-rack in a second direction.

102. In a voting-machine, the combination of straight-ticket-voting mechanism, single-candidate-group-voting mechanism, each including movable keys, a spring-actuated locking-rack for each of said mechanisms, said keys being adapted when voted to release the locking-racks respectively, and an interlocking mechanism comprising a bar adapted to lock the keys within said single-candidate-voting mechanism whenever one of the straight-ticket keys is depressed.

103. In a voting-machine, the combination of straight-ticket-voting mechanism, single-candidate-group-voting mechanism, each including movable keys, a locking mechanism for each of said voting mechanisms, and limiting means for each of said voting mechanisms comprising movable contact-plates, and an interlocking mechanism in connection with the single-candidate-voting mechanism comprising a tilting plate, which plate releases the locking-rack of the straight-ticket mechanism to lock the keys of said mechanism when one of the keys of the single-candidate-voting mechanism is depressed.

104. In a voting-machine, the combination of straight-ticket-voting mechanism, single-candidate-group-voting mechanism, an irregular-voting mechanism for each single-candidate-group-voting mechanism, a multicandidate-group-voting mechanism, limiting mechanism so arranged that no two voting mechanisms or parts thereof can be simultaneously operated, and interlocking mechanism so arranged that when one of the parts of the straight-ticket-voting mechanism is operated all of the actuating parts of the single-candidate-group-voting mechanisms, the multicandidate-group-voting mechanisms and the irregular-voting mechanisms are locked.

105. In a voting-machine, the combination of straight-ticket-voting mechanism, single-candidate-group-voting mechanisms, an irregular-voting mechanism in connection with each single-candidate-group-voting mechanism, multicandidate-group-voting mechanism, an adjustable irregular-group-voting mechanism in connection with said multicandidate-group-voting mechanism, interlocking mechanism so arranged that when one of the members of the straight-ticket mechanism is operated all of the operating parts of the other mechanisms are locked, and a resetting mechanism.

106. In a voting-machine, the combination of multicandidate-group-voting mechanism, composed of members each representing a single candidate, regulating mechanism to prevent the simultaneous operation of two or more of said members, an irregular-voting mechanism in connection with said multicandidate-group-voting-mechanism, both of said groups being adjustable as to the number of votes that a single voter may cast, the parts being so arranged that voting in the group will be stopped after a predetermined number of votes have been cast, whether these votes are cast in the multicandidate-group-voting mechanisms or in the irregular-group-voting mechanism, or partly one and partly in the other.

107. In a voting-machine, the combination of straight-ticket-voting mechanism, an irregular - multicandidate - group - voting mechanism, and interlocking mechanism between the two whereby the operation of either of said mechanisms will prevent the operation of the other of said mechanisms.

108. In a voting-machine, the combination of straight-ticket-voting mechanism, single-candidate-group-voting mechanism, an irregular-voting mechanism corresponding to said single-candidate-voting mechanism, interlocking mechanism between the last two named mechanisms and releasing means for said irregular-voting mechanism and interlocking mechanism arranged to lock both the straight-ticket-voting mechanism and the single-candidate-group-voting mechanism when said irregular-voting mechanism is used.

109. In a voting-machine, the combination of straight-ticket-voting mechanism, single-candidate-group-voting mechanisms, an irregular-voting mechanism for each of said single-candidate-group-voting mechanisms and connections whereby said single-candidate-voting mechanisms and said irregular-voting mechanisms will lock whenever any part of the straight-ticket-voting mechanism is operated.

110. In a voting-machine, the combination of a plurality of voting systems comprising one main or straight-ticket voting system and a series of auxiliary voting systems, mechanism peculiar to each system controlling the number of members therein that may be actuated by a voter, a separate locking mechanism for each of said systems, the locking mechanism of said auxiliary system being so connected to the locking mechanism of the main system that if any one auxiliary system is actuated the main register system is closed, and connections for locking all the systems when a predetermined number of votes have been cast.

111. In a voting-machine, the combination of straight-ticket-voting mechanism, single-candidate-group-voting mechanism, and a spring-actuated locking-bar, said locking-bar being released by the operation of any one of said straight-ticket keys, thereby controlling the operation of all the members of both voting mechanisms.

112. In a voting-machine, the combination of straight-ticket-voting mechanism, single-candidate-group-voting mechanism, a spring-actuated locking-bar provided with projecting teeth, a tilting plate arranged in proximity with said voting mechanism, and connections between said plate and bar whereby the operation of any one of the members of the straight-ticket-voting mechanism will lock all the members of both mechanisms.

113. In a voting-machine, the combination of straight-ticket-voting mechanism, single-candidate-group-voting mechanism, means whereby the operation of the single-candidate-group-voting mechanism will prevent the operation of the straight-ticket-voting mechanism, and resetting mechanism.

114. In a voting-machine, the combination of straight-ticket-voting mechanism composed of members, one for each party, single-candidate-group-voting mechanism composed of members, one for each candidate, means whereby the operation of any one of the members of either of said mechanisms will prevent the operation of members of the other of said mechanisms, and resetting mechanism.

115. In a voting-machine, the combination of straight-ticket-voting mechanism composed of members, one for each party, single-candidate-group-voting mechanism composed of members, one for each candidate, means whereby the operation of any one of the members of either of said mechanisms will prevent the operation of all the other members of both mechanisms, and resetting mechanism.

116. In a voting-machine, the combination of straight-ticket-voting mechanism composed of members, one for each political party, single-candidate-group-voting mechanism composed of members, one for each candidate, means whereby the operation of any one of the members of either of said mechanisms will lock all the members of both mechanisms in their voted and unvoted positions respectively, and resetting mechanism.

117. In a voting-machine, the combination of straight-ticket-voting mechanism, an irregular-single-candidate-voting mechanism, means whereby the operation of the straight-ticket mechanism will prevent the operation of said irregular-voting mechanism, and resetting mechanism.

118. In a voting-machine, the combination of straight-ticket-voting mechanism composed of members, one for each party, an irregular-single-candidate-voting mechanism, means whereby the operation of any one of the members of said straight-ticket-voting mechanism will prevent the operation of the other members of said straight-ticket-voting mechanism and also prevent the operation of said irregular-voting mechanism, and resetting mechanism.

119. In a voting-machine, the combination of straight-ticket-voting mechanism, including keys each representing a political party, questions-voting mechanism, single-candidate-group-voting mechanism, including keys, one for each candidate, means whereby the operation of any one of the members of said straight-ticket-voting mechanism will prevent the operation of the other members thereof and will also prevent the operation of the single-candidate-group-voting mechanism, and means for resetting said voting mechanisms.

120. In a voting-machine, the combination of straight-ticket-voting mechanism, composed of members each representing a political party, questions-voting mechanism, single-candidate-group-voting mechanism, irregular-single-candidate-group-voting mechanism, means whereby the operation of any one of the members of said straight-ticket-voting mechanism will prevent the operation of the other members thereof and will also prevent the operation of said single-candidate-voting mechanism, both regular and irregular, and resetting means for all of said mechanisms.

121. In a voting-machine, the combination of straight-ticket-voting mechanism, questions-voting mechanism, single-candidate-group-voting mechanism, irregular-single-candidate-group-voting mechanism, multicandidate-group-voting mechanism, and resetting means for each of said mechanisms.

122. In a voting-machine, the combination of straight-ticket-voting mechanism, questions-voting mechanism, single-candidate-group-voting mechanism, irregular-single-candidate-voting mechanism, multicandidate-group-voting mechanism, irregular-multicandidate-group-voting mechanism, and resetting means for said mechanisms.

123. In a voting-machine, the combination of straight-ticket-voting mechanism, composed of members each representing a political party, single and multicandidate group voting mechanism, composed of members each representing a single candidate, a registering mechanism for each of the members of said mechanisms, an irregular-single-candidate-voting mechanism, an irregular-multicandidate-group-voting mechanism, and resetting means for all of said voting mechanisms.

124. In a voting-machine, the combination of straight-ticket-voting mechanism, irregular-multicandidate-group-voting mechanism, and resetting means for said mechanisms.

125. In a voting-machine, the combination of straight-ticket-voting mechanism, multicandidate-group-voting mechanism, interlocking mechanism between said voting mechanisms and resetting means for said mechanisms.

126. In a voting-machine, the combination of straight-ticket-voting mechanism, multicandidate-group-voting mechanism, irregular-multicandidate-group-voting mechanism, a limiting means common to the two mechanisms last named, and resetting means for all of said voting mechanisms.

127. In a voting-machine, the combination of straight-ticket-voting mechanism, limiting means for said mechanism, multicandidate-group-voting mechanism, irregular-multicandidate-group-voting mechanism, a limiting means common to the two mechanisms last named, and resetting means for all of said voting mechanisms.

128. In a voting-machine, the combination of straight-ticket-voting mechanism, composed of keys each representing a political party, multicandidate-group-voting mechanism, composed of keys each representing a single candidate, registering devices operated by each of said keys respectively, an irregular-multicandidate-group-voting mechanism, and a limiting means common to the multicandidate-group-voting mechanisms, both regular and irregular.

129. In a voting-machine, the combination of straight-ticket-voting mechanism, composed of keys each representing a political party, multicandidate-group-voting mechanism, composed of keys each representing a single candidate, registering devices operated by each of said keys respectively, a limiting means for said straight-ticket keys, an irregular-multicandidate-group-voting mechanism, a limiting means common to the two multicandidate-group-voting mechanisms, both regular and irregular, and resetting means for said voting mechanisms.

130. In a voting-machine, the combination of straight-ticket-voting mechanism, questions-voting mechanism, single and multicandidate group voting mechanisms, irregular-single-candidate-voting mechanism, irregular-multicandidate-group-voting mechanism, and simultaneously-operated means for resetting all of said voting mechanisms.

131. In a voting-machine, the combination of straight-ticket-voting mechanism, questions-voting mechanism, single and multicandidate group voting mechanisms, irregular-single-candidate-voting mechanism, irregular-multicandidate-group-voting mechanism, a shaft adapted to be operated by the voter or an election official, and means operated by said shaft for resetting all of said voting mechanisms.

132. In a voting-machine, the combination of straight-ticket-voting mechanism, questions-voting mechanism, single and multicandidate group voting mechanisms, registering devices for all of said mechanisms, irregular-single-candidate-voting mechanism, irregular-multicandidate-group-voting mechanism, and resetting means for all of said voting mechanisms.

133. In a voting-machine, the combination of straight-ticket-voting mechanism, questions-voting mechanism, single and multicandidate group voting mechanisms, registering devices for each of said mechanisms, irregular-single-candidate-voting mechanism, irregular-multicandidate-group-voting mechanism, a shaft, an operating-crank thereon, and resetting means carried by or operated from said shaft to reset all of said voting mechanisms.

134. In a voting-machine, the combination of straight-ticket-voting mechanism, including keys, each representing a political party, locking means for said straight-ticket-voting mechanism, adapted to be operated by the operation of any one of said keys, means for resetting said voting mechanism, questions-voting mechanism, and means for resetting said questions-voting mechanism, said means being operated by the resetting means for said straight-ticket-voting mechanism.

135. In a voting-machine, the combination of straight-ticket-voting mechanism, a single-candidate-group-voting mechanism, locking-racks therefor, interlocking mechanism between said voting mechanisms, means for releasing said locking-racks by the operation of any part of the single-candidate-group-voting mechanism, and resetting mechanism.

136. In a voting-machine, the combination of straight-ticket-voting mechanism, composed of members each representing a political party, single-candidate-group-voting mechanism, composed of members each representing a single candidate, an actuated locking-rack for each of said mechanisms, and means for releasing both of said locking-racks by the operation of any one of the members of said single-candidate-group-voting mechanism.

137. In a voting-machine, the combination of straight-ticket-voting mechanism, composed of members each representing a political party, single-candidate-group-voting mechanism, composed of members each representing a single candidate, an actuated locking-rack for each of said mechanisms, means for releasing said locking-racks upon the operation of any one of the members of said single-candidate-group-voting mechanism and resetting mechanism.

138. In a voting-machine, the combination of straight-ticket-voting mechanism, composed of members each representing a political party, a number of single-candidate-group-voting mechanisms, composed of members each representing a single candidate, an actuated locking-rack for each of said mechanisms, means whereby the operation of any one of the members of any of the single-candidate-group-voting mechanisms will release the locking-rack for that particular group and will, also, release the locking-rack for the straight-ticket-voting mechanism, and means for resetting all of said locking-racks that have been actuated.

139. In a voting-machine, the combination of straight-ticket-voting mechanism, composed of members each representing a political party, a number of single-candidate-group-voting mechanisms, composed of members each representing a single candidate, a locking-rack for each of said mechanisms, a slotted bar engaged by each of said locking-racks, means whereby the operation of any member of any one of the single-candidate groups will release the locking-rack for each group and also release the locking-rack for the straight-ticket-voting mechanism and means for moving said slotted bar and thereby the locking-racks to restore said racks and voting mechanisms to their normal positions.

140. In a voting-machine, the combination of straight-ticket-voting mechanism, questions-voting mechanism, single-candidate-group-voting mechanism, a shaft and means operated by said shaft for resetting all of said mechanisms.

141. In a voting-machine, the combination of straight-ticket-voting mechanism, questions-voting mechanism, single-candidate-group-voting mechanism, locking racks and bars whereby only one member in each group can be operated, and means for restoring said bars to their normal positions, thereby resetting the voting mechanisms.

142. In a voting-machine, the combination of straight-ticket-voting mechanism, composed of members each representing a political party, questions-voting mechanism, a locking-bar provided with projections for each of said voting mechanisms, means for operating said bar whenever any one of said members of said groups are operated, and means for restoring said bars to their normal positions and thereby resetting said voting mechanisms, consisting of a rotary shaft provided with means for moving one of said bars, the other of said bars being engaged and moved by the first bar.

143. In a voting-machine, the combination of straight-ticket-voting mechanism, composed of members each representing a political party, questions-voting mechanism, a spring-actuated locking-bar for each of said mechanisms, said locking-bars being adapted to be operated respectively by the operation of any one of the members in either of the corresponding groups of mechanism, one of said bars being provided with a slot and the other with a lug engaging therewith, and means for moving said bars to bring them back to their normal positions and thereby resetting said voting mechanisms.

144. In a voting-machine, the combination of straight-ticket-voting mechanism, questions-voting mechanism, a number of single-candidate-group-voting mechanisms, a locking-rack for each of said mechanisms, locking-bars, one for the straight-ticket mechanism and one for the questions and amendments voting mechanism, and means for moving said locking bars and racks to their normal positions and thereby resetting said voting mechanisms.

145. In a voting-machine, the combination of straight-ticket-voting mechanism, questions-voting mechanism, single-candidate-group-voting mechanism, an actuated locking-rack for each of said mechanisms, a slotted bar with which said locking-racks engage, and means for moving said bar and thereby said racks to restore them to their normal positions and reset said voting mechanisms.

146. In a voting-machine, the combination of straight-ticket-voting mechanism, composed of members each representing a political party, single-candidate-group-voting mechanism, composed of members each representing a single candidate, a locking-bar therefor, said bar being provided with projections and operated by said straight-ticket mechanism and adapted to lock from operation all the members of both mechanisms.

147. In a voting-machine, the combination of straight-ticket-voting mechanism, composed of members each representing a political party, single-candidate-group-voting mechanism, composed of members each representing a single candidate, a locking-rack for said mechanisms, said rack being operated by the actuation of any one of the members of said straight-ticket-voting mechanism, and being provided with projections adapted to prevent the operation of all the members of both mechanisms when said rack is set in operation.

148. In a voting-machine, the combination of straight-ticket-voting mechanism, questions-voting mechanism, single-candidate-group-voting mechanism, locking-bars for said straight-ticket-voting mechanism and questions-voting mechanism, locking-racks for all of said mechanisms, a slotted bar with which said locking-racks engage, and a shaft adapted to move said slotted bar and thereby said locking-racks and also said locking-bars into their normal positions, thereby resetting said voting mechanisms.

149. In a voting-machine, the combination of straight-ticket-voting mechanism, a locking-bar therefor, questions-voting mechanism, an actuated locking-bar therefor, single-candidate-group-voting mechanism, locking-racks for all of said voting mechanisms, a slotted bar engaged by said locking-racks, guides supporting said bars and racks, and means for moving said bars and racks into their normal positions and thereby resetting said voting mechanisms.

150. In a voting-machine, the combination of the machine-casing, grooved guide-beams carried thereby, a straight-ticket-voting mechanism, a locking-bar therefor, springs connected to said casing and said locking-bar, questions-voting mechanism, a spring-actuated locking-bar therefor, single-candidate-group-voting mechanism, locking-racks for all of said voting mechanisms, a slotted bar with which said locking-racks engage, a shaft, and means for operating said locking-bars by the motion of said shaft to restore said bars to their original position and thereby resetting said voting mechanisms.

151. In a voting-machine, the combination of straight-ticket-voting mechanism, irregular-single-candidate-voting mechanism, said irregular mechanism being normally held locked, means for unlocking said mechanism, a locking-bar for said straight-ticket-voting mechanism, and means whereby the unlocking of the irregular-voting mechanism locks the straight-ticket-voting mechanism.

152. In a voting-machine, the combination of straight-ticket-voting keys, multicandidate-group-voting keys, means common to said groups of keys for resetting them and interlocking mechanism between said groups of keys.

153. In a voting-machine, the combination of straight-ticket-voting mechanism, multicandidate-group-voting mechanism, irregular-multicandidate-group-voting mechanism, a shaft, and means operated by said shaft to reset all of said voting mechanisms.

154. In a voting-machine, the combination of straight-ticket-voting mechanism, multicandidate-group-voting mechanism, irregular-multicandidate-group-voting mechanism, a locking-bar for said straight-ticket-voting mechanism, a shaft engaging said locking-bar, whereby said straight-ticket-voting mechanism may be reset, multicandidate-group-voting mechanism, and connections whereby said multicandidate-group-voting mechanism is reset by the operation of said shaft.

155. In a voting-machine, the combination of straight-ticket-voting mechanism, regular and irregular multicandidate-group-voting mechanism, a slotted locking-bar for said straight-ticket-voting mechanism, a shaft provided with a projection engaging the slot in said locking-bar, whereby said straight-ticket-voting mechanism may be reset, mechanism operated by said shaft for resetting the multicandidate-group mechanisms, both regular and irregular.

156. In a voting-machine, the combination of straight-ticket-voting mechanism, composed of members each representing a political party, multicandidate-group-voting mechanism, composed of members each representing a single candidate, locking-racks for each of said mechanisms, and connections whereby the operation of any one of the members of said multicandidate-group-voting mechanism will release the locking-rack of the straight-ticket-voting mechanism to prevent the operating of the members thereof.

157. In a voting-machine, the combination of straight-ticket-voting mechanism, composed of members each representing a political party, multicandidate-group-voting mechanism, composed of members each representing a single candidate, an actuated locking-rack for each of said mechanisms, an irregular-multicandidate-group-voting mechanism, limiting means common to the multicandidate-group-voting mechanisms, and means whereby the casting of a predetermined number of votes in the multicandidate groups, either separately or together, will lock all of said mechanisms and resetting means for said mechanisms.

158. In a voting-machine, the combination of straight-ticket-voting mechanism, multicandidate-group-voting mechanism, a shaft, resetting means operated by said shaft to reset said straight-ticket-voting mechanism, a second shaft operated by said shaft, and means operated by said second shaft to reset said multicandidate-group mechanism.

159. In a voting-machine, the combination of straight-ticket-voting mechanism, irregular-multicandidate-group-voting mechanism, a shaft, and means operated by said shaft to reset both of said voting mechanisms.

160. In a voting-machine, the combination of straight-ticket-voting mechanism, including keys each representing a political party, single-candidate-group-voting mechanism, irregular-single-candidate-group-voting mechanism, an actuated locking-bar, means for releasing said locking-bar by the actuation of any one of said straight-ticket keys, thereby locking the other straight-ticket keys and the single-candidate-voting mechanisms, both regular and irregular, a multicandidate-group-voting mechanism, an irregular-multicandidate-group-voting mechanism, means for holding the two mechanisms last named normally locked, means for unlocking or releasing said two mechanisms, consisting of a through-shaft provided with arms and a pull-button attached to one of said arms, a notched pivoted pawl adapted to be swung into the path of one of said arms and thereby prevent the operation of said unlocking connections, including a spring-operated bar whereby the actuation of any one of said straight-ticket keys will cause said spring-operated bar to engage the notch in said pawl and thereby prevent the operation of the unlocking means for said multicandidate-voting mechanism, both regular and irregular.

161. In a voting-machine, the combination of straight-ticket-voting mechanism, composed of members each representing a political party, single-candidate-group-voting mechanism, composed of members each representing a single candidate, locking means for said mechanisms adapted to be operated by the actuation of any one of the members of said straight-ticket-voting mechanism and all the members of said single-candidate-group-voting mechanism are locked from operation, a limiting means for each of said mechanisms, and a resetting means for each of said mechanisms.

162. In a voting-machine, the combination of straight-ticket-voting mechanism, composed of members each representing a political party, single-candidate-group-voting mechanism, composed of members each representing a single candidate, a registering mechanism for each of said members, means whereby the actuation of any one of said members by a voter will directly actuate the corresponding registering mechanism, means whereby the operation of any one of the members of said straight-ticket-voting mechanism will prevent the operation of the other members of said straight-ticket mechanism and all the members of said single-candidate-group-voting mechanism, and resetting means for both voting mechanisms.

163. In a voting-machine, the combination of straight-ticket-voting mechanism, including keys each representing a political party, single-candidate-group-voting mechanism, including keys each representing a single candidate, a registering mechanism for each of said keys, an irregular-single-candidate-voting mechanism, means whereby the operation of any one of said straight-ticket keys will lock from operation the other straight-ticket keys of the single-candidate-voting keys and said irregular-voting mechanism, and means for resetting said voting mechanisms.

164. In a voting-machine, the combination of straight-ticket-voting mechanism, composed of members each representing a political party, single-candidate-group-voting mechanism, composed of members each representing a single candidate, an irregular-single-candidate-voting mechanism, a multicandidate-group-voting mechanism, composed of members each representing a single candidate, means whereby the operation of any one of the members of said straight-ticket-voting mechanism will prevent the operation of the other members of said straight-voting mechanism and will, also, prevent the operation of the other voting mechanisms, and resetting means for all of said mechanisms.

165. In a voting-machine, the combination of voting-keys, a spring-actuated toothed locking-rack therefor, a spring-actuated tilting plate extending the full length below said voting-keys and provided with a projecting stem, a bar secured to said stem and adapted to engage said rack, a series of connected movable locking-plates provided with removed portions adapted to receive the body of said keys, said locking-rack being provided with a projection, and extending arm, and a spring-actuated resetting-bar.

166. In a voting-machine, the combination of a plurality of movable keys, a spring-actuated toothed locking-rack therefor, a spring-actuated tilting plate below said keys provided with a projecting stem, a bar secured to said stem and engaging said rack, a series of connected movable locking-plates acting as a limiting mechanism, an extending arm, a spring-actuated resetting-bar, said bar working within an opening in said bar, and registering mechanism, each including a registering-tape actuated by said keys.

167. In a voting-machine, the combination of a plurality of movable keys, a spring-actuated toothed locking-rack, a spring-actuated tilting plate, a bar secured to said plate and engaging said rack, movable locking-plates constituting a limiting mechanism, a spring-actuated resetting-bar, and a registering mechanism, a spring-actuated resetting-bar, and a registering mechanism comprising a ratchet-drum, an adjoining ratchet-faced wheel, and an endless tape passing over said ratchet-drum.

168. In a voting-machine, the combination of a plurality of movable keys, a spring-actuated toothed locking-rack therefor, a spring-actuated tilting plate below said keys, and a bar secured to said plate working within and opening in said rack to release said rack, thereby locking said keys whenever one key is depressed.

169. In a voting-machine, the combination of movable keys, limiting mechanism therefor, comprising movable plates a locking-rack, an operating-shaft provided with an extension and a resetting-bar engaging said locking-rack and actuated by said shaft.

170. In a voting-machine, the combination of a main system of movable keys, said system being divided into subsystems, an independent detachable locking mechanism for each subsystem, a plurality of sliding blocks for said systems, and a resetting and locking mechanism controlling the movement of said blocks.

171. In a voting-machine, the combination of a guide-rack, movable keys working in slots in said rack, a reciprocating toothed locking-rack movably secured to said guide-rack, a tilting plate adapted to be actuated by said keys and release said rack, and a resetting-bar connected to said rack.

172. In a voting-machine, the combination of a guide-rack, two movable keys working in slots in said rack, a reciprocating rack secured to said guide-rack, limiting means to prevent more than one of said keys from being operated, a tilting plate adapted to be actuated by said keys and to release said locking-rack, and a resetting-bar secured to said rack.

173. In a voting-machine, the combination of two independent systems of movable keys, a main locking-rack for both of said systems, and releasing mechanism for said rack actuated whenever one of said keys is actuated, so that whenever one key in either of said systems is actuated said locking-rack locks the keys in the other system.

174. In a voting-machine, a duplex multicandidate-group-voting mechanism, said mechanism being adjustable to vary the total number of votes that may be registered thereon, and said mechanism being provided with registering means and including regular and irregular multicandidate-group-voting mechanism, so arranged that a predetermined number of votes can be cast upon the regular mechanism or upon the irregular mechanism, or upon both, in any desired manner.

175. In a voting-machine, an irregular-voting mechanism, including a suitable support, a spring-actuated sliding shield provided with a hook, and a spring-catch, the parts being so arranged that when the shield is drawn down in the act of voting it is engaged by said hook, and mechanism in connection with said shield to limit the movements thereof to a predetermined number.

176. In a voting-machine, the combination of voting-keys, each key being provided with a depending dog, and each dog having forward and rearward projections, a guide-bar provided with inclined faces located behind said dogs, limiting means including movable blocks, the rearward extensions on said dogs being adapted to pass between said regulating-blocks and engage said inclined faces to force said dog forward, a bar located in front of the forward projections on said dogs and adapted to be engaged by said projections to actuate the regulating mechanism, a stop-plate working in connection with said bar to prevent the operation of more than one key at a time, and mechanism for releasing said stop-plate.

177. In a voting-machine, the combination of voting-keys, said keys being provided with pivoted dogs, each dog having a front and rear projection, a guide-bar having inclined faces, regulating-blocks adapted to move upon said guide-bar, the rearward projections on said dogs being adapted to engage said blocks and faces, and a swinging stop-plate located in front of said dogs, the blocks being so arranged that it is impossible to actuate more than one dog at the same time.

178. In a voting-machine, the combination of voting-keys provided with depending dogs having forward and rearward extensions, a flanged guide-bar, sliding blocks supported by said bar, a stop-plate positioned in front of said dogs, a swinging pin-plate positioned in front of said dogs, a swinging pin-plate, regulating mechanism operated by said pin-plate and said pin-plate being adapted to prevent the return of said dogs, and a resetting-bar adapted to simultaneously engage said dogs and stop-plate.

179. In a voting-machine, the combination of voting-keys, each provided with a depending dog having forward and rearward extensions, a flanged guide-bar, a system of sliding blocks supported by said bar, a swinging stop-plate located in front of said dogs and provided with a swinging spring-actuated arm to lock said stop-plate, and a spring-actuated cam-rod adapted to actuate said spring-arm to release said stop-plate.

180. In a voting-machine, the combination of voting-keys, each key being provided with a depending dog, a swinging plate, an adjustable regulating-wheel, pawl-and-ratchet connection between said plate and wheel, a stop-pin operated by said regulating-wheel, and a lock-bar adapted to be actuated by said stop-pin to lock said keys.

181. In a voting-machine, the combination of voting-keys, each key being provided with a depending dog, a swinging plate with which said dogs engage, a regulating-wheel operated by said swinging plate, a stop-pin adapted to be engaged by said regulating-wheel, a locking-bar controlled by said stop-pin to lock said keys, a releasing-rod operating in connection with said swinging plate, and a recording mechanism working in conjunction with said keys.

182. In a voting-machine, an irregular-voting mechanism comprising a spring-actuated sliding shield, a catch secured to said shield, a second spring-actuated catch, a movable tumbler operated in connection with said second catch in combination with a resetting-bar for actuating said tumbler to release the same when said shield is closed.

183. In a voting-machine, the combination with a suitable housing, of a sliding shield, a spring-actuated catch operating to retain said shield in a locked position, a cam adapted to operate said spring-actuated catch, parts being so arranged that when said cam is actuated, said shield is unlocked, and mechanism limiting the number of movements of said shield.

184. In a voting-machine, the combination of voting-keys, each provided with a pivoted dog, and each dog being provided with a projection, a guide-bar, movable regulating-blocks supported by said bar, said dogs being adapted to be locked below said guide-bar, a swinging stop-plate, a resetting-bar, and a bar adapted to simultaneously engage said dogs and said stop-plate.

185. In a voting-machine, an irregular-voting mechanism comprising a ratchet-drum, a registering-tape passing over said drum, a spring-actuated sliding shield located in proximity to said drum, connections between said shield and drum, a projecting hooked arm secured to said shield, a pivoted hook adapted to engage said hooked arm, a releasing-bar adapted to engage said pivoted hook, and a swinging plate adapted to release said hook to permit said shield to be actuated.

186. In a voting-machine, an irregular-voting mechanism comprising receiving and delivering drums, said delivering-drum being provided with a recording-strip, which is also secured to said receiving-drum, an adjustable table, a spring-actuated sliding shield to actuate said receiving-drum and registering mechanism operated by said shield.

187. In a voting-machine, the combination of voting-keys, an adjustable irregular-voting mechanism, of a regulating mechanism controlled by said keys and said irregular-voting mechanism, said regulating mechanism being so arranged that when a predetermined number of votes have been recorded either by the keys or by the irregular-voting mechanism, or by any combination of the two, said regulating mechanism will stop and lock said keys and said irregular-voting mechanism.

188. In a voting-machine, the combination of voting-keys, a locking-rack below said keys, a movable shield, a stop for locking said shield, a shaft provided with a projecting portion adapted to release said shield, said shaft being also adapted to release said locking-rack.

189. In a voting-machine, the combination of voting-keys, a locking-rack, a locking-bar engaging said locking-rack, an operating-shaft adapted to actuate said locking-bar, a movable shield, a stop controlling the movement of said shield, said shaft operating said stop to release said shield, a locking-dog to secure said shield in an open position and a cam on said shaft actuating said locking-dog, said shaft acting to simultaneously lock said keys and release said shield.

190. In a voting-machine, the combination of voting-keys, a shield normally held locked, a locking-rack to lock said keys, a key to unlock said shield and a dog adapted to hold said shield, when moved, in an open position, said dog and shield being connected so that when said shield is opened said keys are locked.

191. In a voting-machine, an irregular-voting mechanism comprising a spring-actuated sliding shield, a locking-bar in proximity to said shield, a locking-arm adapted to engage said bar when said shield is closed and a tilting shaft supporting said arm, said tilting shaft and locking-arm being actuated to lock and to release said sliding shield.

192. In a voting-machine, the combination with a housing, of a sliding shield, a locking-bar, a spring-actuated tilting shaft, said bar and shaft engaging at times to secure said shield in a closed position, a hooked arm secured to said shield, a pivoted dog secured to said housing, said hook and dog working in connection with each other to lock said shield when in an open position, and a lever-arm to release said dog to allow said spring-actuated shield to be closed.

193. In a voting-machine, the combination of straight-ticket-voting mechanism, single-candidate-group-voting mechanism, an irregular-voting mechanism for each single-candidate-group-voting mechanism, a multicandidate-group-voting mechanism, limiting mechanism so arranged that no two voting mechanisms or parts thereof can be simultaneously operated, and interlocking mechanism so arranged that when one of the parts of the straight-ticket-voting mechanism is operated all of the actuating parts of the single-candidate-group-voting mechanisms, the multicandidate-group-voting mechanisms and the irregular-voting mechanisms are locked.

194. In a voting-machine, the combination of straight-ticket-voting mechanism, single-candidate-group-voting mechanisms, an irregular-voting mechanism in connection with each single-candidate-group-voting mechanism, multicandidate-group-voting mechanism, an adjustable irregular-group-voting mechanism in connection with said multicandidate-group-voting mechanism, interlocking mechanism so arranged that when one of the members of the straight-ticket mechanism is operated, all of the operating parts of the other mechanisms are locked, and a resetting mechanism.

195. In a voting-machine, the combination of multicandidate-group-voting mechanism, composed of members each representing a single candidate, regulating mechanism to prevent the simultaneous operation of two or more of said members, an irregular-voting mechanism in connection with said multicandidate-group-voting mechanism, both of said groups being adjustable as to the number of votes that a single voter may cast, the parts being so arranged that voting in the group will be stopped after a predetermined number of votes have been cast, whether these votes are cast either in the multicandidate-group-voting mechanisms or in the irregular-group-voting mechanism, or partly in one and partly in the other.

196. In a voting-machine, the combination with multicandidate-group-voting mechanism composed of members each representing a single candidate, regulating mechanism therefor, an irregular-voting mechanism in connection with said multicandidate group, said regulating mechanism being adapted to be actuated either by the movement of the members of the multicandidate-group-voting mechanism or by the movement of the irregular-voting mechanism, said irregular-voting mechanism comprising a movable recording-strip, a spring-actuated sliding shield covering said strip, said shield being arranged to feed forward said strip when it is opened, and interlocking mechanism between the members of said multicandidate-group-voting mechanism and said irregular-voting mechanism.

197. In a voting-machine, the combination of a series of voting mechanisms forming a multicandidate group and including keys, said keys being normally held in an inoperative position and provided with depending dogs, and limiting mechanism including sliding blocks between which said dogs are adapted to move, swinging locking-arms adapted to engage each end of said series of sliding blocks, and a pull-button adapted to move said swinging locking-arms to release said sliding blocks.

198. In a voting-machine, the combination of voting-keys, each provided with a downwardly-extending dog, sliding blocks with which said dogs engage when operated, swinging arms for locking said sliding blocks, an adjustable regulating-wheel which limits the number of said keys that may be operated by a voter, a locking-rack operated by said regulating-wheel to lock said keys, and a resetting mechanism comprising a main shaft connected to said arms and said locking-rack, said parts being so arranged that during the resetting operation said sliding blocks are first locked and the locking-rack subsequently locked.

199. In a voting-machine, the combination of voting-keys, each provided with a dog, a guide-plate below said dogs, limiting-blocks supported by said guide-plate, swinging arms for locking said sliding blocks, a release-bar for said dogs, a regulating-wheel which limits the total number of votes that may be cast in said group, a locking-rack operated by said regulating-wheel, and resetting mechanism.

200. In a voting-machine, the combination of voting-keys, and locking mechanism, said locking mechanism comprising a spring-actuated locking-rack adapted to simultaneously lock said keys in their voted and unvoted positions respectively, a resetting-bar working in connection with said rack, means for normally holding said rack in an open position, and a pivoted operating-bar movably secured to said means, said parts being so arranged that said spring-actuated locking-rack can be restored to its initial position, leaving the keys free to be operated by the use of said means and said resetting-bar.

201. In a voting-machine, the combination with a series of keys forming a single-candidate group and locking mechanism therefor, comprising a plate provided with upwardly-extending teeth, and each tooth having an intermediate laterally-extending projection, said projection being adapted to lock above or below said voting-keys when said locking mechanism is actuated to lock said keys.

202. The combination in a voting-machine, of the grooved guide-block, the toothed spring-actuated locking-rack working within said guide-block, each of said teeth being provided with an intermediate nib, and a plate secured to said block to prevent said rack from tilting.

203. In a voting-machine, a locking-rack provided with teeth, each having an intermediate rib, and further provided with a slot, a seat and a lug.

204. In a voting-machine, the combination of a grooved guide-block, a toothed locking-rack provided with nibs, and a lug and a resetting-bar provided with a slot adapted to engage said lug.

205. In a voting-machine, the combination of a series of regular-voting mechanisms, and a series of irregular-voting mechanisms, locks operating in connection with said irregular-voting mechanisms, releasing-bars for said irregular-voting mechanisms working in connection with said locks, and a main resetting-bar, said bar being provided with a series of seats adapted to receive or engage with said releasing-bars, the movement of the main releasing-bar being adapted to unlock the irregular-voting mechanism.

206. In a voting-machine, the combination of a series of registers and keys forming a single-candidate-group-voting mechanism, a spring-actuated locking-rack for said mechanism, a spring-actuated locking-bar adapted to engage said rack and hold it before voting in an inoperative position, a pivoted bar operated by said keys and connected to said locking-bar, and a resetting-shaft adapted to restore said parts to their normal positions.

207. In a voting-machine, an irregular-voting mechanism including a suitable housing, a movable recording-strip, a movable shield, and a catch to normally lock said shield in a closed position, said shield being adapted when opened to feed said strip forward.

208. In a voting-machine, the combination of a revolving drum, a recording-strip secured to said drum, a sliding shield working above said drum, said shield being adapted to engage and operate said drum when moved in one direction, and means for locking said shield at the end of its movement in either direction.

209. In a voting-machine, the combination with a suitable housing, of a sliding shield covering said housing, and provided with a depending pin, and a ratchet-drum below said shield provided with a recording-strip, said strip being adapted to engage said drum and feed it forward when moved in one direction.

210. In a voting-machine, the combination of straight-ticket-voting mechanism composed of members each representing a political party, single-candidate-group-voting mechanism, multicandidate-group-voting mechanism composed of members each representing a single candidate, an independent locking mechanism for each of said voting mechanisms, connections between the locking mechanism of the straight-ticket and single-candidate voting mechanisms, a locking mechanism common to the straight-ticket-voting mechanism, and multicandidate-group-voting mechanisms, and resetting means for all the voting mechanism.

211. In a voting-machine, the combination of multicandidate-group-voting mechanism, straight-ticket-voting mechanism, means whereby the operation of the multicandidate-group-voting mechanism will prevent the operation of the straight-ticket-voting mechanism, and resetting mechanism.

212. In a voting-machine, the combination of straight-ticket-voting mechanism composed of members, one for each party, multicandidate-group-voting mechanism composed of members, one for each candidate, registering mechanism, means whereby the actuation of any of said members by a voter will directly actuate the corresponding registering mechanism, means whereby the operation of any one of the members of the straight-ticket mechanism will prevent the operation of the other members of said straight-ticket-voting mechanism and also prevent the operation of any of the members of said multicandidate-group-voting mechanism, and resetting mechanism.

213. In a voting-machine, the combination of straight-ticket-voting mechanism, composed of members, one for each party, multicandidate-group-voting mechanism composed of members, one for each candidate, means whereby the operation of any one of the members of said multicandidate-group-voting mechanism will prevent the operation of any of the members of said straight-ticket-voting mechanism, and resetting mechanism.

214. In a voting-machine, the combination of straight-ticket-voting mechanism composed of members, one for each party, multicandidate-group-voting mechanism composed of members, one for each candidate, means for limiting the number of members of said multicandidate-group-voting mechanism that may be operated by a single voter, means whereby the operation of any one of the members of said multicandidate-group-voting mechanism will prevent the operation of all the members of said straight-ticket-voting mechanism, and resetting mechanism.

215. In a voting-machine, the combination of straight-ticket-voting mechanism, irregular-multicandidate-group-voting mechanism, means whereby the operation of the straight-ticket-voting mechanism will prevent the operation of said irregular-voting mechanism, and resetting mechanism.

216. In a voting-machine, the combination of straight-ticket-voting mechanism composed of members, one for each party, irregular-multicandidate-group-voting mechanism, means whereby the operation of any one of the members of said straight-ticket-voting mechanism will prevent the operation of all of the other members of said straight-ticket-voting mechanism, and will also prevent the operation of said irregular-voting mechanism, and resetting mechanism.

217. In a voting-machine, the combination of straight-ticket-voting mechanism, irregular-multicandidate-group-voting mechanism, means whereby the operation of said irregular-voting mechanism will prevent the operation of said straight-ticket-voting mechanism, and resetting mechanism.

218. In a voting-machine, the combination of straight-ticket-voting mechanism composed of members one for each party, irregular-multicandidate-group-voting mechanism, means whereby the operation of said irregular-voting mechanism will prevent the operation of all the members of said straight-ticket-voting mechanism, and resetting mechanism.

219. In a voting-machine, the combination of straight-ticket-voting mechanism, multicandidate-group-voting mechanism, irregular-multicandidate-group-voting mechanism, a limiting means common to the last two named mechanisms, and resetting mechanism.

220. In a voting-machine, the combination of single and multicandidate groups of voting mechanisms, with regular-voting devices in each group and a single irregular-voting device for each group, the voting devices in each group being so interlocked that when a predetermined number has been operated the group in each case will be locked against further operation.

221. In a voting-machine, the combination of a regular-multicandidate-group-voting mechanism composed of members each representing a single candidate, a single-irregular-group-voting mechanism in connection therewith, and limiting means common to said mechanisms.

222. In a voting-machine, the combination of multicandidate-group-voting mechanism, composed of members each representing a single candidate, a single-irregular-multicandidate-group-voting mechanism, limiting means common to said mechanisms, said means operating to stop the voting in said group after a predetermined number of votes has been cast, whether said votes have been cast in said multicandidate group or said irregular multicandidate group.

223. In a voting-machine, the combination of a multicandidate-group-voting mechanism, composed of members, each of which represents a single candidate, a single-irregular-multicandidate-group-voting mechanism, limiting means common to said mechanisms, which means stops the voting when a predetermined number of votes has been cast, said means being operable either from said multicandidate-group-voting mechanism or said irregular mechanism interchangeably, so that the voter may vote for a predetermined number of regularly-nominated candidates, or for the same number of candidates who have not been nominated, or for any combination of said classes of candidates up to a predetermined number.

224. In a voting-machine, the combination of a multicandidate-group-voting mechanism, composed of members, each representing a single candidate, registering mechanisms operable by said members respectively, a single-irregular-multicandidate-group-voting mechanism, a limiting means common to said regular and irregular multicandidate-group-voting mechanisms, and resetting mechanism.

225. In a voting-machine, the combination of a multicandidate-group-voting mechanism, composed of members, each representing a single candidate, a single-irregular-group-voting mechanism, limiting devices common to said mechanisms, and means whereby said irregular mechanism may be operated by the voter up to a predetermined number of times.

226. In a voting-machine, the combination of straight-ticket-voting mechanism composed of members each representing a political party, multicandidate-group-voting mechanism, composed of members each representing a single candidate, irregular-multicandidate-group-voting mechanism, limiting means common to the two mechanisms last named, means for holding said mechanisms normally locked, means for unlocking or releasing said mechanisms, a pivoted pawl, adapted when swung into a certain position to prevent the operation of said unlocking or releasing means, and means whereby the operation of any one of the members of said straight-ticket-voting mechanism will swing said pawl so as to prevent the operation of said unlocking means.

227. In a voting-machine, the combination of straight-ticket-voting mechanism, composed of members each representing a political party, limiting means therefor, an irregular-multicandidate-group-voting mechanism, a multicandidate-group-voting mechanism, composed of members each representing a single candidate, limiting means common to the two mechanisms last named, means for holding said two mechanisms normally locked, means for unlocking or releasing said two mechanisms, a notched pivoted pawl adapted to prevent the operation of said unlocking means, and connections including a spring-operated bar, whereby the operation of any one of the members of said straight-ticket-voting mechanism will cause said spring-operated bar to engage the notch in said pawl and, thereby, prevent the operation of said unlocking means.

228. In a voting-machine, the combination of straight-ticket-voting mechanism, single-candidate-group-voting mechanism, irregular-single-candidate-group-voting mechanism, multicandidate-group-voting mechanism, irregular-multicandidate-group-voting mechanism, the two mechanisms last named being normally held locked, means for unlocking or releasing said two mechanisms, and means whereby the operation of any part of said straight-ticket-voting mechanism will prevent the operation of said single-candidate-voting mechanism, both regular and irregular, and means whereby the operation of any part of said straight-ticket-voting mechanism will prevent the operation of the unlocking means for the multicandidate-group-voting mechanism, both regular and irregular.

229. In a voting-machine, the combination of counters, actuators therefor, and means for locking said actuators against movement in any direction before said counters can be exposed to view.

230. In a voting-machine, the combination of a series of counters, with means for concealing the same from view, a series of counter-actuators, and automatically-operating means for positively locking said actuators against movement in any direction when an attempt is made to uncover or view said counters.

231. In a voting-machine, the combination of two or more groups of counter devices with actuating devices therefor, means for preventing the operation of more than one of said actuators in a group at a time, automatically-operating means limiting the number of said counters moved by a voter, means concealing said counters and automatic means securing said counters-actuating devices against further operation before the same are exposed to view.

232. The combination in a voting-machine, with the counter, the actuator therefor, means concealing said counter, positive means for returning the actuator and locking the same against movement before the movement of the concealing device to expose said counter.

233. In a voting-machine, the combination of straight-ticket-voting mechanism, locking means therefor, and means whereby the operation of said locking means will prevent the operation of said straight-ticket-voting mechanism.

234. In a voting-machine, the combination of straight-ticket-voting mechanism, single-candidate-group-voting mechanism, locking means and means whereby the operation of said locking means will prevent the operation of said voting mechanisms.

235. In a voting-machine, the combination of straight-ticket-voting mechanism, irregular-single-candidate-voting mechanism, locking means and means whereby the operation of said locking means will prevent the operation of said voting mechanisms.

236. In a voting-machine, the combination of straight-ticket-voting mechanism, single-candidate-group-voting mechanism, irregular-single-candidate-voting mechanism a key-guard, and means whereby the operation of the key-guard will prevent the operation of said voting mechanisms.

237. In a voting-machine, the combination of straight-ticket-voting mechanism, a slotted casing through which the position of the registering mechanisms may be observed, a shield normally covering a slot in said casing, a key-guard securing said shield in position, and means whereby the removal of said key-guard will prevent the operation of said straight-ticket-voting mechanism.

238. In a voting-machine, the combination of straight-ticket-voting mechanism, single-candidate-group-voting mechanism, irregular-single-candidate-voting mechanism, registering devices, a slotted casing through which said registering devices may be seen, a shield normally covering the slot in said casing, a key-guard securing said shield in position, and means for locking the actuating parts of said voting mechanisms operated by the movement of said key-guard.

239. In a voting-machine, the combination of straight-ticket-voting mechanism, single-candidate-voting mechanism, a locking-bar, a slotted casing, a shield normally covering the slot in said casing, means for securing said shield in position, and means whereby the removal of said shield will release said locking-bar, thereby locking the actuating parts of said mechanisms.

240. In a voting-machine, the combination of straight-ticket-voting mechanism, irregular-single-candidate-voting mechanism, a spring-actuated locking-bar for said mechanisms, a slotted casing through which the registering devices may be viewed, a key-guard securing said casing in position, and means operated by the movement of said key-guard to release said locking-bar, thereby locking the actuating parts of said voting mechanisms.

241. In a voting-machine, the combination of straight-ticket-voting mechanism, single-candidate-group-voting mechanism, irregular-single-candidate-voting mechanism, a locking-bar for said mechanism, a slotted casing through which the registering devices may be viewed, a shield covering the slot in said casing, a key-guard for securing said shield in position, and connections operated by the movement of said key-guard to lock all of the actuating parts of said voting mechanisms.

242. In a voting-machine, the combination of straight-ticket-voting mechanism, questions-voting mechanism, spring-actuated locking-bars, one for each of said mechanisms, a slotted casing, a shield covering the slot in said casing, a key-guard securing said shield in position, and means whereby the movement of said key-guard will release said locking-bars, thereby preventing the operation of the actuating parts of said voting mechanisms.

243. In a voting-machine, the combination of straight-ticket-voting mechanism, questions-voting mechanism, single-candidate-group-voting mechanism, irregular-single-candidate-voting mechanism, locking-bars for said mechanism, means for causing said locking-bars to prevent the operation of the actuating parts of said voting mechanisms before the registering devices are exposed to view.

244. In a voting-machine, the combination of straight-ticket-voting mechanism, questions-voting mechanism, single-candidate-voting mechanism, locking-racks, a slotted casing, a shield covering the slot in said casing, a key-guard securing said shield in position, and means whereby the movement of the key-guard will release the locking-racks and thereby locking the actuating parts of voting mechanisms named.

245. In a voting-machine, the combination of straight-ticket-voting mechanism, a slotted casing through which the registering devices may be viewed, a shield covering the slot in said casing, a movable securing device for said shield, a vertically-arranged lever, connections between said lever and said securing device, a locking-rack for said straight-ticket-voting mechanism, and connections actuated by said lever for releasing said locking-rack.

246. In a voting-machine, the combination of straight-ticket-voting mechanism, composed of members each representing a political party, a slotted casing through which the registering devices may be viewed, a shield covering the slot in said casing, a securing device for said shield, a spring-actuated locking-rack for said straight-ticket-voting mechanism, means for releasing said locking-rack by the movement of said securing device, and means preventing the operation of any of the actuating parts of the members of said straight-ticket-voting mechanism, even after said locking-rack has been restored to its original position until said securing device has been moved into its normal position.

247. In a voting-machine, the combination of straight-ticket-voting mechanism, including registering devices and composed of members each representing a political party, a locking-rack therefor, a slotted casing through which the registering devices may be viewed, a shield covering the slot in said casing, a key-guard securing said shield in position, a lock for said key-guard, and means whereby the movement of said key-guard will release said locking-rack.

248. In a voting-machine, the combination of straight-ticket-voting mechanism, including registering devices and composed of members each representing a political party, a spring-actuated locking-rack therefor, a slotted casing through which the registering devices may be viewed, a shield covering the slot in said casing, a key-guard securing said shield in position, a lock for said key-guard, means whereby the movement of said key-guard will release said locking-rack, and means whereby the movement of said key-guard will prevent the operation of any of the members of said straight-ticket-voting mechanism, even after the locking-rack has been restored to its normal position.

249. In a voting-machine, the combination of straight-ticket-voting mechanism, questions-voting mechanism, a spring-actuated locking-rack for each of said mechanisms, a slotted casing, a shield covering the slot in said casing, means for securing said shield in position, and means whereby the movement of said securing means will release said locking-racks.

250. In a voting-machine, the combination of straight-ticket-voting mechanism, single-candidate-group-voting mechanism, a spring-actuated locking-rack for said mechanisms, a slotted casing, a covering or shield for the slot in said casing, means for securing said shield in position, and means whereby the movement of the securing means will release said rack, thereby preventing the operation of said voting mechanism.

251. In a voting-machine, the combination of straight-ticket-voting mechanism, single-candidate-group-voting mechanism, a spring-actuated locking-rack for said mechanisms, a slotted casing, a shield covering the slot in said casing, means for securing said shield in position, means operated by the movement of said securing means to release said locking-rack, and means preventing the operation of said voting mechanisms, even after said locking-rack has been restored to its normal position.

252. In a voting-machine, the combination of straight-ticket-voting mechanism, including registering devices, single-candidate-group-voting mechanism, including registering devices, a spring-actuated locking-rack for said mechanism, questions-voting mechanism, a spring-actuated locking-rack therefor, a slotted casing through which the registering devices may be viewed, a shield covering the slot in said casing, means for securing said shield in position, and means operated by the movement of said securing means to release said locking-racks.

253. In a voting-machine, the combination of straight-ticket-voting mechanism, single-candidate-group-voting mechanism, a spring-actuated locking-rack for said mechanisms, questions-voting mechanism, a spring-actuated locking-rack therefor, a slotted casing, a shield covering the slot in said casing, means for securing said shield in position, means operated by said securing means to release said locking-racks, and means operated by said securing means for preventing the actuation of said voting mechanism, even after said locking-racks have been restored to their original positions.

254. In a voting-machine, the combination of straight-ticket-voting mechanism, single-candidate-group-voting mechanism, irregular-single-candidate-voting mechanism, a locking-rack for said mechanisms, a slotted casing, a shield covering the slot in said casing, means for securing said shield in position, and means operated by said securing means for releasing said locking-rack.

255. In a voting-machine, the combination of straight-ticket-voting mechanism, single-candidate-group-voting mechanism, irregular-single-candidate-voting mechanism, a spring-actuated locking-rack for said mechanisms, a slotted casing, a shield covering the slot in said casing, means for securing said shield in position, means operated by said securing means to release said locking-rack, and means whereby the operation of said voting mechanism is prevented, even after said locking-rack has been restored to its normal position.

256. In a voting-machine, the combination of straight-ticket-voting mechanism, questions-voting mechanism, single-candidate-group-voting mechanism, irregular-voting mechanism, locking-racks for said mechanisms, a slotted casing, a shield covering the slot in said casing, means for securing said shield in position, means operated by said securing means for releasing said locking-racks, and means for preventing the operation of said voting mechanisms, even after said locking-racks have been restored to their normal positions.

257. In a voting-machine, the combination of voting mechanism, with an irregular-voting mechanism, comprising a sliding shield and latch mechanism, said shield being normally held locked, and said latch mechanism being connected to said voting mechanism, so that when any part thereof is actuated said shield is prevented from sliding.

258. In a voting-machine, the combination of a plurality of registers, a locking mechanism to positively lock the actuating parts of said registers from movement, and a shield in proximity to said registers, said shield being normally connected to said locking mechanism, so that said actuating parts are locked whenever said shield is actuated.

259. In a voting-machine, the combination of operating mechanism, limiting mechanism, including reciprocating plates, a locking-rack provided with a projection, a resetting-bar adapted to engage said projection and reset said rack, and an operating-shaft adapted to move both bar and rack in one direction to release said operating mechanism.

260. In a voting-machine, the combination with a housing, voting mechanism including keys and counters, a shield covering said counters and locking mechanism so arranged that said shield can be operated only when said keys are in their normal or unvoted position.

261. In a voting-machine, the combination with a housing, voting mechanism, including counters and keys, a shield for covering said counters and a locking mechanism between said shield and keys so arranged that when said shield is actuated all of said keys are positively locked against movement in any direction.

262. In a voting-machine, the combination of voting mechanism including keys and counters and locking mechanisms so arranged that said counters can be exposed only when the keys are in their pushed-up position.

263. The combination in a voting-machine of voting mechanisms, including keys and counters, means concealing said counters and locking means between said keys and said concealing means, whereby said keys are locked against movement in any direction when the counters are exposed to view.

264. In a voting-machine, the combination of voting-keys, each provided with a downwardly-extending dog, a toothed guide-bar, angular sliding blocks supported by said bar, said dogs being adapted to pass between said blocks and lock below said guide-bar, a pivoted spring-actuated locking-plate, and a stop-plate provided with a spring-actuated locking-dog, a pin-plate, a releasing-shaft, and a cam adapted to actuate the dog on the stop-plate to release the latter.

265. In a voting-machine, the combination, with the frame, of the voting mechanisms, including counters and actuators, locking means therefor, means concealing the counters, and common means for permitting the operation of said concealing means and positively locking said actuators against movement in any direction.

266. The combination in a voting-machine, of counters and their actuators, the latter for operation by voters to indicate their ballots, means for operating said actuators to move said counters, means for positively locking said actuators, and a counter-concealing device that is dependent upon said locking means.

267. In a voting-machine, the combination of counters, counter-actuators, means for positively locking said counter-actuators against movement in any direction, and means by which the counters may be exposed for inspection, said last-named means being interlocked with the means for locking the counter-actuators, so that said counter-actuators must be locked before the counters are open for inspection.

268. In a voting-machine, the combination of counter-actuators, means for locking said counter-actuators, and additional means which can be rotated to a locking position and secured in such position to positively lock said actuators against movement in any direction.

269. In a voting-machine, the combination of keys and counters, means for locking said keys, means by which the counters may be exposed for inspection, and interlocking means between said two first-named means which prevent movement of the keys while the counters are open for inspection.

270. In a voting-machine, the combination of keys and counters, means for locking said keys against movement, an apertured plate in front of said counters, a sliding shield in front of said plate, and means for preventing the movement of said shield to expose the counters for inspection without locking said keys.

271. The combination in a voting-machine, with means for resetting the voting mechanism and locking their actuating parts, of means for exposing the counters of said voting mechanisms, said resetting means and said exposing means each carrying a part adapted to engage at certain times with the other, so that the actuating parts of the voting mechanisms must be locked before the counters thereof can be exposed to view.

272. In a voting-machine, the combination of a shaft, grouped voting-keys pivoted on said shaft, representing candidates for the same office, each provided with an arrow-headed portion on its shank, and limiting devices between which said arrow-headed portions move, consisting of fixed guide-rack and sliding plates carried thereby.

273. In a voting machine, the combination of voting-keys, arranged in a group and each provided with an arrow-headed portion on its shank, limiting devices between which said arrow-headed portions move, a spring-actuated locking-rack, and means operated by the movement of any one of said keys in the act of voting for releasing said locking-rack.

274. In a voting-machine, the combination of a plurality of sliding blocks, a supporting-rail, a plurality of voting-keys, and a dog depending from each key and provided with a projection, the combined movement of all of said blocks being equal to the width of one of said dogs, said projections being adapted to pass between said blocks and lock below said supporting-rail.

275. In a voting-machine, the combination with a base-bar of a system of movable blocks, said blocks being supported by said bar and held in juxtaposition under spring-tension, said bar being provided with a plurality of beveled faces at points below the place where said blocks meet, a plurality of voting-keys, each provided with a dog having a projection thereon, said projections being adapted to ride intermittently between said blocks to engage said beveled faces, and said dogs being carried outwardly by said faces and then locking below the same in the act of voting.

276. In a voting-machine, a bar, said bar being L-shaped in cross-section and provided with a seat, comprising a base and one side, and a plurality of beveled faces below said base-seat and extending from the union of said side and base.

277. In a voting-machine, the combination with a plurality of keys, arranged in a group, of a locking-rack therefor, said rack being provided with inverted-L-shaped projections so positioned that the horizontal stem thereof is adjoining to and below each key, the parts being so arranged that the movement of any one key moves said rack and so that after the movement of said rack the locking-rack will be positioned above the key which has been actuated and below the remaining keys, thus locking all the keys in their voted and unvoted positions respectively.

278. In a voting-machine, the combination of a series of register-actuators arranged in a group, a series of movable plates adapted to be actuated by said actuators, a spring-actuated locking-rack provided with projecting teeth, top and bottom guides for said rack, said actuators being positioned within and working between said teeth, and a bar connecting said plates to said racks to release the same when one of said actuators is actuated, thereby locking the entire group.

279. In a voting-machine, the combination of voting-keys arranged in a group, a spring-actuated locking-rack provided with a plurality of inverted-L-shaped teeth, said keys being positioned within and working between said teeth, and a locking-bar adapted to prevent said teeth from engaging with said keys.

280. In a voting-machine, the combination of a group of keys provided with arrow-headed portions, and limiting means for said keys, consisting of a slotted rack and recessed plates movably secured to said racks.

281. In a voting-machine, a voting-key provided with an arrow-headed portion and having a perforated bearing and spacing block and provided with projecting arms.

282. In a voting-machine, a voting-key, having an arrow-headed portion, a combined bearing and spacing block, said block being perforated, projecting arms, and a name-plate.

283. In a voting-machine, a voting-key provided with an arrow-headed portion, three projecting arms, a combined bearing and spacing block, said block being perforated, a name-plate arranged at an angle to said key and fastened thereto, and a button attached to said name-plate.

284. In a voting-machine, a limiting mechanism consisting of a guide-rack, and regulating-plates supported thereon, comprising a central T-shaped plate having an intermediate removed portion, and two I-shaped adjoining plates each provided with removed portions registering with the removed portion of said central plate, all three of said plates being laterally movable.

285. In a voting-machine, a limiting mechanism, comprising a plurality of T-shaped plates provided with intermediate removed portions upon two sides, I-shaped plates located between said T-shaped plates, said I-shaped plates having removed portions registering with the removed portion of the T-shaped plates, in combination with a system of keys working between the upper end and below the horizontal stem of said T-shaped plates, all of said plates having a lateral movement in one direction equal to one-half the width of the key.

286. In a voting-machine, the combination of voting-keys, and the plurality of laterally-reciprocating plates, said plates being provided with a removed portion near the top, and a central removed portion, said central removed portion being adapted to receive a projection on said key, the combined movement of said plates being limited so that only one key can be operated without resetting said keys.

287. In a voting-machine, the combination of voting-keys, a spring-actuated locking-rack provided with projecting inverted-L-shaped teeth, said keys being positioned and working between said teeth, and a system of sliding plates, said keys being normally located between said plates, the combined movement of said plates being limited in amount and said keys being adapted to release said rack when depressed, so as to lock said keys in their voted and unvoted positions.

288. In a voting-machine, the combination of a plurality of pivoted voting-keys, of a spring-actuated locking-rack provided with projecting teeth, said rack being provided with a projecting arm, said keys being positioned and working between said teeth, said rack being released when one of said keys is depressed thereby locking said keys, and resetting mechanism for said rack comprising a reciprocating bar adapted to engage said projecting arm and carry said rack into its initial position.

289. In a voting-machine, the combination of single-candidate-group-voting mechanism, straight-ticket-voting mechanism, a spring-actuated locking-rack moving in conjunction with said mechanism, multicandidate-group-voting mechanism, limiting mechanisms, one for each of said voting mechanisms, a resetting-lever controlling said locking-rack, a pivoted arm connected to said rack and controlling the action of the multicandidate-group-voting mechanism, said parts being so arranged that before a key within the multicandidate-group-voting mechanism can be depressed the locking-rack is set free to lock the keys within the straight-ticket-voting mechanisms.

290. In a voting-machine, the combination of systems of movable keys, said systems being provided with independent locking and resetting mechanisms, independent guide-plates for each of said systems, and a rocking shaft working in conjunction with the locking and releasing mechanisms within each of said systems, so that when said shaft is actuated both of said systems are locked.

291. In a voting-machine, the combination of systems of movable keys, each of said systems being provided with guide-plates, and a spring-actuated locking-rack, locking-bars engaging said locking-racks, an operating-shaft adapted to engage the locking-bars of said auxiliary system, a secondary shaft actuated by said operating-shaft and connected to the locking-bar of said primary system, so that when said operating-shaft is operated the primary and auxiliary key systems are locked.

292. In a voting machine, the combination of a movable key having a spring-actuated dog thereon, said dog having forwardly and rearwardly extending projections, sliding regulating-blocks normally held below the rearward projection of said dogs, a laterally reciprocating plate movably held below said regulating-blocks, a limiting mechanism, including a depending swinging plate adapted to engage the forward projection of said dogs, and a pawl secured to said swinging plate and working in conjunction with the regulating-plate.

293. In a voting-machine, the combination of questions-voting mechanism, including two voting-keys, of a toothed rack, said keys working between the teeth of said rack, and a shifting plate secured to said teeth between said keys, said plate working below and adapted to be displaced by said keys, and having a possible movement in two directions below said keys.

294. In a voting-machine, the combination of voting-keys each provided with a depending dog, a guide-bar provided with teeth, a toothed plate in proximity to said guide-bar and forming therewith a channel, and spring-actuated sliding blocks in said channel, the parts being so arranged that two of said dogs cannot be forced at the same time between said blocks.

295. In a voting-machine, the combination of pivoted voting-keys forming a single-candidate group, a spring-actuated toothed locking-rack provided with a seat, a locking-bar adapted to engage said seat and normally hold said rack in an open position, and connections whereby the operation of any one of said keys will disengage said locking-bar from said locking-rack, which rack will then lock all the keys of the group in their voted and unvoted positions respectively.

296. In a voting-machine, the combination with pivoted keys counters and actuators therefor, of regulating or limiting plates preventing the simultaneous operation of any two actuators at the same time, locking mechanism for said actuators, and resetting mechanism.

297. In a voting-machine, the combination with a plurality of voting-keys, arranged in a group, a tilting plate adapted to be actuated by the movement of any one of said keys, a spring-actuated locking-rack provided with projecting teeth, said keys working between said teeth, and a locking-bar connected to said tilting plate and engaging said locking-rack.

298. In a voting-machine, the combination of a plurality of pivoted voting-keys, a spring-actuated locking-rack therefor provided with projecting teeth and a projecting arm, said keys working between said teeth, means for releasing said rack when one of said keys is operated, and resetting mechanism for said rack comprising a reciprocating bar adapted to engage the projecting arm on said rack and restore it to its initial position.

299. In a voting-machine, the combination of pivoted voting-keys arranged in a group, a toothed locking-rack guiding said keys, limiting means including sliding plates, said plates preventing the operation of more than one key, whether it is attempted to operate them simultaneously or successively, and resetting mechanism.

300. In a voting-machine, the combination of voting-keys, a spring-actuated toothed locking-rack, said rack being provided with an extending arm, a spring-actuated resetting-bar adapted to engage said arm, and a shaft for actuating said bar.

301. In a voting-machine, the combination with a guide-rack of two voting-keys guided by said rack, a reciprocating toothed locking-rack movably secured to said guide-rack, and a tilting plate adapted to be actuated by the movement of either of said keys to release said locking-rack.

302. In a voting-machine, the combination of a guide-rack, two voting-keys guided by said rack, a spring-actuated toothed locking-rack movably secured to said guide-rack, a tilting plate adapted to be actuated by either of said keys during the act of voting, and resetting mechanism.

303. In a voting-machine, the combination of straight-ticket-voting mechanism composed of members each representing a political party, multicanditate-group mechanism composed of members each representing a single candidate, irregular-multicandidate-group mechanism, said last two mechanisms being normally held locked, a pull-button for unlocking or releasing said mechanism, and means operated by said pull-button to prevent the operation of any of the members of said straight-ticket-voting mechanism.

304. In a voting-machine, the combination of straight-ticket-voting mechanism composed of members each representing a political party, multicandidate-group-voting mechanism composed of members each representing a single candidate, irregular-multicandidate-group mechanism, said last two named mechanisms being normally locked, a pull-button for unlocking or releasing said mechanisms, and means operated by the movement of any one of the members of said straight-ticket-voting mechanism to prevent the operation of said pull-button.

305. In a voting-machine, the combination of straight-ticket-voting mechanism composed of members each representing a political party, multicandidate-group-voting mechanism composed of members each representing a single candidate, irregular-multicandidate-group mechanism, said last two mechanisms being held normally locked, means for releasing or unlocking said last two mechanisms named, means operated by the operation of any one of the members of said straight-ticket-voting mechanism to prevent the operation of said unlocking means, and means whereby the operation of any one of the members of said straight-ticket-voting mechanism will prevent the operation of all the other members of said straight-ticket-voting mechanism.

306. In a voting-machine, the combination of straight-ticket-voting mechanism composed of members each representing a political party, multicandidate-group-voting mechanism composed of members each representing a single candidate, irregular-multicandidate-group-voting mechanism, said last two named mechanisms being normally held locked, means for unlocking said mechanisms, means for preventing the operation of said unlocking means by the operation of any one of the members of said straight-ticket-voting mechanism, limiting means preventing the operation of more than one of the members of said straight-ticket-voting mechanism by a voter, and locking means preventing the operation of all the other members of said straight-ticket-voting mechanism when one of the members has been operated.

307. In a voting-machine, the combination of straight-ticket voting mechanism composed of members each representing a political party, multicandidate-group mechanism composed of members each representing a single candidate, irregular-multicandidate-group mechanism, means for normally locking said last two named mechanisms, a pull-button for unlocking or releasing said mechanisms, a notched pawl connected to said pull-button, and connections operated by the movement of any one of the members of said straight-ticket-voting mechanism, one of said connections being adapted to engage the notch in said pawl.

308. In a voting-machine, the combination of straight-ticket-voting mechanism, single-candidate-group-voting mechanism, irregular-single-candidate-group-voting mechanism, multicandidate-group-voting mechanism, and connections whereby the operation of any part of the straight-ticket-voting mechanism will prevent the operation of all of the other mechanisms named.

309. In a voting-machine, the combination of straight-ticket-voting mechanism, multicandidate-group-voting mechanism, irregular-multicandidate-group-voting mechanism, said last two mechanisms being normally locked, a pull-button for unlocking or releasing said mechanisms, a notched pawl connected to said pull-button, and connections adapted to be operated by the operation of any part of said straight-ticket-voting mechanism, said connections consisting of a bent arm extending underneath said straight-ticket-voting mechanisms, and spring-actuated bars operated by said arm, one of said bars being adapted to engage with the notch in said pawl.

310. In a voting-machine, the combination of straight-ticket-voting mechanism composed of members each representing a political party, multicandidate-group-voting mechanism composed of members each representing a single candidate, means for normally locking the members of said multicandidate-group against operation, means for unlocking or releasing said members, and means operated by the members of said straight-ticket-voting mechanism for preventing the unlocking of the members of said multicandidate-group-voting mechanism.

311. In a voting-machine, the combination of straight-ticket-voting mechanism composed of members each representing a political party, multicandidate-group-voting mechanism comprising voting-keys each provided with a locking-dog, locking-blocks with which said dogs are adapted to engage, means for locking said blocks against movement, means for releasing or unlocking said blocks, and means operated by the movement of any of the members of said straight-ticket-voting mechanism to prevent the operation of said unlocking means.

312. In a voting-machine, the combination of straight-ticket-voting mechanism composed of members each representing a political party, multicandidate-group-voting mechanism including keys each representing a single candidate, irregular-multicandidate-group-voting mechanism, means for holding the two mechanisms last named normally locked, means for releasing or unlocking said mechanisms, consisting of a through-shaft provided with depending arms and a pull-button attached to one of said arms, and means whereby the operation of any one of the members of said straight-ticket-voting mechanism will prevent the operation of said pull-button.

313. In a voting-machine, the combination of straight-ticket-voting mechanism composed of members each representing a political party, multicandidate-group-voting mechanism including keys each representing a single candidate and each provided with a depending dog, sliding blocks between which said dogs are adapted to operate, a support for said blocks, means for preventing the movement of said blocks, an irregular-multicandidate-group-voting mechanism, means for holding said mechanism normally locked, and means for releasing or unlocking the multicandidate-group-voting mechanism, both regular and irregular, consisting of a through-shaft, arms attached thereto, a pull-button attached to one of said arms, and means whereby the operation of any one of the members of said straight-ticket-voting mechanism will prevent the operation of said pull-button.

314. In a voting-machine, the combination of straight-ticket-voting mechanism, composed of members each representing a political party, single-candidate-group-voting mechanism, irregular-single-candidate-voting mechanism, multicandidate-group-voting mechanism, irregular-multicandidate-group-voting mechanism, means for holding said two mechanisms last named normally locked, means for unlocking or releasing said mechanisms, means whereby the operation of any one of the members of said straight-ticket-voting mechanism will lock from operation the single-candidate-voting mechanism, both regular and irregular, and means whereby said operation will prevent the operation of the unlocking means for the multicandidate-group-voting mechanisms.

315. In a voting-machine, the combination of straight-ticket-voting mechanism, single-candidate-group-voting mechanism, irregular-single-candidate-voting mechanism, a locking-bar therefor, and means operated by a key for preventing the movement of said locking-bar, thereby preventing the resetting of said voting mechanisms.

316. In a voting-machine, the combination of straight-ticket-voting mechanism, irregular-single-candidate-voting mechanism, a sliding spring-actuated locking-bar for said mechanism, and means for preventing the movement of said bar to reset said mechanisms.

317. In a voting-machine having upper and lower banks, the combination of the voting mechanisms of various kinds, locking means for said voting mechanisms, means for moving said locking means and thereby resetting said mechanisms, and means for preventing the movement of said locking means.

318. The combination in a voting-machine, of a series of irregular mechanisms, with slides or covers which in one position prevent the use of said mechanisms, and in the other position permit the use of any of the same, and means for limiting the number of operations of said covers.

319. In a voting-machine, the combination of straight-ticket-voting mechanism, a shaft operable either by the voter himself or by an election official to reset said mechanism, a registering mechanism for showing the total number of the operations of said shaft, means operatively connecting said shaft with said registering mechanism, resetting mechanism and connections between said shaft and said resetting mechanism.

320. In a voting-machine, the combination with irregular-single-voting mechanism, single-candidate-group-voting mechanism, straight-ticket-voting mechanism, multicandidate-group-voting mechanism, irregular-multicandidate-group-voting mechanism, and means whereby the operation of the straight-ticket mechanism will prevent the operation of any of the other mechanisms mentioned.

321. The combination in an irregular-voting mechanism of winding devices with a slide or cover, means for locking said slide or cover, regular-party covers, an independent-locking mechanism between the same and said slide, and automatically-operating liberating means in connection with the interlocking devices for said counters and slide.

322. In a voting-machine, the combination of keys or actuators carrying names of the candidates, a ratchet-wheel provided with advancing and retaining pawls, and a swinging cam provided with a projection which is in the path of movement of said ratchet-wheel and designed to be engaged thereby, whereby the depression of one of the keys will advance the ratchet-wheel one tooth, and means for limiting the number of votes that may be cast.

323. In a voting-machine, the combination of a series of registers, representing all the candidates of the different parties for election to an office, a corresponding series of register-actuators, automatic lock-out and resetting devices for said actuators, said lock-out and resetting devices being adapted to permit the return of all the operated actuators of the series to their initial positions upon release of said actuators, and before any other actuator in the same series can be operated.

324. The combination in a voting-machine, of a single locking-rack for the whole-ticket-voting mechanism, a series of locking-racks for the individual-name-voting mechanism, said racks being movable and operated by said voting or registering mechanism, locking means adapted to lock the whole-ticket-voting mechanism and the individual-name-voting mechanism, and resetting mechanism operable by the voter to reset the machine.

325. In a voting-machine, the combination with a series of registers, a series of operating means therefor devoted to regular candidates, of a device for voting for irregular or unnominated persons, embodying a casing having an aperture and a movable cover-plate normally covering said aperture, interlocking devices between the regular-ballot actuators and the cover-plate of the irregular-voting devices, said interlocking devices being actuated either by movement of the operators or the movement of the cover-plate in uncovering the aperture, and resetting devices for said actuators and for returning the cover-plates to their normal position over the aperture.

326. In a voting-machine, the combination with a casing, having a series of apertures therein, a plurality of series of registers, one for each candidate, a plurality of series of corresponding actuators, interlocking devices for limiting the number of actuators in each series operable by a single voter, of irregular-voting devices embodying a plurality of movable covers, one for each of the apertures in the casing, and normally covering said apertures, one of said covers being interlocked with the actuators devoted to candidates for each office, a paper-web supporting and feeding device in the casing for operating said paper past the apertures, said feeding device being normally disconnected from the register-operating devices, and connecting mechanism controlled by the covers for preventing the operation of the corresponding actuators when any one of the covers is moved to open its aperture.

327. In a voting-machine, the combination with a series of registers, a series of actuators therefor, of a device for voting for irregular or unnominated persons, embodying a casing having an aperture and a movable cover-plate normally covering said aperture, interlocking devices between the actuators and the cover-plate of the irregular-voting devices operating to limit the total number of actuators moved the number of movements of the corresponding cover operated, a movable ballot-receiving strip, such as a paper web, within the casing and accessible through the aperture, means for moving it, and operating devices for causing the simultaneous resetting of said actuators and cover-plates.

328. In a voting-machine, the combination of straight-ticket-voting mechanism, a single-candidate-group-voting mechanism, irregular-single-candidate-voting mechanism, multicandidate-group-voting mechanism, irregular-multicandidate-group-voting mechanism, and interlocking means between the straight-ticket mechanism and the rest of said mechanisms.

329. In a voting-machine, the combination of straight-ticket-voting mechanism, single-candidate-group-voting mechanism, irregular-single-candidate-voting mechanism, questions-voting mechanism, multicandidate-group-voting mechanism, irregular-multicandidate-group-voting mechanism, and interlocking means between the straight-ticket mechanism and all of the rest of said mechanisms.

330. In a voting-machine, the combination of multicandidate-group-voting mechanism, irregular-multicandidate-group-voting mechanism, and means for normally holding said mechanisms locked, which means must be operated by the voter before either of said mechanisms or any of the parts thereof can be operated.

331. In a voting-machine, the combination of straight-ticket-voting mechanism composed of keys each representing a political party, multicandidate-group-voting mechanism composed of keys each representing a single candidate, limiting means for said multicandidate-group mechanism preventing the operation of more than a predetermined number of keys by a voter, said multicandidate mechanism being normally held locked, means for unlocking or releasing said multicandidate-group-voting mechanism, and means operated by any one of the keys of the straight-ticket-voting mechanism to prevent the operation of the unlocking means for the multicandidate-group-voting mechanism.

332. In a voting-machine, the combination of straight-ticket-voting mechanism composed of members each representing a political party, an irregular-multicandidate-group-voting mechanism, means for limiting the numbers of operations of said irregular-voting mechanism by a voter, said irregular mechanism being normally held locked, means for unlocking or releasing said irregular mechanism, and means capable of being operated by any one of the members of said straight-ticket-voting mechanism to prevent the operation of said unlocking means.

333. In a voting-machine, the combination of straight-ticket-voting mechanism composed of members each representing a political party, an irregular-multicandidate-group-voting mechanism, means for normally holding said irregular mechanism locked, a limiting means for said irregular-voting mechanism, whereby it can be operated only a predetermined number of times by a single voter, limiting means for said straight-ticket-voting mechanism preventing the operation of more than one member thereof by a voter, means for unlocking or releasing said irregular-voting mechanism, and means whereby the operation of any member of the straight-ticket-voting mechanism will prevent the operation of the other members of said mechanism and will, also, prevent the operation of the unlocking means for the irregular-voting mechanism.

334. In a voting-machine, the combination of straight-ticket-voting mechanism composed of members each representing a political party, multicandidate-group-voting mechanism, an irregular-multicandidate-group-voting mechanism, a limiting means common to both of the two mechanisms last named, a limiting means for the straight-ticket-voting mechanism, means for holding said multicandidate-group-voting mechanism, both regular and irregular, normally locked, means for unlocking or releasing said mechanisms, and means whereby the operation of any member of the straight-ticket-voting mechanism will prevent the operation of said unlocking means.

335. In a voting-machine, the combination of straight-ticket-voting mechanism, composed of members each representing a political party, single-candidate-group voting mechanism, irregular-single-candidate mechanism, a locking-bar for said mechanisms, multicandidate-group-voting mechanism, irregular-multicandidate-group-voting mechanism, means whereby the operation of any one of the members of said straight-ticket-voting mechanism will release said locking-bar, and means whereby said operation will, also, prevent the operation of the multicandidate-group-voting mechanisms, both regular and irregular.

336. In a voting-machine, the combination of straight-ticket-voting mechanism, single-candidate-group-voting mechanism, irregular-single-candidate-group-voting mechanism, limiting means for each of said mechanisms, multicandidate-group-voting mechanism, irregular-multicandidate-group-voting mechanism, limiting means common to the two mechanisms last named, and means whereby the operation of any part of said straight-ticket-voting mechanism will prevent the operation of the other voting mechanisms named.

337. In a voting-machine, the combination of straight-ticket-voting mechanism, composed of members each representing a political party, single-candidate-group-voting mechanism, irregular-single-candidate-voting mechanism, a limiting means for each of said mechanisms, multicandidate-group-voting mechanism, irregular-multicandidate-group-voting mechanism, a limiting means common to the two mechanisms last named, and means whereby the operation of any one of the members of said straight-ticket-voting mechanism will lock said member in its operated position, and will lock the other members of said straight-ticket-voting mechanism in their unoperated positions, and will also prevent the operation of the other voting mechanisms named.

338. In a voting-machine, the combination of straight-ticket-voting mechanism, composed of members each representing a political party, multicandidate-group-voting mechanism, composed of members each representing a single candidate, the members of said multicandidate group being normally held locked, means for unlocking or releasing the members of said multicandidate group, a spring-actuated locking-rack for said straight-ticket-voting mechanism, and connections whereby the unlocking of the multicandidate group will release the locking-rack of the straight-ticket mechanism and thereby lock the members thereof.

339. In a voting-machine, the combination of straight-ticket-voting mechanism, composed of members each representing a political party, a locking-rack therefor, irregular-multicandidate-group-voting mechanism, said mechanism being normally held in a locked position, means for unlocking said mechanism, and means whereby the action of the said unlocking mechanism will release the locking-rack for the straight-ticket-voting mechanism, thereby locking the same.

340. In a voting-machine, the combination of straight-ticket-voting mechanism, locking means therefor, and a hand-operated lever for causing said locking means to be operated, thereby locking the actuating parts of said voting mechanisms.

341. In a voting-machine, the combination of straight-ticket-voting mechanism, composed of members each representing a political party, a spring-actuated locking-rack therefor a hand-operated lever, and connections between said lever and said locking-rack.

342. In a voting-machine, the combination of voting mechanism, resetting mechanism therefor, a spring-actuated stop for preventing the movement of said resetting mechanism, and means for causing said stop to engage with said resetting mechanism.

343. In a voting-machine, the combination of voting mechanism, resetting mechanism therefor, means for preventing the movement of said resetting mechanism, means for causing said last-named means to engage with said resetting mechanism, said last-named means comprising a spring-actuated shaft provided with a cam and adapted to be operated by a key or in like manner.

344. In a voting-machine, the combination of straight-ticket-voting mechanism, resetting means therefor, means for preventing the action of said resetting means, multicandidate-group-voting mechanism, and means for preventing the operation of said multicandidate-group-voting mechanism, said means being operated when the resetting mechanism of the straight-ticket mechanism is prevented from operation.

345. In a voting-machine, the combination of the upper and lower banks thereof, each containing voting mechanism, and means common to both banks for simultaneously locking all the actuating parts of the voting mechanisms in both banks.

346. In a voting-machine, the combination of the two banks thereof, the upper hinged to the lower and each bank being provided with voting mechanism, means for preventing the operation of the voting mechanisms in the lower bank and means for preventing the operation of the voting mechanisms in the upper bank, and a device for operating both of said means simultaneously.

347. In a voting-machine, the combination of the two banks thereof, the upper hinged to the lower and each provided with voting mechanisms, means for preventing the operation of the voting mechanisms in the lower bank, and means for preventing the operation of the voting mechanisms in the upper bank, said means consisting of a key-shaft provided with cams.

348. In a voting-machine, having upper and lower banks, the combination of the voting mechanisms including registering devices, located in said upper bank, and means for locking the actuating parts of the voting mechanisms of the upper bank before the exposure to view of the registering devices thereof.

349. In a voting-machine, the total-registering mechanism comprising ratchet-wheels, a duplex operating-pawl, the parts of which engage said wheels respectively, the main resetting-shaft and detachable connections between said shaft and said pawls.

350. In a voting-machine, a total-registering mechanism comprising the main resetting-shaft, a disk mounted on said shaft, registering-wheels, a duplex pawl operating said wheels, and detachable connections between said disk and said pawl.

351. In a voting-machine, the combination of a system of movable keys, a spring-actuated toothed locking-rack provided with an extending arm, and a spring-actuated resetting-bar engaging said locking-rack.

352. In a voting-machine, the combination of straight-ticket-voting mechanism, single-candidate-group-voting mechanism, an irregular-voting mechanism for said single candidate, questions-voting mechanism, multicandidate-group-voting mechanism, means for simultaneously locking the operating parts of all of said mechanisms except the questions-voting mechanism and resetting mechanism.

353. In a voting-machine, the combination of a series of single-candidate-group-voting mechanisms, each provided with actuating-keys, an irregular-voting mechanism for each of said single-candidate groups, limiting means preventing the operation of both of said mechanisms after one vote has been cast in each single-candidate group or in the corresponding irregular-voting mechanism, the parts being so arranged that when a key is operated all the other keys in the same group and also the irregular-voting mechanism for said group are locked and so that when said irregular-voting mechanism is used by the voter all the keys of the corresponding single-candidate group are locked.

354. In a voting-machine, the combination of straight-ticket-voting mechanism, single-candidate-group-voting mechanism, irregular-voting mechanism arranged in connection with each of said single-candidate groups, locking mechanism common to said voting mechanisms, total-registering mechanism and resetting mechanism.

355. In a voting-machine, the combination of a housing, a sliding shield, locking means for said shield, and voting-keys, said locking means being so arranged that when one of said keys has been operated the shield cannot be opened until the machine has been reset.

356. In a voting-machine, the combination of counting mechanisms and actuators therefor arranged in a multicandidate group, an irregular-multicandidate group in connection therewith, and an adjustable regulating mechanism, said parts being so arranged that said actuators and said irregular-voting mechanism can operate said regulating mechanism only a predetermined number of times.

357. In a voting-machine, the combination of a sliding shield, a pawl secured thereto, a ratchet-wheel engaging with said pawl and a movable plate mounted on the shaft of said ratchet-wheel and supporting said pawl.

358. In a voting-machine, the combination of voting-keys and a variable regulating mechanism comprising a revoluble ratchet-wheel, an adjustable dog secured to said wheel, connection between said keys and wheel, a stop-pin for checking the movement of said wheel, a locking-dog for securing said wheel, a releasing-bar to release said dog and wheel, and an irregular-voting mechanism in connection therewith, said regulating mechanism governing said keys and said irregular-voting mechanism.

359. In a voting-machine, the combination of single-candidate-group-voting mechanism, including keys, of an irregular-voting mechanism in connection therewith, comprising a drum provided with a recording-strip, a supporting-table, a receiving-drum for said strip provided with a ratchet, a shaft provided with a dog supporting said receiving-drum, and carrying a pawl and a sliding shield provided with a pin, said shield being adapted to feed said strip forward, and means whereby the operation of either of said mechanisms locks the other mechanism from operation.

360. In a voting-machine, the combination of single-candidate-group-voting mechanism, including keys, and an irregular-voting mechanism connected thereto, said mechanisms being each provided with independent locking mechanisms, said key-locking mechanism permitting the operation of but one of the keys, and the locking mechanism of the irregular-voting mechanism permitting but one movement of said mechanism, said regular and irregular voting mechanisms being so connected that the actuation of either locks the other.

361. In a voting-machine, the combination of single-candidate-group-voting mechanism including keys, an irregular-single-candidate-voting mechanism in connection therewith, and independent locking mechanism for each of said voting mechanisms, said key-locking mechanism permitting the operation of but one of said keys, and the locking mechanism for said irregular-voting mechanism permitting but one movement of said irregular-voting mechanism, said voting mechanisms being so connected that the actuation of either locks the other, and resetting means connected to the locking mechanism of both of the voting mechanisms to reset both of them.

362. In a voting-machine, the combination of voting-keys, forming the multicandidate group, an irregular-voting mechanism in connection therewith, and a variable regulating mechanism, said irregular-voting mechanism being provided with a recording-tape and said regulating mechanism being common to both irregular and regular voting mechanisms, whereby said regulating mechanism can be actuated by either the regular or irregular voting mechanisms, or both of them.

363. In a voting-machine, the combination of multicandidate-group-voting mechanism composed of members each representing a single candidate, and each including a voting-key, a plurality of pawls operated by said keys, a ratchet-wheel operated by the movement of any of said pawls, a locking-rack, and a dog adjustably secured to said ratchet-wheel and so arranged that when a predetermined number of keys have been operated, said dog operates said rack to lock said keys.

364. In a voting-machine, the combination of voting-keys arranged in a group, a vertical shaft provided with an extending stub-arm, a second shaft provided with a projecting arm, a chain connected to said arms, a tilting plate secured to said second-named shaft, a locking-rack and locking-bar, said second shaft being provided with a projecting dog adapted to engage said locking-bar, all of said parts being arranged to lock all of the keys in said group whenever said vertical shaft is operated.

365. In a voting-machine, the combination with a suitable base and questions-voting mechanism, of a locking mechanism comprising a spring-actuated locking-bar, a spring-actuated rack for said questions-voting mechanism, a tilting shaft provided with a locking-bar adapted to engage said locking-rack, and releasing-bar actuated by said tilting shaft to release said spring-actuated rack.

366. In a voting-machine, the combination of voting mechanism arranged in two banks, of a locking mechanism connecting said banks and comprising a pivoted plate, a key-shaft underneath said plate, and connections whereby upon the movement of said pivoted plate the voting mechanisms are locked.

367. In a voting-machine, the combination of the two banks thereof, one of which is capable of being folded back and each provided with voting mechanism, including keys, and locking mechanism between said banks whereby when the upper bank is folded back, all of said voting mechanisms are locked.

368. In a voting-machine, the combination of the upper bank and the lower bank containing straight-ticket-voting mechanism, and connections whereby the operation of any of the mechanisms in the upper bank will prevent the operation of the straight-ticket-voting mechanism.

369. In a voting-machine, the combination of the upper and lower banks of voting mechanisms, the lower bank including straight-ticket-voting mechanisms, means for normally holding the voting mechanisms in the upper bank locked, and means whereby the unlocking of said upper-bank-voting mechanisms will prevent the operation of the straight-ticket-voting mechanism.

370. The combination with a series of registers and register-actuating devices subgrouped for the different offices, of a limiting-lock for each group, having ratchet-teeth directly subject to each operator and provided with parts, which, when the proper predetermined number of votes have been cast for the particular office, lock the remaining actuating devices of the group in their normal position.

371. The combination with a series of registers and register-actuators, subgrouped for the different offices, of a locking device normally standing in position to render said actuators inoperative, and a key or finger-piece by means of which said locking device may be moved into an unlocking position.

372. In a voting-machine, the combination of the counters or registers, and the actuating mechanism, with means for concealing said counters, and a slide operating to prevent further operation of said actuators when an attempt is made to continue the voting after the counters have been exposed to view, substantially as described.

373. The combination, in a voting-machine, of the counter, with the actuator therefor, means concealing said counter, positive means for returning the actuator and locking the same upon the movement of the concealing device to expose said counter.

374. The combination in a free-ballot or irregular voting mechanism, of a series of winding devices, slides or covers therefor, means for interlocking said slides or covers, regular-party tickets, and an interlocking mechanism between the same and said slides, substantially as described.

375. The combination in a voting-machine, of a series of regular-candidate-counter devices with a series of free-ballot-vote-receiving mechanisms equal in number to the offices represented by counter devices, and means preventing the use by a voter of any of said counter devices when said free-ballot-receiving mechanisms are used by a voter, substantially as described.

376. In a voting-machine, the combination of straight-ticket-voting mechanism, single-candidate-voting mechanism, irregular-voting mechanism, interlocking mechanism for said voting mechanisms, a spring-actuated locking-rack, and means for releasing said locking-rack thereby locking the voting mechanisms named.

377. In a voting-machine, the combination of straight-ticket-voting mechanism, single-candidate-voting mechanism, irregular-voting mechanism, a spring-actuated locking-rack, means for releasing said locking-rack, thereby locking the three mechanisms named, and resetting mechanism.

378. In a voting-machine, the combination of straight-ticket-voting mechanism, single-candidate-voting mechanism, irregular-voting mechanism, interlocking means for said voting mechanisms, a spring-actuated locking-rack, means for releasing said locking-rack, thereby locking said voting mechanisms, and resetting mechanism.

379. In a voting-machine, the combination with a series of keys, one for each candidate, of another series of straight-ticket keys, one for each party, and means whereby when the key devoted to any one candidate is in voted position, the operation of the straight-ticket keys of all the other parties is prevented.

380. In a voting-machine, the combination with a series of keys, one for each candidate, of another series of straight-ticket keys, one for each party, and means whereby when a plurality of the keys representing candidates from two or more different parties are in voted position, the operation of all the straight-ticket keys is prevented.

381. In a voting-machine, the combination with a series of keys, one for each candidate, of another series of straight-ticket keys, one for each party, and means whereby when one of said straight-ticket keys is in its voted position the voting of a split ticket is prevented.

382. In a voting-machine, the combination with a series of keys, one for each candidate, of another series of straight-ticket keys, one for each party, and means whereby the operation of all the other straight-ticket keys is prevented when one of said straight-ticket keys is in voted position.

383. In a voting-machine, the combination with a series of keys, one for each candidate, of another series of straight-ticket keys, one for each party, and means whereby when one of said straight-ticket keys is in voted position, the operation of all the keys, both single-candidate and straight-ticket, of all the other parties is prevented.

384. In a voting-machine, the combination with a series of keys, one for each candidate, of another series of straight-ticket keys, one for each party, and means whereby during the time that one of said straight-ticket keys remains in voted position, the movement of all the other keys on the machine is prevented.

385. In a voting-machine, the combination with a series of voting devices, one for each candidate, of another series of straight-ticket-voting devices, one for each party, and means whereby when the voting device devoted to any one candidate is in voted position, the operation of the straight-ticket-voting devices of all the other parties is prevented.

386. In a voting-machine, the combination with a series of voting devices, one for each candidate, of another series of straight-ticket-voting devices, one for each party, and means whereby when a plurality of the voting devices representing candidates from two or more different parties are in voted position, the operation of all the straight-ticket-voting devices is prevented.

387. In a voting-machine, the combination with a series of voting devices, one for each candidate, of another series of straight-ticket-voting devices, one for each party, and means whereby when one of said straight-ticket-voting devices is in its voted position, the voting of a split ticket is prevented.

388. In a voting-machine, the combination with a series of voting devices, one for each candidate, of another series of straight-ticket-voting devices, one for each party, and means whereby the operation of all the other straight-ticket-voting devices is prevented when one of said straight-ticket-voting devices is in voted position.

389. In a voting-machine, the combination with a series of voting devices, one for each candidate, of another series of straight-ticket-voting devices, one for each party, and means whereby when one of said straight-ticket-voting devices is in voted position, the operation of all the voting devices, both single-candidate and straight-ticket, of all the other parties is prevented.

390. In a voting-machine, the combination with a series of voting devices, one for each candidate, of another series of straight-ticket-voting devices, one for each party, and means whereby, during the time that one of said straight-ticket-voting devices remains in voted position, the movement of all the other voting devices on the machine is prevented.

391. In a voting-machine, the combination of single-candidate keys, interlocking mechanism therefor, a series of straight-ticket keys similar in form to said single-candidate keys, each of said straight-ticket keys extending through the keyboard of the machine, interlocking mechanism for said straight-ticket keys, and interlocking mechanism between said single-candidate keys and said straight-ticket keys, the parts being so arranged as to prevent the operation of the remaining straight-ticket keys after one of them has been voted while said operated straight-ticket key is in voted position.

392. In a voting-machine, the combination of single-candidate keys, straight-ticket keys, interlocking devices for said single-candidate keys and for said straight-ticket keys, and interlocking devices between said single-candidate keys and said straight-ticket keys, the parts being so arranged that when a straight-ticket key is in voted position all the keys on the machine are left accessible, but incapable of movement until the machine has been reset.

393. In a voting-machine, the combination of single-candidate keys, straight-ticket keys, interlocking devices for each set of keys, and means for preventing the movement of any of said keys while one of the straight-ticket keys is in voted position.

394. In a voting-machine, the combination of a support, single-candidate-voting mechanisms and straight-ticket-voting mechanisms mounted on said support and extending through the casing of the machine, interlocking mechanism for each of said sets of voting mechanisms, and interlocking connections behind the casing whereby when one of said straight-ticket-voting mechanisms is placed in voted position the movement of all the single-candidate-voting mechanisms is prevented.

395. In a voting-machine, the combination of a casing, single-candidate-voting mechanisms and straight-ticket mechanisms mounted so as to extend through said casing, interlocking mechanism for each of said sets of voting mechanisms, and connections located behind said casing whereby when one of said straight-ticket-voting mechanisms is held in voted position the movement of all the other mechanisms is prevented.

396. In a voting-machine, the combination of a keyboard, single-candidate-voting mechanisms, straight-ticket-voting mechanisms, parts of both of said mechanisms extending through said keyboard, interlocking devices for each of said sets of voting mechanism, and devices behind said keyboard whereby the operation of either of said voting mechanisms is prevented by the operation of the other of said voting mechanisms.

397. In a voting-machine, the combination of a keyboard, a series of keys, one for each candidate, each extending through said keyboard, another series of keys, one key for each party and each extending through said keyboard, interlocking devices for each of said sets of keys, and connections placed behind said keyboard whereby upon the operation of one of the keys of either series all the keys of the other series will be locked from operation.

398. In a voting-machine, the combination of a series of single-candidate keys, a series of straight-ticket keys, all of said keys being similar in form and operation and all extending through the keyboard of the machine, interlocking devices for each of said series of keys, and devices located behind said keyboard so arranged as to lock the keys representing the straight tickets and candidates of other parties against operation after one of said straight-ticket keys has been voted.

399. In a voting-machine, the combination of a support, single-candidate-voting mechanisms and straight-ticket-voting mechanisms mounted on said support and extending through the casing of the machine, and connections behind said casing, whereby when a member of said straight-ticket-voting mechanisms is placed in voted position the movement of all the single-candidate-voting mechanisms is prevented.

400. In a voting-machine, the combination of a cover, single-candidate-voting mechanisms and straight-ticket-voting mechanisms, mounted so as to extend through said cover, and connections located behind said cover, whereby when a straight-ticket-voting mechanism is held in voted position, the movement of all the other voting mechanisms is prevented.

401. In a voting-machine, the combination of a cover, single-candidate-voting mechanisms and straight-ticket-voting mechanisms, mounted to extend through said cover, and connections placed behind said cover, whereby when a straight-ticket-voting mechanism is held in voted position, the movement of all the single-candidate-voting mechanisms is prevented.

402. In a voting-machine, the combination of a single-candidate and straight-ticket voting mechanisms with a support therefor, said single-candidate-voting mechanisms being divided into groups with means for limiting the number of voting mechanisms that can be operated in each group, one of said straight-ticket-voting mechanisms being provided for each party and both said straight-ticket and single-candidate voting mechanism extending through the casing of the machine, and connections behind said casing whereby when one of said straight-ticket-voting mechanisms is placed in voted position the movement of all the single-candidate-voting mechanisms is prevented.

403. In a voting-machine the combination of means for voting for candidates individually, said means comprising mechanisms divided into groups with means for limiting the number of voting mechanisms that can be operated in each group, straight-ticket-voting mechanisms one for each party, a cover, said single-candidate and straight-ticket voting mechanisms being mounted so as to extend through said cover, and connections located behind said cover, whereby when a straight-ticket mechanism is held in voted position, the movement of all the other voting mechanisms is prevented.

In testimony whereof I affix my signature in presence of two witnesses.

ALBERT SJOBERG.

Witnesses:
JOHN STEEL,
HENRY BOLLU.